(12) United States Patent
Hand et al.

(10) Patent No.: US 12,218,708 B2
(45) Date of Patent: Feb. 4, 2025

(54) APPARATUSES AND METHODS FOR DIGITAL SUBCARRIER PARAMETER MODIFICATIONS FOR OPTICAL COMMUNICATION NETWORKS

(71) Applicant: Infinera Corporation, San Jose, CA (US)

(72) Inventors: Steven Joseph Hand, Los Gatos, CA (US); Ahmed Awadala, Gatineau (CA); Luis A. Perez, McKinney, TX (US); Vincent G. Dominic, Dayton, OH (US); Kuang-Tsan Wu, Kanata (CA)

(73) Assignee: Infinera Corporation, San Jose, CA (US)

( * ) Notice: Subject to any disclaimer, the term of this patent is extended or adjusted under 35 U.S.C. 154(b) by 108 days.

(21) Appl. No.: 17/845,934

(22) Filed: Jun. 21, 2022

(65) Prior Publication Data
US 2022/0352989 A1    Nov. 3, 2022

Related U.S. Application Data

(62) Division of application No. 16/384,842, filed on Apr. 15, 2019, now Pat. No. 11,368,228.

(60) Provisional application No. 62/668,297, filed on May 8, 2018, provisional application No. 62/657,066, filed on Apr. 13, 2018.

(51) Int. Cl.
| H04B 10/564 | (2013.01) |
| H04B 10/516 | (2013.01) |
| H04B 10/61 | (2013.01) |
| H04L 1/00 | (2006.01) |

(52) U.S. Cl.
CPC ......... *H04B 10/564* (2013.01); *H04B 10/516* (2013.01); *H04B 10/616* (2013.01); *H04L 1/0041* (2013.01)

(58) Field of Classification Search
CPC .. H04B 10/564; H04B 10/516; H04B 10/616; H04L 1/0041
USPC .......................................................... 398/76
See application file for complete search history.

(56) References Cited

U.S. PATENT DOCUMENTS

| 2002/0067883 A1* | 6/2002 | Lo ........................... H04J 14/02 398/91 |
| 2004/0151109 A1* | 8/2004 | Batra .................... H04L 1/0071 370/208 |
| 2005/0286908 A1* | 12/2005 | Way .................... H04B 10/5165 398/186 |
| 2010/0086303 A1* | 4/2010 | Qian ...................... H04J 14/06 398/65 |
| 2011/0135301 A1* | 6/2011 | Myslinski .......... H04Q 11/0066 398/34 |
| 2016/0218812 A1* | 7/2016 | Okabe ................ H04B 10/0775 |
| 2017/0005725 A1* | 1/2017 | Vassilieva .......... H04B 10/0775 |
| 2017/0005726 A1* | 1/2017 | Kim .................... H04B 10/0775 |

(Continued)

Primary Examiner — Abbas H Alagheband

(57) ABSTRACT

Optical network systems are disclosed, including systems having transmitters with a digital signal processor comprising forward error correction circuitry that provides encoded first electrical signals based on input data; and power adjusting circuitry that receives second electrical signals indicative of the first electrical signals, the power adjusting circuitry supplying third electrical signals, wherein each of the third electrical signals is indicative of an optical power level of a corresponding to one of a plurality of optical subcarriers output from an optical transmitter.

20 Claims, 39 Drawing Sheets

(56) References Cited

U.S. PATENT DOCUMENTS

2018/0359047 A1* 12/2018 Vassilieva .......... H04B 10/5057

* cited by examiner

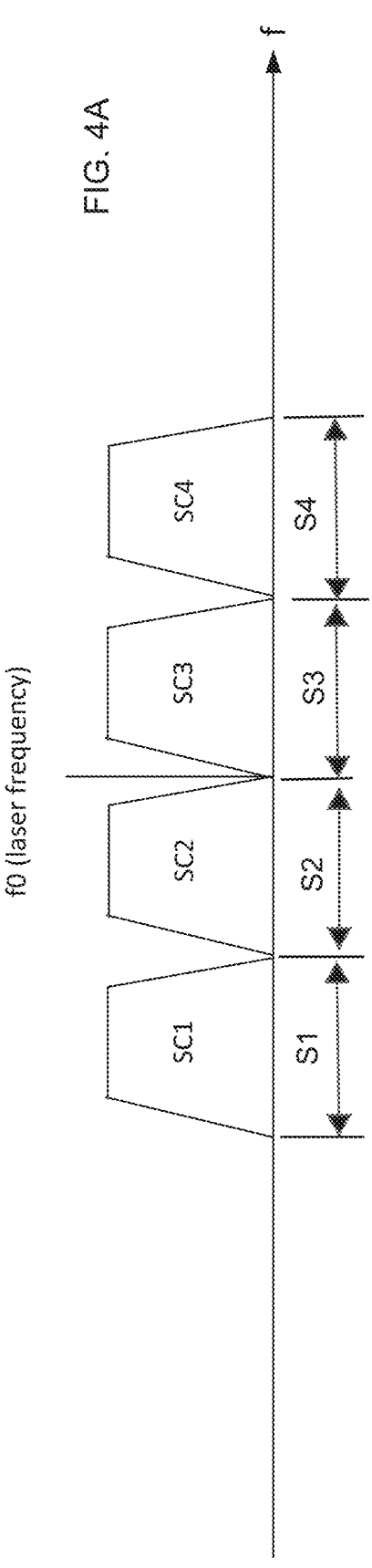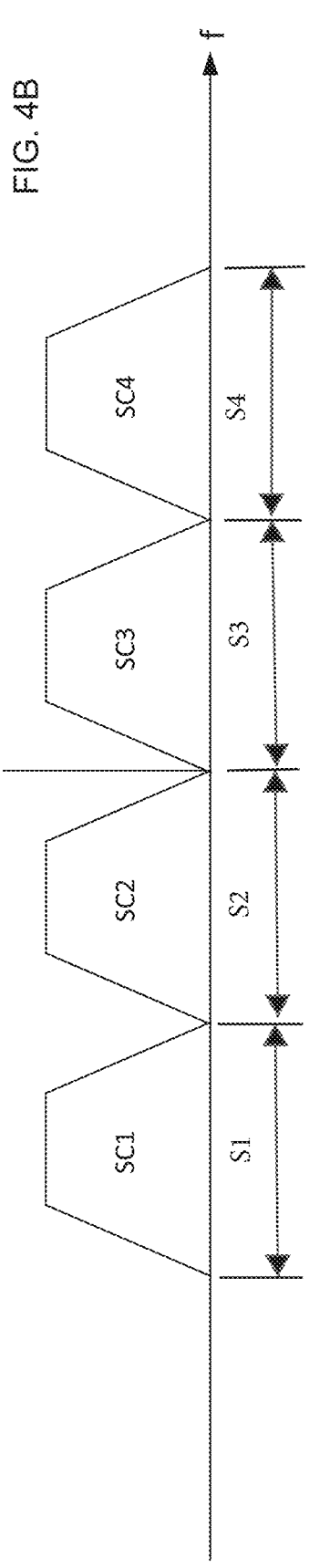

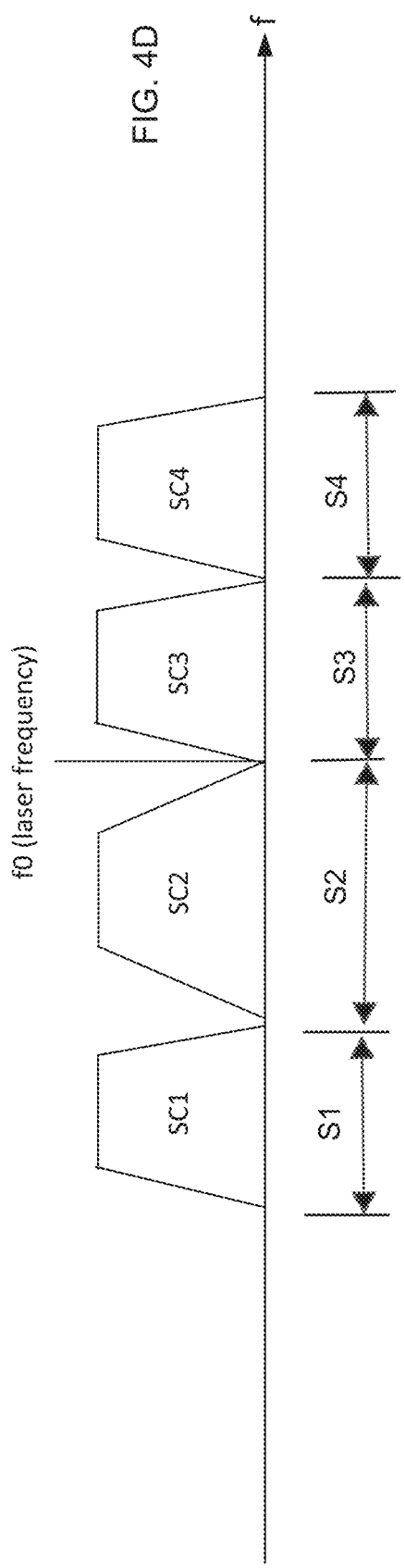

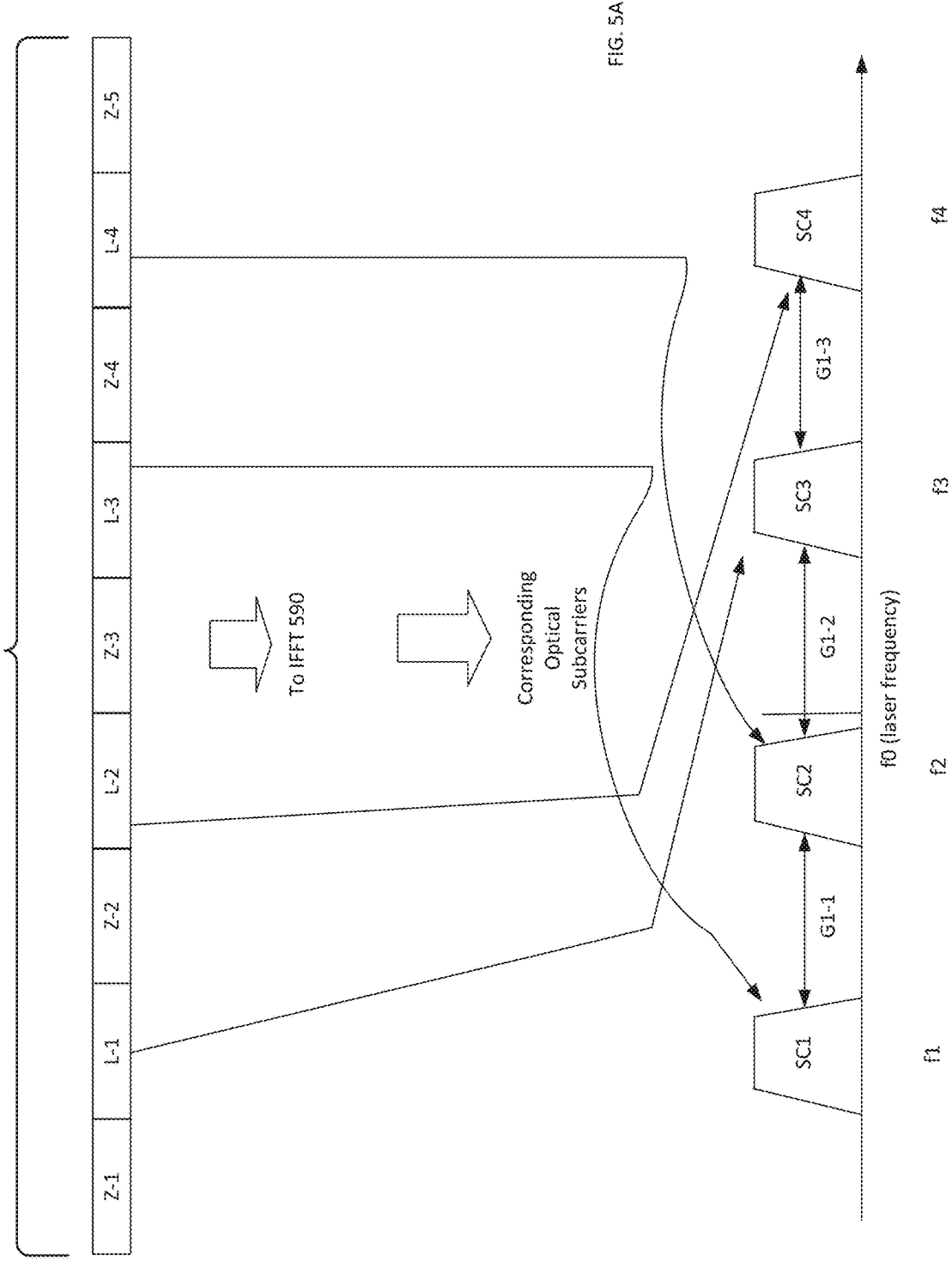

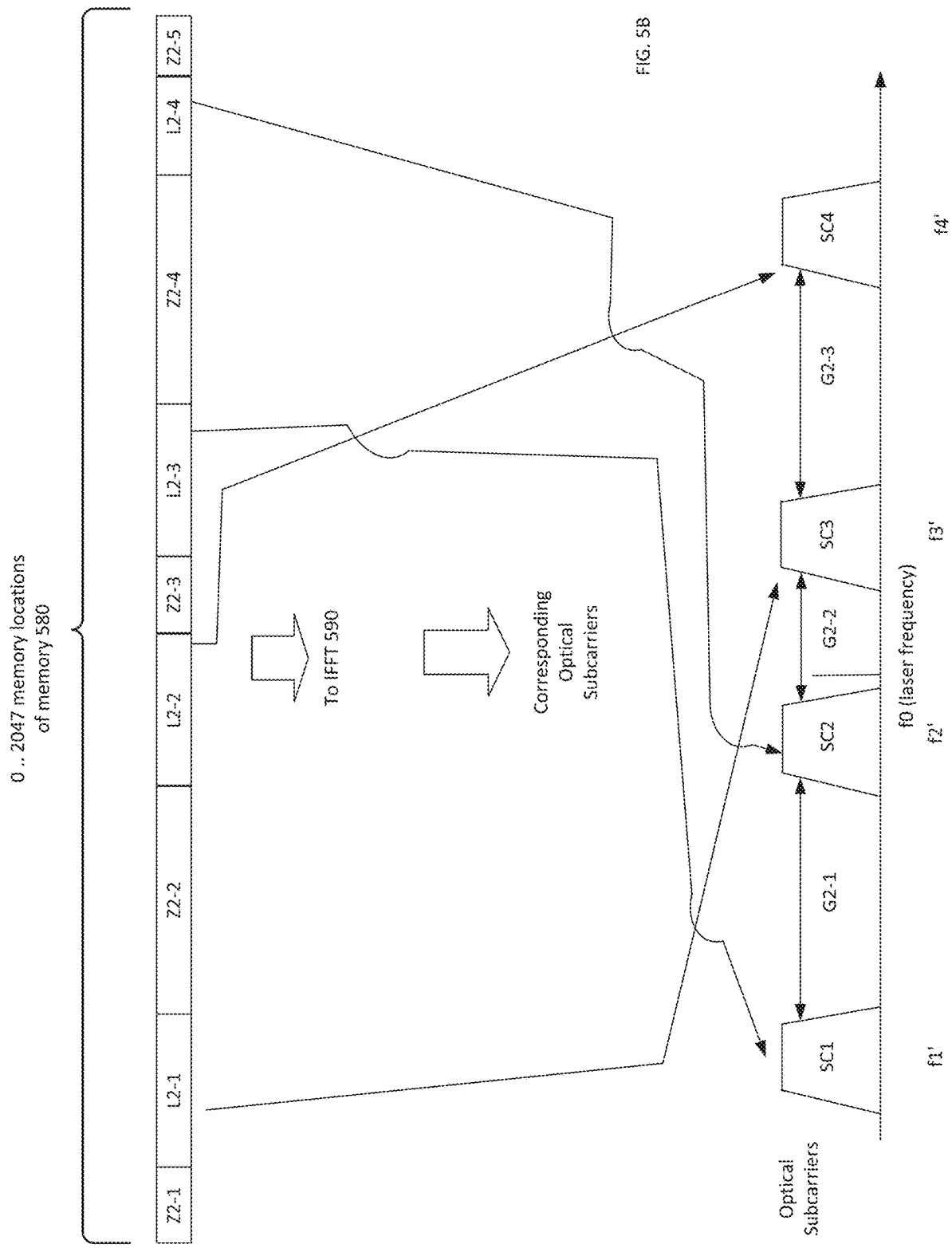

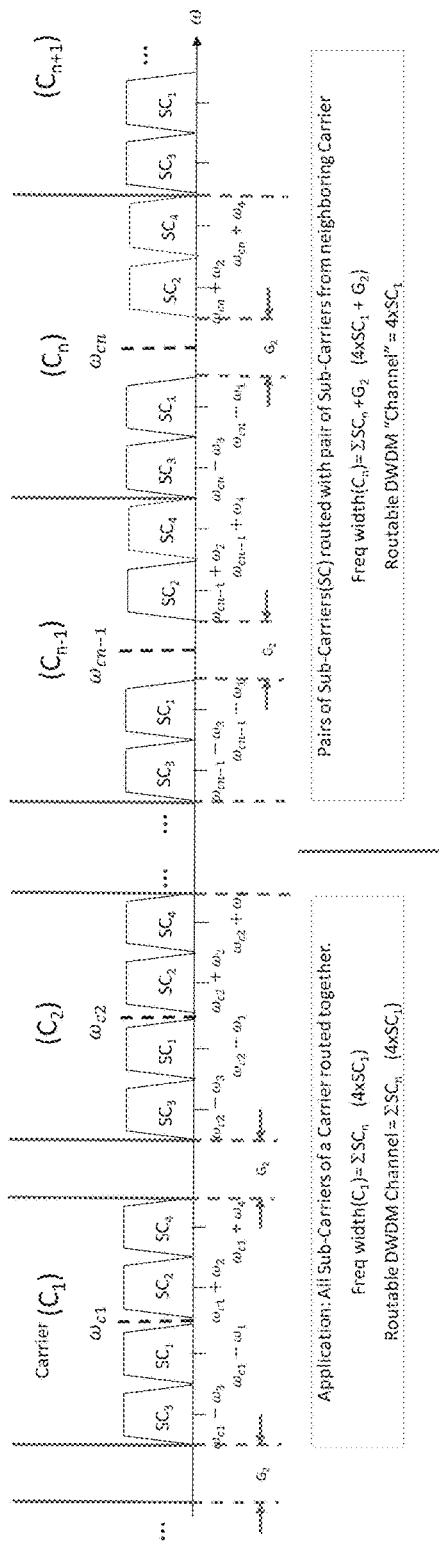

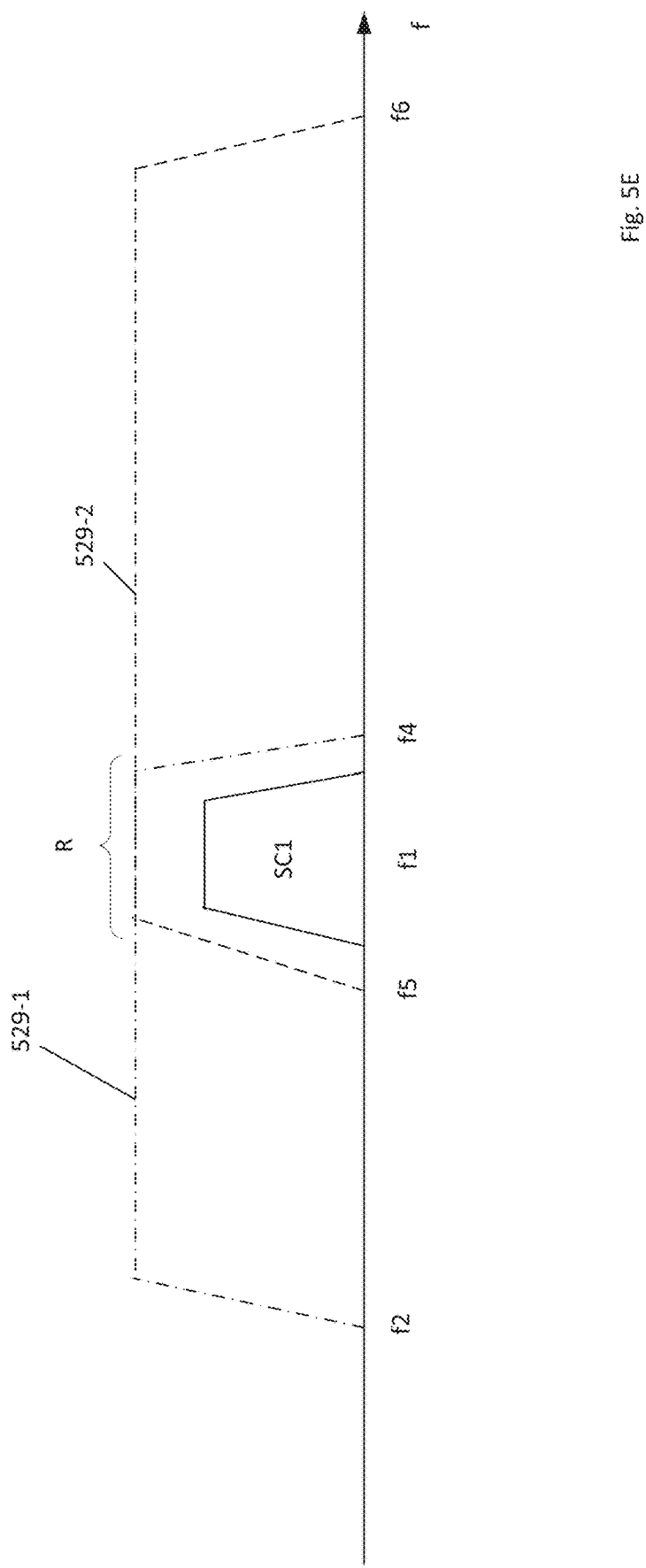

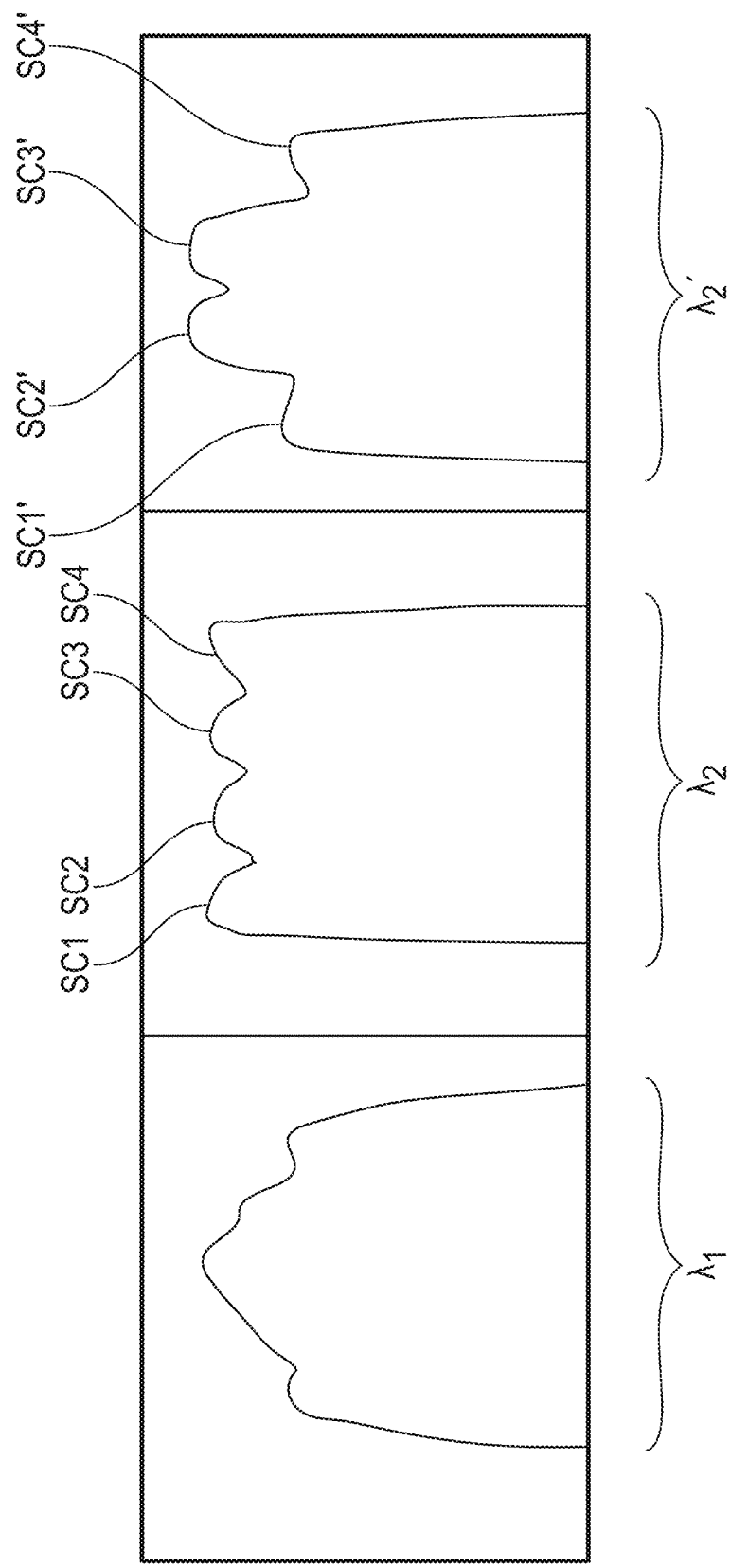

APPARATUSES AND METHODS FOR DIGITAL SUBCARRIER PARAMETER MODIFICATIONS FOR OPTICAL COMMUNICATION NETWORKS

INCORPORATION BY REFERENCE

The entirety of the following patents and patent applications are hereby expressly incorporated herein by reference: U.S. Pat. No. 8,831,439, entitled "Upsampling Optical Transmitter", which issued Sep. 9, 2014; U.S. Pat. No. 10,014,975, entitled "Channel Carrying Multiple Digital Subcarriers", which issued Jul. 3, 2018; U.S. patent application Ser. No. 16/155,624, entitled "Individually Routable Digital Subcarriers", which was filed Oct. 9, 2018; U.S. Provisional Patent Application No. 62/627,712, entitled "Independently Routable Digital Subcarriers for Optical Network", which was filed Feb. 7, 2018; Provisional Patent Application No. 62/668,297, entitled "Spectral Efficiency Improvements using Variable Subcarrier Root-Raised Cosine Shaping", which was filed May 8, 2018, to which the present application claims priority; and Provisional Patent Application No. 62/657,066, entitled "Subcarrier Parameter Modification To Compensate For Legacy Optical Filter Impairments", which was filed Apr. 13, 2018, to which the present application claims priority.

FIELD OF THE DISCLOSURE

The disclosure generally relates to methods and apparatuses for the generation and use of subcarriers in optical communication systems. More particularly the disclosure relates to such methods and apparatuses that route or direct individual subcarriers to a different destination, wherein the parameters of the subcarriers may be modified individually based on receiver characteristics and/or in accordance with the path or route, including apparatuses, over which a corresponding subcarrier is transmitted.

BACKGROUND

Communication systems are known in which optical signals, each being modulated to carry data and having a different wavelength, are transmitted from a first location to a second location. The optical signals may be combined on a single fiber and transmitted to a receiving node that includes circuitry to optically separate or demultiplex each signal. Alternatively, coherent detection techniques may be employed to extract the data carried by each optical signal.

In such systems, a plurality of transmitters may be provided, such that each transmitter supplies a respective one of the optical signals. Typically, each transmitter includes a laser, modulator, and associated circuitry for controlling the modulator and the laser. As network capacity requirements increase, however, additional transmitters may be provided to supply additional optical signals, but at significantly increased cost.

Moreover, communications systems may include multiple nodes, such that selected optical signals may be intended to transmission to certain nodes, and other signals may be intended for reception by one or more other nodes. Accordingly, optical add-drop multiplexers ("OADMs") may be provided to drop one or more signals at an intended local receiver, for example, while other optical signals are passed by the OADM to one or more downstream nodes. Further, optical signals may be added by the OADM for transmission to one or more nodes in the communication system. Thus, the optical signals may be transmitted over varying distances and through varying numbers of OADMs. In addition, the data and/or baud rate, and or modulation format is preferably tailored to a particular route, as well as the capacity of the intended receiver.

Thus, not only may multiple transmitters be required to provide a required number of optical signals to satisfy network capacity needs, but each transmitter may be required to be customized to generate each optical signal with a desired modulation format, data rate, and/or baud rate.

The required power for a subcarrier to reach its destination at a desired power may vary depending on the transmission of the subcarrier through a particular route in the optical network. For example, the routes may contain a varied number of fiber splitters, power combiners, filters, and other components common in DWDM deployment scenarios, and/or the routes may be of different lengths. Further, some legacy Optical Power Monitoring algorithms may expect a specific carrier shape associated with older DWDM optical transmission technologies. Therefore, methods and systems are needed to control the parameters of subcarriers in a carrier in order to satisfy destination requirements in optical communication networks. Additionally, feedback may be sent between ends of an optical communication network system based on measures of performance.

SUMMARY

Optical communication network systems and methods are disclosed. The problem of requiring multiple transmitters to provide a required number of optical signals to satisfy network capacity needs, and requiring each transmitter to be customized to generate each optical signal with a desired power, modulation format, data rate, and/or baud rate is addressed through systems and methods for providing subcarriers that may be routed through a network independently of one another. In addition, each subcarrier may have characteristics, such as optical power level, baud rate, data rate and modulation format, spectral width, and/or frequency spacings that may be tailored based on the intended receiver for such subcarrier and the particular optical path or route and/or apparatuses over/through which the subcarrier is transmitted.

Consistent with an aspect of the present disclosure, a digital signal processor may comprise forward error correction circuitry that provides encoded first electrical signals based on input data; and power adjusting circuitry that receives second electrical signals indicative of the first electrical signals, the power adjusting circuitry supplying third electrical signals, wherein each of the third electrical signals corresponds to an optical power level of a corresponding to one of a plurality of optical subcarriers output from an optical transmitter. In one implementation, each of the third electrical signals may have an associated one of a plurality of bandwidths, each of which may correspond to a spectral width of a respective one of the plurality of optical subcarriers.

Consistent with an aspect of the present disclosure, the power adjusting circuitry may comprise a plurality of digital multipliers corresponding to a plurality of independent data streams. The plurality of digital multipliers may be adjustable based on one or more control signal such that power adjustment of each of the third electrical signals is configurable.

Consistent with an aspect of the present disclosure, the power adjusting circuitry is adjustable based on one or more fourth electrical signals provided by a receiver that detects one or more of the plurality of optical subcarriers output from the optical transmitter. The one or more fourth electrical signals may be based on an optical power level of the one or more of the plurality of optical subcarriers previously detected by the receiver. The one or more fourth electrical signals may be based on a target optical power level of the one or more of the plurality of optical subcarriers at the receiver. The one or more fourth electrical signals may be associated with a feedback optical signal sent from the receiver to the optical transmitter.

Consistent with an aspect of the present disclosure, a node may comprise a transmitter, which may comprise a digital signal processor an optical transmitter comprising a digital signal processor, comprising: forward error correction circuitry that provides encoded first electrical signals based on input data; and power adjusting circuitry that receives second electrical signals indicative of the first electrical signals, the power adjusting circuitry supplying third electrical signals, wherein each of the third electrical signals corresponds to an optical power level of a corresponding one of a plurality of optical subcarriers output from the optical transmitter. The node may further comprise a control circuit that receives fourth electrical signals indicative of received power level of one or more of the plurality of optical subcarriers, provided by a receiver that detects one or more of the plurality of optical subcarriers output from the optical transmitter, whereby the control circuit adjusts the power adjusting circuitry based on the received fourth electrical signals.

Consistent with an aspect of the present disclosure, the node may further comprise a demultiplexer that filters an optical feedback signal provided by the receiver on an Optical Service Channel; and a photodiode that coverts the optical feedback signal from the demultiplexer into the fourth electrical signals and forwards the fourth electrical signals to the control circuit.

Consistent with an aspect of the present disclosure, the node may further comprise a filter that filters an optical sideband signal provided by the receiver on a Control Channel having a lower frequency than the frequency of the plurality of optical subcarriers to generate the fourth electrical signals.

Consistent with an aspect of the present disclosure, the fourth electrical signals may be generated from an optical feedback signal from the receiver, the optical feedback signal carrying a frame, the frame having a header that includes data, and wherein the optical power levels of the optical subcarriers are based on the data.

Consistent with an aspect of the present disclosure, a transmitter may comprise a digital signal processor receiving a plurality of independent data streams, the digital signal processor supplying outputs based on the plurality of independent data streams, the outputs including a first digital subcarrier having a first frequency bandwidth and a second digital subcarrier having a second frequency bandwidth different than the first frequency bandwidth; one or more digital-to-analog converter configured to convert the outputs of the digital signal processor to voltage signal outputs; a laser configured to output an optical light beam; and a modulator configured to modulate the optical light beam, based on the voltage signal outputs, to output a modulated optical signal including a plurality of optical subcarriers based on the outputs of the digital signal processor, wherein a first one of the plurality of optical subcarriers carries data indicative of a first one of the plurality of independent data streams, and a second one of the plurality of optical subcarriers carries data indicative of a second one of the plurality of independent data streams, wherein the first one of the plurality of optical subcarriers has a first optical bandwidth and the second one of the plurality of optical subcarriers has a second optical bandwidth different than the first optical bandwidth, and the first one of the plurality of optical subcarriers has a first level of optical power and the second one of the plurality of optical subcarriers has a second level of optical power different than the first level of optical power. Consistent with an aspect of the present disclosure, the digital signal processor may comprises a plurality of digital multipliers corresponding to the plurality of independent data streams, the plurality of digital multipliers supplying electrical signals such that the power levels of the optical subcarriers are based on the electrical signals output from the plurality of digital multipliers. The plurality of digital multipliers may be adjustable based on one or more control signal such that power adjustment is configurable for any of the first and second digital subcarrier.

Consistent with an aspect of the present disclosure, an optical network system may comprise a hub, comprising: a transmitter, comprising: a digital signal processor receiving a plurality of independent data streams, the digital signal processor supplying outputs based on the plurality of independent data streams, the outputs including a first digital subcarrier having a first frequency bandwidth and a second digital subcarrier having a second frequency bandwidth different than the first frequency bandwidth; one or more digital-to-analog converter configured to convert the outputs of the digital signal processor to voltage signal outputs; a laser configured to output an optical light beam; and a modulator configured to modulate the optical light beam, based on the voltage signal outputs, to output a modulated optical signal including a plurality of optical subcarriers based on the outputs of the digital signal processor, wherein a first one of the plurality of optical subcarriers carries data indicative of a first one of the plurality of independent data streams, and a second one of the plurality of optical subcarriers carries data indicative of a second one of the plurality of independent data streams, wherein the first one of the plurality of optical subcarriers has a first optical bandwidth and the second one of the plurality of optical subcarriers has a second optical bandwidth different than the first optical bandwidth, and the first one of the plurality of optical subcarriers has a first level of optical power and the second one of the plurality of optical subcarriers has a second level of optical power different than the first level of power. The optical network system may further comprise a first edge node comprising a receiver configured to receive one or more of the plurality of optical subcarriers; a second edge node comprising a receiver configured to receive one or more of the plurality of optical subcarriers; a first transmission path between the hub and the first edge node; and a second transmission path between the hub and the second edge node, wherein the second transmission path differs from the first transmission path. The first level of power of the first optical subcarrier and the second level of power of the second optical subcarrier may be based at least in part on one or more characteristics of at least one of the first transmission path and the second transmission path. The digital signal processor may comprise a plurality of digital multipliers corresponding to the plurality of independent data streams, the plurality of digital multipliers supplying electrical signals such that the optical power levels of the optical subcarriers are based on the electrical signals output from the plurality of digital multipliers.

Consistent with an aspect of the present disclosure, an optical network system, may comprise two or more edge nodes, each edge node comprising: a transmitter, comprising a digital signal processor receiving a plurality of independent data streams, the digital signal processor supplying outputs based on the plurality of independent data streams, the outputs including a first digital subcarrier having a first frequency bandwidth and a second digital subcarrier having a second frequency bandwidth different than the first frequency bandwidth; one or more digital-to-analog converter configured to convert the outputs of the digital signal processor to voltage signal outputs; a laser configured to output an optical light beam; and a modulator configured to modulate the optical light beam, based on the voltage signal outputs, to output a modulated optical signal including a plurality of optical subcarriers based on the outputs of the digital signal processor, wherein a first one of the plurality of optical subcarriers carries data indicative of a first one of the plurality of independent data streams, and a second one of the plurality of optical subcarriers carries data indicative of a second one of the plurality of independent data streams, wherein the first one of the plurality of optical subcarriers has a first optical bandwidth and the second one of the plurality of optical subcarriers has a second optical bandwidth different than the first optical bandwidth, and the first one of the plurality of optical subcarriers has a first level of optical power and the second one of the plurality of optical subcarriers has a second level of optical power different than the first level of optical power.

The optical network system may further comprise a hub comprising: a receiver configured to receive one or more of the plurality of optical subcarriers; and a transmitter; a first transmission path between a first one of the two or more edge nodes and the hub; and a second transmission path between a second one of the two or more edge nodes and the hub, wherein the second transmission path differs from the first transmission path. The first level of optical power of the first optical subcarrier and the second level of optical power of the second optical subcarrier may based at least in part on one or more characteristics of at least one of the first transmission path and the second transmission path.

The digital signal processor may comprise a plurality of digital multipliers corresponding to the plurality of independent data streams, the plurality of digital multipliers configured to control power gain of the optical subcarriers. The plurality of digital multipliers may be configured to control power gain of the optical subcarriers based at least in part on one or more characteristics of at least one of the first transmission path and the second transmission path.

Consistent with as aspect of the present disclosure, the hub may be configured to transmit from the transmitter of the hub information indicative of one or more measurements of the one or more of the plurality of optical subcarriers to one or more of the two or more edge nodes, and wherein the edge nodes are configured to adjust one or more of the first level of optical power of the first optical subcarrier and the second level of optical power of the second optical subcarrier based on the transmitted information. The information indicative of one or more measurements of the one or more of the plurality of optical subcarriers may be associated with a feedback optical signal sent from the transmitter of the hub to the one or more edge node. The feedback optical signal may be transmitted on an Optical Service Channel. The feedback optical signal may be transmitted on a Control Channel having a lower frequency than the frequency of the plurality of optical subcarriers. The feedback optical signal may carry a frame, the frame having a header that includes data, and the optical power levels of one or more of the plurality of the optical subcarriers may be based on the data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 4A illustrates an exemplary plurality of subcarriers consistent with an aspect of the present disclosure;

FIG. 4B illustrates another exemplary plurality of subcarriers consistent with an aspect of the present disclosure;

FIG. 4D illustrates another exemplary plurality of subcarriers consistent with an aspect of the present disclosure;

FIG. 5A is a diagram illustrating a portion of an exemplary process consistent with an aspect of the present disclosure;

FIG. 5B is a diagram illustrating a portion of another exemplary process consistent with an aspect of the present disclosure;

FIG. 5C is a diagram illustrating exemplary variable-spaced subcarriers consistent with an aspect of the present disclosure;

FIG. 5D is a diagram illustrating exemplary variable-spaced subcarriers consistent with an aspect of the present disclosure;

FIG. 5E is a diagram illustrating an exemplary subcarrier consistent with an aspect of the present disclosure;

FIG. 18 illustrates an exemplary legacy optical carrier;

FIG. 19 illustrates an exemplary coherent carrier consistent with an aspect of the present disclosure;

FIG. 20 illustrates another exemplary coherent carrier consistent with a further aspect of the present disclosure;

DETAILED DESCRIPTION

Figure 1:
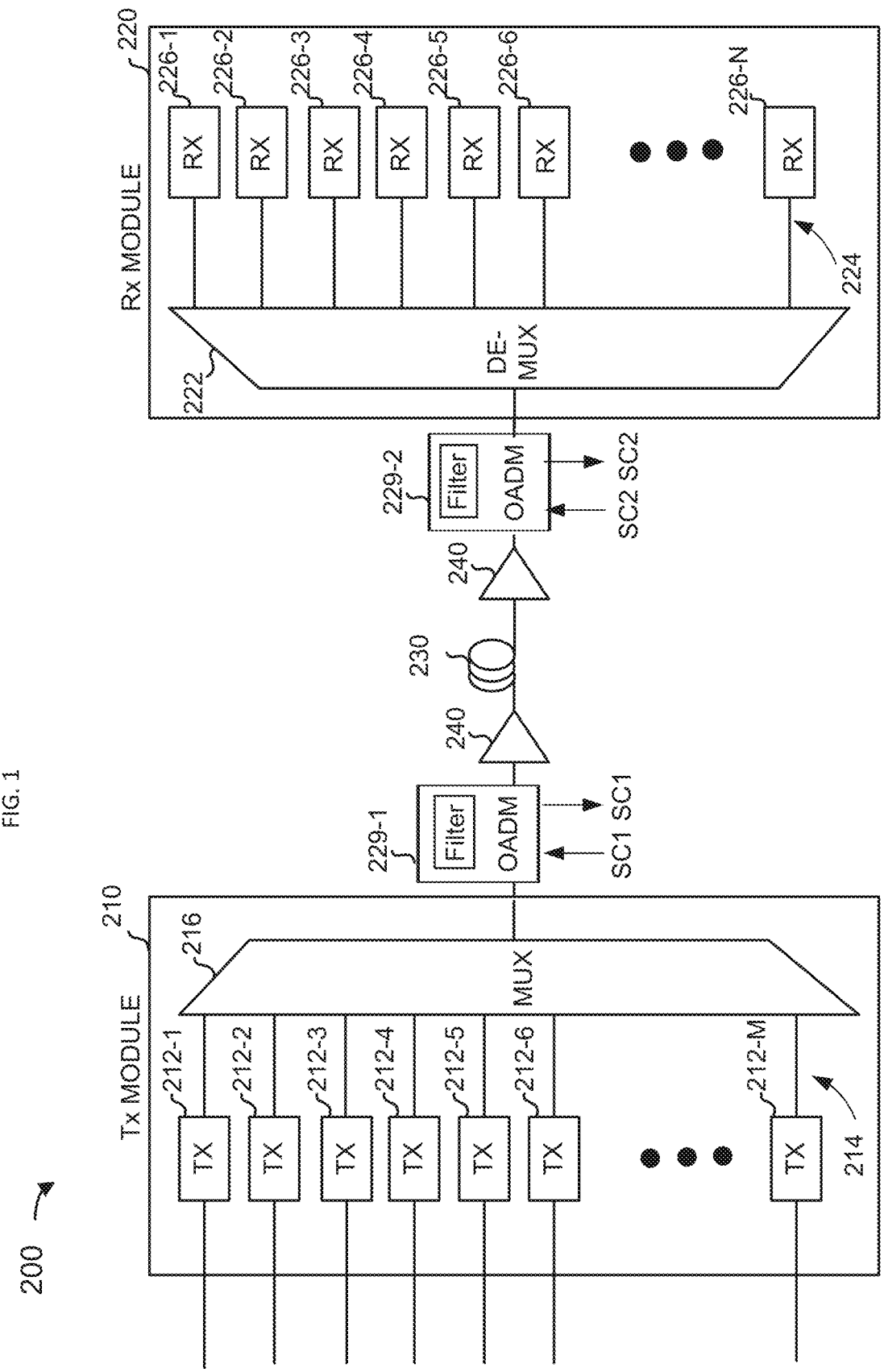
FIG. 1 illustrates an optical communication system consistent with an aspect of the present disclosure.

The following detailed description refers to the accompanying drawings. The same reference numbers in different drawings may identify the same or similar elements.

The mechanisms proposed in this disclosure circumvent the problems described above. The present disclosure describes a system methods and apparatuses that route or direct individual subcarriers to a different destination, wherein the modulation format, data rate, and/or baud rate, as well as the spectral width and frequency spacing between subcarriers, may be tailored for each subcarrier based on receiver characteristics and/or in accordance with the path or route over which a corresponding subcarrier is transmitted.

Definitions

If used throughout the description and the drawings, the following short terms have the following meanings unless otherwise stated:

ADC stands for analog-to-digital converter.
DAC stands for digital-to-analog converter.
DSP stands for digital signal processor.
OADM stands for optical add-drop multiplexer.
PIC stands for photonic integrated circuit.

Q stands for a measure of performance and represents the system tolerance in dB of an optical subcarrier.

Rx (or RX) stands for Receiver, which typically refers to optical channel receivers, but can also refer to circuit receivers.

Tx (or TX) stands for Transmitter, which typically refers to optical channel transmitters, but can also refer to circuit transmitters.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Further, the phrase "based on" is intended to mean "based, at least in part, on" unless explicitly stated otherwise.

Also, certain portions of the implementations have been described as "components" or "circuitry" that perform one or more functions. The term "component" or "circuitry" may include hardware, such as a processor, an application specific integrated circuit (ASIC), or a field programmable gate array (FPGA), or a combination of hardware and software. Software includes one or more computer executable instructions that when executed by one or more component cause the component or circuitry to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

Finally, as used herein any reference to "one embodiment" or "an embodiment" or "implementation: means that a particular element, feature, structure, or characteristic described in connection with the embodiment or implementation is included in at least one embodiment or implementation. The appearances of the phrase "in one embodiment" or "in one implementation" in various places in the specification are not necessarily all referring to the same embodiment or implementation.

In accordance with the present disclosure, messages or data transmitted between nodes may be processed by circuitry within the input interface(s), and/or the output interface(s) and/or the control module. Circuitry could be analog and/or digital, components, or one or more suitably programmed microprocessors and associated hardware and software, or hardwired logic. Also, certain portions of the implementations have been described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

Consistent with an aspect of the present disclosure, electrical signals (which may be referred to as digital subcarriers or simply subcarriers) are generated in a Digital Signal Processor based on independent input data streams. Drive signals are generated based on the digital subcarriers, and such drive signals are applied to an optical modulator, including, for example, a Mach-Zehnder modulator. The optical modulator modulates light output from a laser based on the drive signals to supply optical subcarriers, each of which corresponding to a respective digital subcarrier. Each of the optical subcarriers may be routed separately through a network and received by optical receivers provided at different locations in an optical communications network, where at least one of the optical subcarriers may be processed, and the input data stream associated with such optical subcarrier(s) is output. For the sake of convenience, optical subcarriers may simply be referred to as subcarriers.

Accordingly, instead of providing multiple transmitters, each being associated with a respective optical signal, one transmitter, having, in one example, a laser, may be provided that supplies multiple subcarriers, one or more of which carries data that may be independently routable to a corresponding receiver provided at a unique location. Thus, since fewer transmitters are required consistent with the present disclosure, system costs may be reduced.

Since the subcarriers may be transmitted over different transmission paths having different characteristics to receivers having different capacities or other properties, characteristics of each subcarriers may be tuned or adjusted to provide optimal performance. For example, the optical power level, the modulation format, data rate, and/or baud rate may be selected for a given subcarrier based on a particular path through the network and/or capacity or bandwidth of the intended receiver. These parameters may be selected to be different for other subcarriers that are transmitted over different paths to different receivers in the network. In one example, the modulation format may be selected from binary phase shift keying (BPSK), quadrature phase shift keying (QPSK), and m-quadrature amplitude modulation (m-QAM, where m is an integer).

Consistent with a further aspect of the present disclosure, efficient clock or phase recovery of a received signals may be made more efficient by sensing data or information associated with one subcarrier having a spectral width that is wider than other subcarriers associated with a particular carrier.

FIG. 1 is a diagram of a simplified view of an optical network 200 in which systems and/or methods described herein may be implemented. In one example, optical network 200 may constitute part of a larger network including multiple nodes arranged as a mesh or a ring, as discussed in greater detail below. As illustrated in FIG. 1, the optical network 200 may include a transmitter (Tx) module 210, and/or a receiver (Rx) module 220. In some implementations, the transmitter module 210 may be optically connected to the receiver module 220 via one or more link 230. Additionally, the link 230 may include one or more optical amplifiers 240 that amplify an optical signal as the optical signal is transmitted over the link 230.

The transmitter module 210 may include a number of optical transmitters 212-1 through 212-M (where M is greater than or equal to one), waveguides 214, and/or optical multiplexers 216. In some implementations, the transmitter module 210 may include additional components, fewer components, different components, or differently arranged components.

Each optical transmitter 212 may receive data for one or more data inputs 352, each of which may include a plurality of client data streams 352-1 to 352-4 discussed in greater detail below with reference to FIG. 2. Based on a respective data input, each transmitter provides a carrier and an associated plurality of optical subcarriers. The carrier has a wavelength equal to or substantially equal to the wavelength of continuous wave (CW) light output from a laser (see FIG. 2) and each subcarrier may have a frequency or wavelength that is different than the carrier wavelength. The transmitter 212 is described in greater detail below in relation to FIG. 2.

Remaining now with FIG. 1, in one implementation, the transmitter module 210 may include 5, 10, or some other quantity of the optical transmitters 212. In one example, the carrier wavelength of the optical signals supplied by each transmitter 212 may be tuned to conform to a wavelength grid, such as a standard grid published by the Telecommunication Standardization Sector (ITU-T). The carrier wavelengths may also be tuned to conform to a flexible grid in which the spacing between the carrier wavelengths is non-uniform. Moreover, the carrier wavelengths may be tuned to be more tightly packed spectrally to create a super channel.

The waveguides 214 may include an optical link or some other link to transmit output optical signals (each including a carrier and a plurality of optical subcarriers) of the optical transmitters 212. In some implementations, each optical transmitter 212 may include one waveguide 214, or multiple waveguides 214, to transmit output optical signals of the optical transmitters 212 to the optical multiplexer 216.

The optical multiplexer 216 may include a power combiner, an arrayed waveguide grating (AWG) or some other multiplexer device. In some implementations, the optical multiplexer 216 may combine multiple output optical signals, associated with the optical transmitters 212, into a single optical signal (e.g., a WDM signal). In some implementations, the optical multiplexer 216 may combine multiple output optical signals, associated with the optical transmitters 212, in such a way as to combine polarization multiplexed signals (e.g., also referred to herein as a WDM signal). A corresponding waveguide may output the WDM signal on an optical fiber, such as the link 230. The optical multiplexer 216 may include waveguides connected to an input and/or an output.

As further shown in FIG. 1, the optical multiplexer 216 may receive output optical signals outputted by the optical transmitters 212, and output one or more WDM signals. Each WDM signal may include one or more optical signals, such that each optical signal includes one or more wavelengths. In some implementations, each optical signal in the WDM signal may have a first polarization (e.g., a transverse magnetic (TM) polarization), and a second, substantially orthogonal polarization (e.g., a transverse electric (TE) polarization). Alternatively, each optical signal may have one polarization.

The link 230 may comprise an optical fiber. The link 230 may transport one or more optical signals. The amplifier 240 may include one or more amplification device, such as a doped fiber amplifier and/or a Raman amplifier. The amplifier 240 may amplify the optical signals as the optical signals are transmitted via the link 230.

In addition, one or more OADMs 229 may be provided along the fiber link 230. The OADMs 229 may be configured to add or drop one or more optical subcarriers included in the optical signals output from each transmitters. For example, as further shown in FIG. 1, optical subcarrier SC1 of a first optical signal may be added and/or dropped (as indicated by the arrows shown in FIG. 1) at OADM 229-1, and optical subcarrier SC2 of another optical signal may be added and/or dropped (as shown by the arrows in FIG. 1) at OADM 229-2.

The receiver module 220 may include optical demultiplexer 222, waveguides 224, and/or optical receivers 226-1 through 226-N (where N is greater than or equal to one). In some implementations, the receiver module 220 may include additional components, fewer components, different components, or differently arranged components.

The optical demultiplexer 222 may include an AWG, a power splitter, or some other demultiplexer device. The optical demultiplexer 222 may supply multiple optical signals based on receiving one or more optical signals, such as WDM signals, or components associated with the one or more optical signals. Additionally, the optical demultiplexer 222 may include waveguides 224.

The waveguides 224 may include an optical link or some other link to transmit optical signals, output from the optical demultiplexer 222, to the optical receivers 226. In some implementations, each optical receiver 226 may receive optical signals via a single waveguide 224 or via multiple waveguides 224.

As discussed in greater detail below, the optical receivers 226 may each include one or more photodetectors and related devices to receive respective input optical signals outputted by the optical demultiplexer 222, detect the optical subcarriers associated with the input optical signals, convert the optical subcarriers to voltage signals, convert the voltage signals to digital samples, and process the digital samples to produce output data corresponding to the one or more data streams, such as the input client data streams 352-1 to 352-4 associated with input data 352 provided to transmitter 212-1, for example. In some implementations, each of the optical receivers 226 may include a local oscillator, a hybrid mixer, a detector, an ADC, an RX DSP, and/or some other components, as described in greater detail below in relation to FIG. 6.

While FIG. 1 shows the optical network 200 as including a particular quantity and arrangement of components, in some implementations, the optical network 200 may include additional components, fewer components, different components, or differently arranged components. Also, in some instances, one of the devices illustrated in FIG. 1 may perform a function described herein as being performed by another one of the devices illustrated in FIG. 1.

Figure 2:
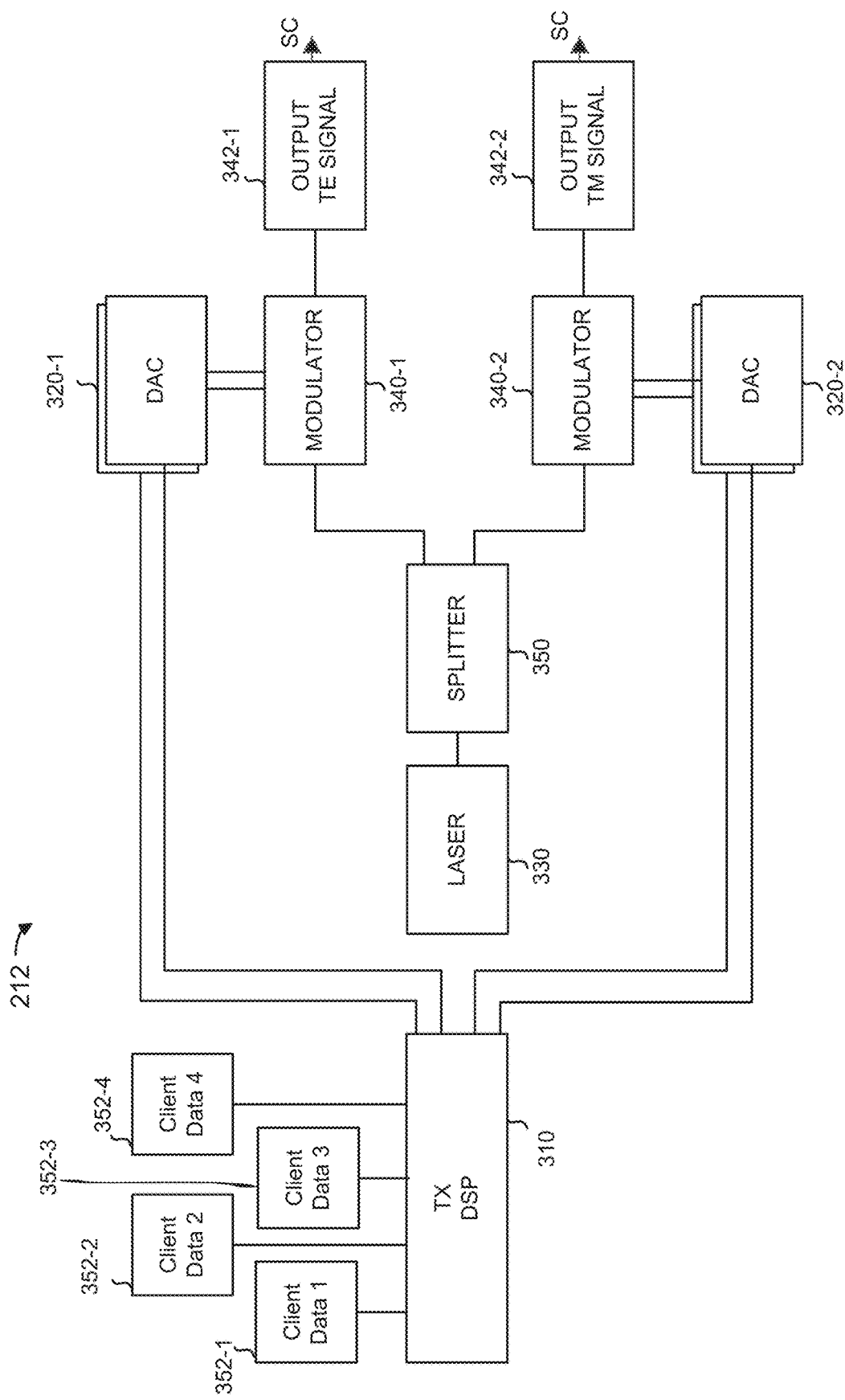
FIG. 2 is a diagram illustrating an example of components of an optical transmitter shown in FIG. 1.

FIG. 2 is a diagram illustrating an example of components of the optical transmitter 212 in greater detail. As shown in FIG. 2, the optical transmitter 212 may include a TX DSP 310, two digital-to-analog converters (DACs) 320-1 and 320-2 (referred to generally as DACs 320 and individually as DAC 320), a laser 330, modulators 340-1 and 340-2

(referred to generally as modulators 340 and individually as modulator 340), and a splitter 350.

In some implementations, the TX DSP 310 and the DAC 320 may be implemented using an application specific integrated circuit (ASIC) and/or may be implemented on a single integrated circuit, such as a single PIC. In some implementations, the laser 330 and the modulator 340 may be implemented on a single integrated circuit, such as a single photonic integrated circuit (PIC). In some other implementations, the TX DSP 310, the DAC 320, the laser 330, and/or the modulator 340 may be implemented on one or more integrated circuits, such as one or more PICs. For example, in some example implementations, components of multiple optical transmitters 212 may be implemented on a single integrated circuit, such as a single PIC, to form a super-channel transmitter.

The TX DSP 310 may comprise a digital signal processor. The TX DSP 310 may receive input data from multiple data sources, each of which supplying a respective one of the plurality of Client Data Streams 352-1 through 352-4. In general, "N" number of Client Data Streams 352-1 to 352-N can be used. For explanatory purposes, four Client Data Streams 352 (N=4) are used in relation to FIG. 2. The TX DSP 310 may determine the signal to apply to the modulator 340 to generate multiple optical subcarriers. Digital subcarriers may comprise electronic signals generated in the TX DSP 310 that correspond to respective optical subcarriers.

In some implementations, the TX DSP 310 may receive streams of data (such as one or more of the Client Data Streams 352-1 to 352-4), map the streams of data into each of the digital subcarriers, independently apply spectral shaping to each of the digital subcarriers, and obtain, based on the spectral shaping of each of the digital subcarriers, a sequence of values to supply to the DAC 320. In some implementations, the TX DSP 310 may generate the digital subcarriers using time domain filtering and frequency shifting by multiplication in the time domain. The TX DSP 310 will be further described in relation to FIG. 3.

The DAC 320 may comprise a digital-to-analog converter. The DAC 320 may receive the sequence of values and, based on the sequence of values, generate the analog or voltage signals to apply to the modulator 340.

The laser 330 may include a semiconductor laser, such as a distributed feedback (DFB) laser, or some other type of laser. The laser 330 may provide an output optical light beam to the modulator 340.

The modulator 340 may include a Mach-Zehnder modulator (MZM), such as a nested MZM, or another type of modulator. The modulator 340 may receive the optical light beam from the laser 330 and the voltage signals from the DAC 320, and may modulate the optical light beam, based on the voltage signals, to generate a multiple subcarrier output signal(s), such as Output TE Signal 342-1 and Output TM Signal 342-2.

The splitter 350 may include an optical splitter that receives the optical light beam from the laser 330 and splits the optical light beam into two branches: one for the first polarization and one for the second polarization. In some implementations, the two optical light beams may have approximately equal power. The splitter 350 may output one optical light beam to modulator 340 including first and second modulators 340-1 and 340-2, each of which may include a Mach-Zehnder modulator.

The modulator 340-1 may be used to modulate signals of the first polarization. The modulator 340-2 may be used to modulate signals of the second polarization.

In some implementations, one or more subcarrier may be modulated by the modulator 340 to carry data at different rates (see FIG. 4A illustrating exemplary subcarriers). For example, a first subcarrier SC1 may carry data at a first rate and a second subcarrier SC2 may carry data at a different rate that is higher or lower than the first rate. In addition, one or more subcarrier may be modulated by the modulator 340 to carry data with different baud rates (see FIG. 4A illustrating exemplary subcarriers). For example, the first subcarrier SC1 may carry data at or have an associated a first baud rate and the second subcarrier SC2 may carry data at or have an associated second baud rate that is higher or lower (different) than the first baud rate.

In some implementations, a first one of a plurality of subcarriers SC1 may be modulated in accordance with a first modulation format and a second one of the plurality of subcarriers SC2 may be modulated in accordance with a second modulation format different than the first modulation format (see FIG. 4A illustrating exemplary subcarriers). In one implementation, the first modulation format may be one of BPSK, QPSK, and m-QAM, where m is an integer, and the second modulation format may be another one of BPSK, QPSK, and m-QAM. In one implementation, the first modulation format may be one of BPSK, QPSK, and m-QAM, where m is an integer, and the second modulation format may be an intensity modulation format.

In some implementations, a plurality of the subcarriers may have a variety of combinations of modulation and data rates configured by the transmitter and/or by a plurality of transmitters 212. The particular combination of modulation and data rates of the subcarriers may be configured based on the desired distance of transmission, desired error rate, desired data rate, and/or other requirements and/or restrictions for the optical network 200 and/or the end client.

In some implementations, two DACs 320 may be associated with each polarization. In these implementations, two DACs 320-1 may supply voltage signals to the modulator 340-1, and two DACs 320-2 may supply voltage signals to the modulator 340-2. In some implementations, the outputs of the modulators 340 may be combined back together using combiners (e.g., optical multiplexer 216) and polarization multiplexing.

While FIG. 2 shows the optical transmitter 212 as including a particular quantity and arrangement of components, in some implementations, the optical transmitter 212 may include additional components, fewer components, different components, or differently arranged components. The quantity of DACs 320, lasers 330, and/or modulators 340 may be selected to implement an optical transmitter 212 that is capable of generating polarization diverse signals for transmission on an optical fiber, such as the link 230. In some instances, one of the components illustrated in FIG. 2 may perform a function described herein as being performed by another one of the components illustrated in FIG. 2.

Figure 3:
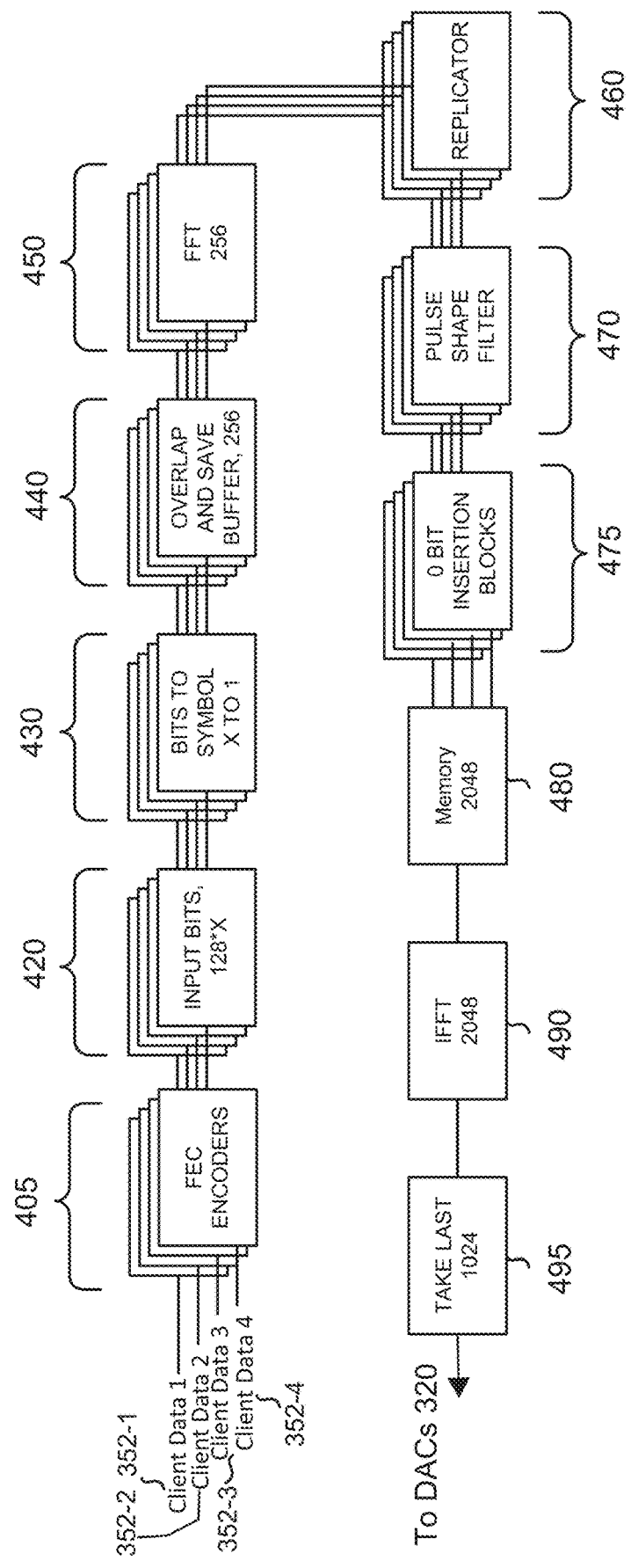
FIG. 3 is a diagram illustrating example components of an exemplary transmitter digital signal processor (Tx DSP) shown in FIG. 2.

FIG. 3 shows an example of the digital signal processor (TX DSP) 310 of the transmitter 212 in greater detail. In this example, four of the Client Data Streams 352 are shown. The digital signal processor 310 may include FEC encoders 405-1 to 405-4 (referred to generally as FEC encoders 405 and individually as FEC encoder 405), input bits components 420-1 to 420-4 (referred to generally as input bits components 420 and individually as input bits component 420), four bits-to-symbol components 430-1 to 430-4 (referred to generally as bits-to-symbol components 430 and individually as bits-to-symbol component 430), four overlap-and-save buffers 256 440-1 to 440-4 (referred to generally as overlap-and-save buffers 440 and individually as overlap-and-save buffer 440), four fast Fourier transform functions (FFT) 256 components 450-1 to 450-4 (referred to generally as FFT components 450 and individually as FFT component 450), four replicator components 460-1 (referred to generally as replicator components 460 and individually as replicator component 460), four pulse shape filters 470 (referred to generally as pulse shape filters 470 and individually as pulse shape filter 470), an inverse FFT (IFFT) 2048 component 490, and a take last 1024 component 495. Optionally, the TX DSP 310 may further comprise one or more zero-bit-insertion-block circuitry components 475 (referred to generally as zero-bit-insertion-block circuitry components 475 and individually as zero-bit-insertion-block circuitry component 475), and a memory 2048 array 480. Optionally, the TX DSP 310 may further comprise four zero-bit-insertion-block circuitry components 475 (referred to generally as zero-bit-insertion-block circuitry components 475 and individually as zero-bit-insertion-block circuitry component 475), and a memory 2048 array 480.

For each of the Client Data Streams 352, the digital signal processor (TX DSP) 310 of the transmitter 301 may contain one each of the FEC encoders 405, the input bits components 420, the bits-to-symbol components 430, the overlap-and-save buffers 440, the fast Fourier transform functions (FFT) components 450, the replicator components 460, the pulse shape filters 470, and the zero-bit-insertion-block circuitry components 475.

Each of the FEC encoders 405-1 to 405-4 may receive a particular one of the plurality of independent input data streams of bits (illustrated as exemplary Client Data Streams 352-1 to 352-4) from a respective one of a plurality of data sources and perform error correction coding on a corresponding one of the input Client Data Streams 352, such as through the addition of parity bits. The FEC encoders 405-1 to 405-4 may be designed to generate timing skew between the subcarriers to correct for skew induced by link(s) between the transmitter module 210 and the receiver module 220 in the optical network 200.

Input bits component 420 may process, for example, 128*X bits at a time, where X is an integer. For dual-polarization Quadrature Phase Shift Keying (QPSK), X is four. For higher modulation formats, X may be more than four. For example, for an 8-quadrature amplitude modulation (QAM) format, X may be eight and for a 16 QAM modulation format, X may be sixteen. Accordingly, for such 8 QAM modulation, eight FEC encoders 405 may be provided, each of which may encode a respective one of eight independent input data streams (e.g., eight of the Client Data Streams 352) for a corresponding one of eight digital subcarriers corresponding to eight optical subcarriers. Likewise, for 16 QAM modulation, sixteen FEC encoders 405 may be provided, each of which may encode a respective one of sixteen independent input data streams (e.g., sixteen of the Client Data Streams 352) for a corresponding one of sixteen subcarriers corresponding to sixteen optical subcarriers.

The bits-to-symbol component 430 may map the bits to symbols on the complex plane. For example, the bits-to-symbol components 430 may map four bits or other numbers of bits to a symbol in the dual-polarization QPSK constellation or other modulation format constellation. Accordingly, each of the components or circuits 430 may define or determine the modulation format for a corresponding subcarrier. In addition, components or circuits 405, 420, and 430 may define or determine the baud rate and or data rate for each subcarrier. Therefore, the modulation format, baud rate and data rate may be selected for each subcarrier by these circuits. For example, control inputs may be provided to these circuits so that the desired modulation format, baud rate and data rate may be selected.

The overlap-and-save buffer 440 may buffer 256 symbols, in one example. The overlap-and-save buffer 440 may receive 128 symbols at a time from the bits-to-symbol component 430. Thus, the overlap-and-save buffer 440 may combine 128 new symbols, from the bits-to-symbol component 430, with the previous 128 symbols received from the bits-to-symbol component 430.

The FFT component 450 may receive 256 symbols from the overlap-and-save buffer 440 and convert the symbols to the frequency domain using, for example, a fast Fourier transform (FFT). The FFT component 450 may form 256 frequency bins, for example, as a result of performing the FFT. Components 440 and 450 may carry out the FFT for each subcarrier based on one sample per symbol (per baud) to thereby convert time domain or data symbols received by FFT component 550 into frequency domain data for further spectral shaping (requiring more than one sample/baud or symbol) by filters 470.

The replicator component 460 may replicate the 256 frequency bins, in this example, or registers to form 512 frequency bins (e.g., for T/2 based filtering of the subcarrier). This replication may increase the sample rate.

The pulse shape filter 470 may apply a pulse shaping filter to the data stored in the 512 frequency bins to thereby provide the digital subcarriers with desired spectral shapes and such filtered subcarriers are multiplexed and subject to the inverse FFT 490, as described below. The pulse shape filter 470 may calculate the transitions between the symbols and the desired spectrum so that the subcarriers can be packed together on the channel. The pulse shape filter 470 may also be used to introduce timing skew between the subcarriers to correct for timing skew induced by links between nodes in the optical network 200. The pulse shape filters 470 may be raised cosine filters.

The pulse shape filter 470 may have a variable bandwidth. In some implementations, the bandwidth of the subcarriers may be determined by the width of the pulse shape filters 470. The pulse shape filters 470 may manipulate the digital signals of the subcarriers or digital subcarriers to provide such digital subcarriers with an associated spectral width. In addition, as generally understood, the pulse shape filter 470 may have an associated "roll-off" factor ($\alpha$). Consistent with the present disclosure, however, such "roll-off" may be adjustable or changed in response to different control inputs to the pulse shape filter 470. Such variable roll-off results in the pulse shape filter 470 having a variable or tunable bandwidth, such that each subcarrier may have a different spectral width. In a further example, one of the subcarriers may have an associated spectral width that is wider than the remaining subcarriers. It is understood that the control inputs may be any appropriate signal, information, or data that is supplied to the pulse shape filter 470, such that the "roll-off" is changed in response to such signal, information, or data.

The four zero-bit-insertion-block circuitry components 475 may comprise circuitry to receive the four digital subcarriers from the four pulse shape filters 470 and may output zeros or other bits in bits between a block of data bits of a first digital subcarrier and a block of data bits of a second digital subcarrier to the memory array 480 in order to adjust the frequency spacing or gap between the optical subcarriers, as discussed in greater detail below.

The memory array 480 may receive all four of the digital subcarriers from the zero-bit-insertion-block circuitry components 475 and the zeros from the four zero-bit-insertion-block circuitry components 475. The memory array 480 may store the outputs of the digital subcarriers and output an array of the four digital subcarriers and the zeros from the four zero-bit-insertion-block circuitry components 475 to the IFFT component 490.

The IFFT component 490 may receive the 2048 element vector and return the signal back to the time domain, which may now be at 64 GSample/s. The IFFT component 490 may convert the signal to the time domain using, for example, an inverse fast Fourier transform (IFFT).

The take last 1024 component 495 may select the last 1024 samples, for example, from IFFT component 490 and output the 1024 samples to the DACs 320 of the transmitter 212 (such as at 64 GSample/s, for example).

While FIG. 3 shows the TX DSP 310 as including a particular quantity and arrangement of functional components, in some implementations, the TX DSP 310 may include additional functional components, fewer functional components, different functional components, or differently arranged functional components.

Returning now to FIG. 2, as previously described, the DACs 320 may convert the received samples from the take last component 495 of the TX DSP 310. The modulator 340 may receive the optical light beam from the laser 330 and the voltage signals from the DAC 320, and may modulate the optical light beam or CW light from laser 330, based on the voltage signals, to generate a multiple subcarrier output signal, such as Output TE Signal 342-1 and Output TM Signal 342-2.

FIGS. 4A-4E illustrate examples of optical subcarriers SC1 to SC4 that may be output from the transmitter 212 (similar optical subcarriers may be output from transmitters in transceivers located at other nodes). In one example, the optical subcarriers SC1 to SC4 may not spectrally overlap with one another and may be, for example, Nyquist subcarriers, which may have a frequency spacing equal to or slightly larger than the individual subcarrier baud-rate.

As illustrated in FIG. 4A, the optical subcarriers may have one or more spectra or bandwidths, such as, for example, S3 (optical subcarrier SC3) and S4 (optical subcarrier SC4) above frequency f0, which may correspond to a center frequency (f0) of the laser 330 of the transmitter 212. In addition, the optical subcarriers may have one or more spectra or bandwidths, such as for S1 (optical subcarrier SC1) and S2 (optical subcarrier SC2) below frequency f0.

In one example, the number of digital and optical subcarriers equals a number of the independent input Client Data Streams 352. For example, Client Data Streams 352-1 to 352-4 from FIG. 3 may be four independent input data streams corresponding to four optical subcarriers SC1 to SC4 in FIG. 4A, such that each of the optical subcarriers carries data or information associated with a respective one of the Client Data Streams. In one example, the number of digital and optical subcarriers is more than the number of the independent input Client Data Streams 352. For example, Client Data Streams 352-1 to 352-3 from FIG. 3 may be three independent input data streams mapped to four optical subcarriers SC1 to SC4. Two or more of the optical subcarriers, such as the optical subcarriers SC3 and SC4, may carry one of the Client Data Streams 352-3. Such an arrangement allows for more data capacity to be dedicated to a particular Client Data Stream 352.

Frequency bandwidth and roll-off of the subcarriers may be determined by appropriate input to the pulse shape filters 470. The laser frequency (f0) may be centrally positioned within the frequency (f) of the filters' bandwidth. As illustrated in FIG. 4A, the filter bandwidths for each of the four pulse shape filters 470 may be the same, for example, and may all have the same roll-off factor (for example, $\alpha=0.3$), producing four optical subcarriers SC1-SC4 each having the same bandwidth. As illustrated in FIG. 4B, the filter bandwidths for each of the four pulse shape filters 470 may be the same, for example, and may all have the same roll-off factor (for example, $\alpha=0.7$) differing from the roll-off factor of the example of FIG. 4A, producing four subcarriers SC1-SC4 each having the same bandwidth, but with a larger bandwidth than subcarriers produced by a pulse shape filter 470 having a smaller roll-off factor. Thus, the roll-off factor for each of filters 470 may be controlled or adjusted so that corresponding optical subcarriers have different spectral widths, as noted above.

Figure 4C:
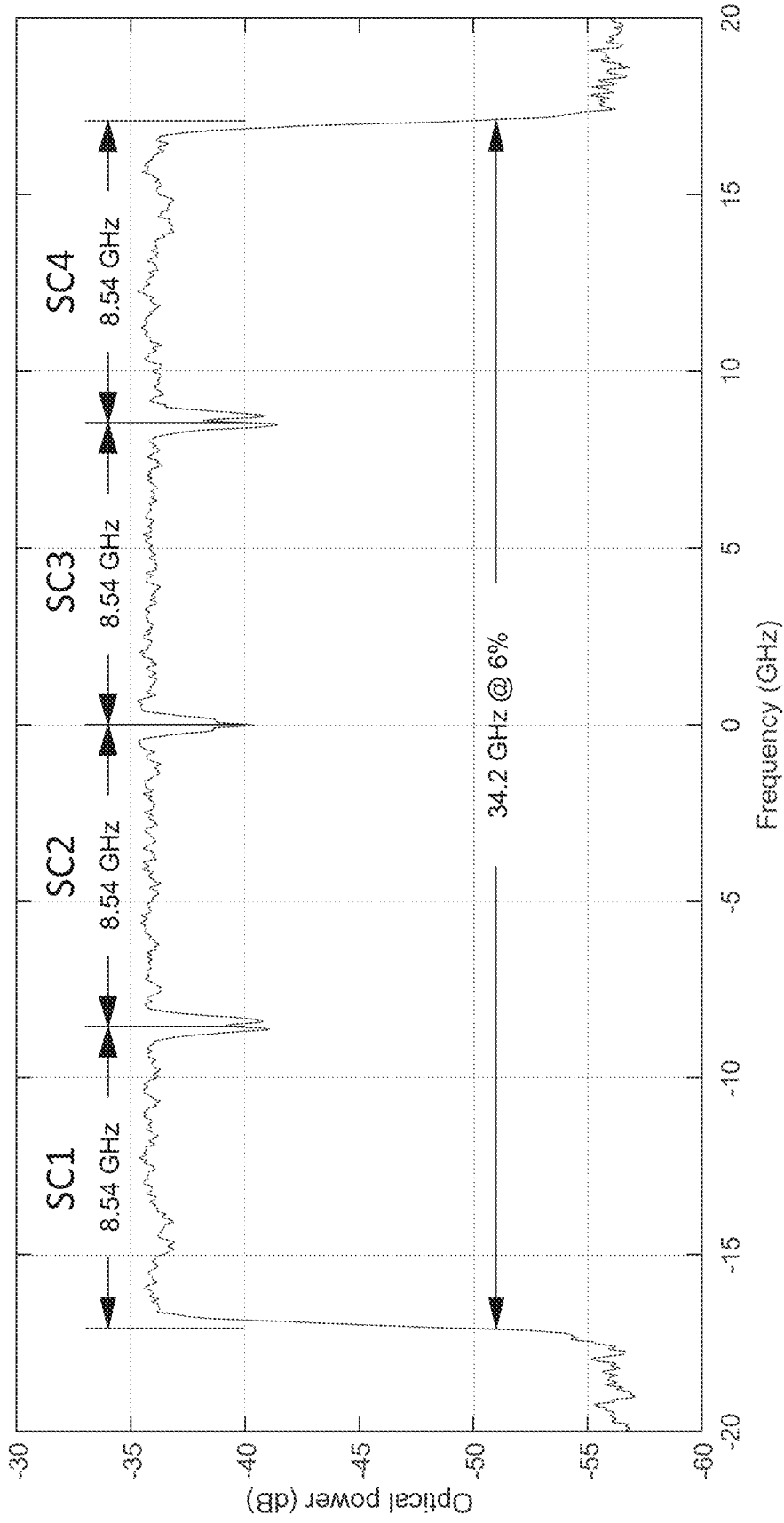
FIG. 4C illustrates another exemplary plurality of subcarriers consistent with an aspect of the present disclosure.

FIG. 4C illustrates another example in which the bandwidth of the four subcarriers is the same. In the example of FIG. 4C, the baud rate of each subcarrier is 8.39, and the shaping factor is 1/16 (6.25%), making the total width of each subcarrier $8.39*(1+1/16)=8.54$ GHz. In some implementations, the roll-off factor can be assigned to be very narrow for the majority of the subcarriers, while one subcarrier is given a wider roll-off factor. This allows for channel spacing to be tighter than would be possible with conventional shaping and clock recovery. That is, since the majority of subcarriers in this example, have a narrow bandwidth, more subcarriers can be accommodated within a given amount of spectrum, and, therefore, provide greater data carrying capacity for a given link. Clock and/or phase recovery based on the wider subcarrier is discussed in greater detail below.

Figure 4E:
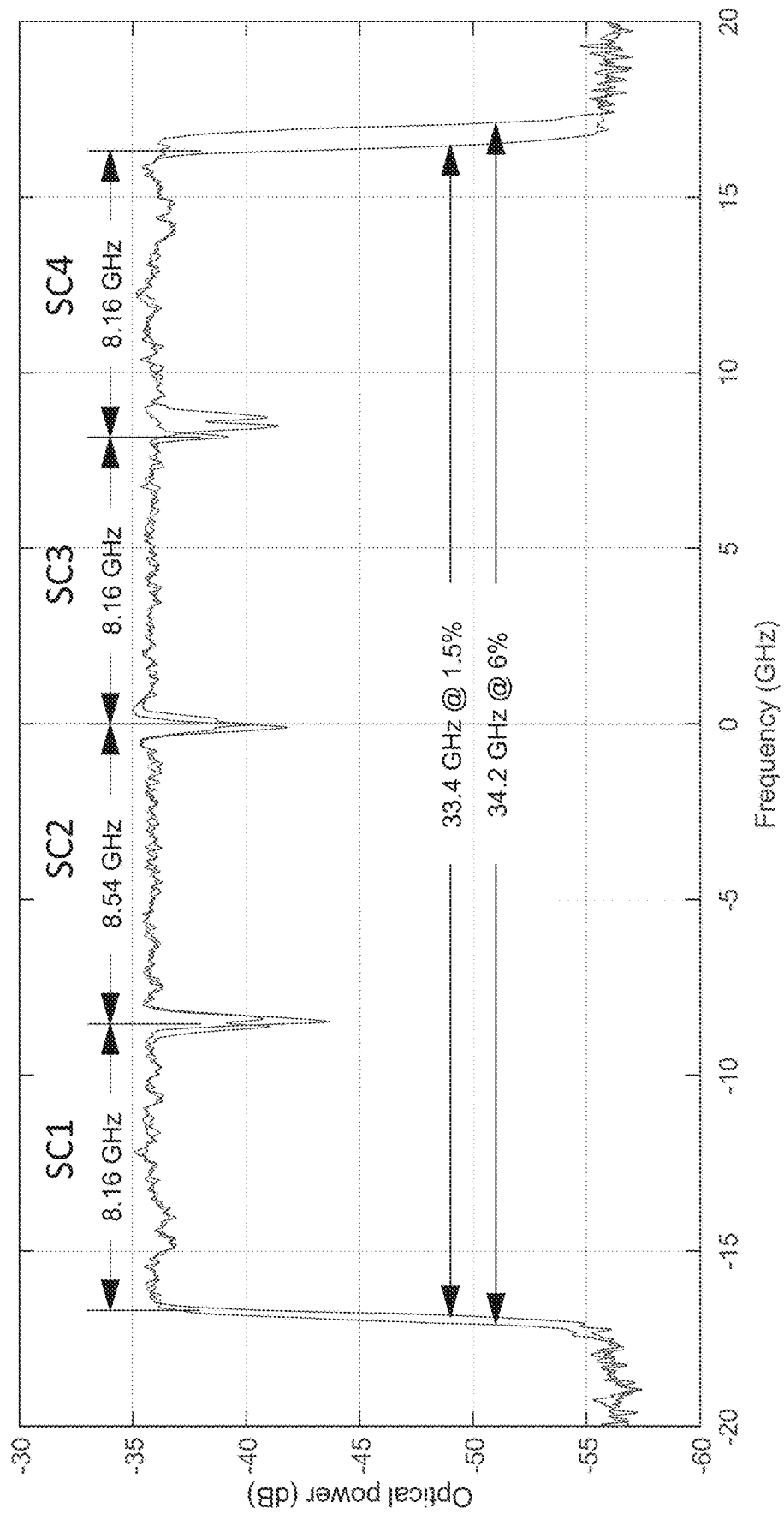
FIG. 4E illustrates another exemplary plurality of subcarriers consistent with an aspect of the present disclosure.

As illustrated in FIGS. 4D and 4E, in some implementations, the filter bandwidths for one or more of the four pulse shape filters 470 may be different that the filter bandwidths of one or more of the other pulse shape filters 470, thereby resulting in one or more of the subcarriers having a different bandwidth than one or more of the other subcarriers. Additionally or alternately, one or more of the four pulse shape filters 470 may have a different roll-off factor ($\alpha$) than one or more of the other pulse shape filters 470, thereby resulting in one or more subcarriers having a different bandwidth than the other subcarriers. For example, a first, third, and fourth of the pulse shape filters 470-1, 470-3, 470-4 may have a first roll-off factor (such as $\alpha=0.3$) while a second of the pulse shape filters 470-2 may have a roll-off factor different than the other three (such as $\alpha=0.7$), such that the first, third, and fourth subcarriers SC1, SC3, and SC4, have a first bandwidth and the second subcarrier SC2 has a second bandwidth different than the bandwidths of the other subcarriers. In some implementations, the subcarrier with the larger bandwidth than the other subcarriers may be used to carry clock-recovery information for a plurality of the subcarriers, as will be described in relation to FIG. 7.

In the example shown in FIG. 4E, the first subcarrier SC1 is shaped with 1.5% roll-off factor, for example; the second subcarrier SC2 is shaped with 6.25% roll-off factor, for example; and the third subcarrier SC3 and the fourth subcarrier SC4 are shaped with 1.5% roll-off factor, for example. A 1.5% roll-off factor on 8.39 GBaud maps to 8.16 GHz. In this example, total spectral width is reduced by 800 MHz in comparison to the example illustrated in FIG. 4D.

Referring now to FIG. 3 and FIGS. 5A-5D, in some implementations, the subcarriers may have gaps, or spacing, between the subcarriers created by the zero-bit-insertion-block circuitry components 475. The zero-bit-insertion-block circuitry components 475 may insert zeros or other bits within certain locations between the data from a first subcarrier and the data associated with one or more second subcarriers into the memory array 480, which may result in one or more frequency gaps between the optical subcarriers of varying or constant width, as described below.

Varying or controlling the frequency gap will next be described in greater detail with reference to FIG. 5A, which illustrates memory locations 0 . . . 2048 included in memory array 480. The memory array 480 may include, in one example, an array of such memory locations, whereby selected locations store complex numbers output from filters 470, as well as, in one example, 0 bits. Such complex numbers constitute filtered frequency domain data associated with each subcarrier. These numbers may then be output to IFFT component 490, which, in turn supplies a time domain signal, and, based on such time domain signal, analog signals are generated for driving modulators 340 to output the optical subcarriers. Thus, by selecting memory locations that store 0 bits and other locations that store the frequency domain data, the inputs to IFFT component 490 may be set to result in particular frequency assignments and spacings of the optical subcarriers.

In the example shown in FIG. 5A, filters 470-1 to 470-4 output frequency domain data to location groupings L1 to L4, respectively in memory 480. Each of memory location groupings L-1 to L-4 may store such frequency domain data as complex numbers, and each such complex number may be stored in a respective location in each grouping. In one example, each of memory location groupings L-1 to L-4 may have 256 locations, each of which storing a respective one of 256 complex numbers. In addition, zero-bit-insertion-block circuitry components 475 may provide zero bits or other numbers to location groupings Z1 to Z4, respectively, in memory 480. Memory location groupings Z1 to Z5 including those memory remaining locations in memory 480 other than the locations included in locations L1 to L4. When the resulting combination of numbers in location groupings L1 to L4 and the zero bits stored in locations Z1 to Z5 of memory 480 are output to the IFFT component 490, the IFFT component 490 outputs time domain signals, in digital form, that result in optical subcarriers SC1 to SC4 having frequencies f1 to f4, respectively, as shown in FIG. 5A, and associated frequency gaps G1-1 to G1-3, as further shown in FIG. 5A.

As further shown in FIG. 5A, the frequency domain data stored in locations L-1 is associated with and corresponds to data carried by subcarrier SC3; the frequency domain data stored in locations L-2 is associated with and corresponds to data carried by subcarrier SC4; the frequency domain data stored in locations L-3 is associated with and corresponds to data carried by subcarrier SC1; and the frequency domain data stored in locations L-1 is associated with and corresponds to data carried by subcarrier SC4.

Similarly, as shown in FIG. 5B, the filters 570-1 to 570-4 output frequency domain data to location groupings L2-1 to L2-4, respectively in the memory 480. In addition, zero-bit-insertion-block circuitry components 475 may provide zero bits to location groupings Z2-1 to Z2-4, respectively, in the memory 480. When the resulting combination of numbers stored in location groupings L1 to L4 and the zero bits stored in locations Z1 to Z5 of memory 480 are output to the IFFT component 490, the IFFT component 490 outputs time domain signals, in digital form, that result in optical subcarriers SC1 to SC4 having frequencies f1' to f4', respectively in FIG. 5B, and associated frequency gaps G2-1 to G2-3, as further shown in FIG. 5B. Frequencies f1' to f4' may differ from frequencies f1 to f4, and frequency gaps G2-1 to G2-3 may differ from frequency gaps G1 to G3. Thus, based on the locations frequency domain data and the zero bit data the gaps and frequencies of the subcarriers can be controlled or adjusted, such that different locations in which the frequency domain and zero bit data are stored can result in different subcarrier frequencies and gaps.

FIGS. 5C and 5D illustrate further examples of subcarriers having variable spacing between the subcarriers and varying combinations of spacing between groups of subcarriers. For example, in FIG. 5C, a first group of subcarriers SC1-SC4 in a first carrier C1 (such as from a first transmitter 212) are routed together, with a gap G2 between the first carrier C1 and a second carrier C2 (such as from a second transmitter 212) having a second group of subcarriers SC1-SC4. Additionally, FIG. 5C illustrates another pattern of carriers Cn−1, Cn, Cn+1, in which a pair of subcarriers SC2, SC4 from a first carrier Cn−1 are routed with a pair of subcarriers SC3, SC1 from a second subcarrier Cn; while a pair of subcarriers SC2, SC4 from the second carrier Cn are routed with a pair of subcarriers SC3, SC1 from a third subcarrier Cn+1; with a gap G2 between the first subcarrier SC1 in Cn−1 and the second subcarrier SC2 in Cn−1, and also with a gap G2 between the first subcarrier SC1 in Cn and the second subcarrier SC2 in Cn, and so on. The pattern of grouping of and spacing between subcarriers may repeat for multiple carriers Cn, or may vary. Each of carriers Cn may be supplied from a corresponding one of transmitters 370.

In another example, FIG. 5D illustrates a variety of combinations of routing of subcarriers with and without gaps between exemplary carriers C1, C2, C3, and C4 and/or subcarriers within the carriers Cn. In this example, an Intra-Carrier Gap (G) may be allocated between 0, 1, 2 or N of the subcarriers. The Intra-Carrier Gap (G) may be the total gap budgeted for the channel. The size of the gaps G1, G2, . . . Gn, between the subcarriers may range from zero GHz to a maximum of the total Intra-Carrier Gap G. In the example illustrated in FIG. 5D, G1=6.25 GHz. The frequency width of the subcarriers SC1, SC2, SC3, SC4 in a carrier Cn may vary. In the example of FIG. 5D, a combination of gaps G1 is used with the illustrated carriers C1-C4. For example, in carrier C1, a gap G1 is shown between each of the subcarriers SC1-SC4, and between the carrier C1 and the carrier C2. Further in this example, in carriers C2 and C3, no gap is shown between the respective subcarriers SC3 and SC1 or SC2 and SC4, while a gap G1 is shown between the respective subcarriers SC1 and SC2 and between the carrier C2 and the carrier C3. In the example, carrier 4 does not have gaps between the subcarriers or between carrier 4 and carrier 3, but does have a gap between carrier 4 and any additional carriers.

In one implementation, the subcarriers may not occupy the center frequency ω_c (that is, the laser wavelength). The frequency width of a carrier (Cn) may equal the sum of the frequency width of the subcarriers plus the sum of the frequency width of the gaps Gn (that is, the total Intra-Carrier Gap G). In another implementation, up to a maximum of half of the total Intra-Carrier gaps G may be allocated on either side of the center frequency ω_c, that is, the laser frequency. It will be understood that these combinations of spacing are exemplary, and that any combination of spacing between subcarriers and/or carriers may be used.

The variable spacing of the subcarriers may be based at least in part on the routing and/or destination of the subcarriers. For example, the types of filters in the OADMs 229 and/or their widths and/or the number of filters in the route through the optical network 200 that the subcarrier will take, as well as the number and locations of receivers 226, and the capacity of such receivers 226, may determine the number of subcarriers, the width of the subcarriers, the frequencies of the subcarriers, and/or the spacing between the subcarriers that are transmitted in a particular optical network 200. The spacing of the subcarriers may be based at least in part on one or more data rate of one or more of the subcarriers.

An example of subcarrier frequency selection based on filter bandwidth will next be described with reference to FIG. 5E. As noted above, optical signals including subcarriers may be output from transmitters 212 onto optical fiber link 230. The optical signals may be transmitted through OADMs 229-1 and 229-2 coupled along fiber link 230. Each of OADMs 229-1 and 229-2 may include wavelength selective switches, each of which may further including one or more optical filters. One of these optical filters provided in OADM 229-1, for example, may have a bandwidth or transmission characteristic 529-1 defined by edge frequencies f2 and f4, and at least one of the optical filters in OADM 229-2 may have a bandwidth or transmission characteristic 529-2 defined by frequencies f5 and f6. In order to transmit an optical subcarrier, such as optical subcarrier SC1 through filters in both OADM 229-1 and 229-2, the frequency of the optical subcarrier is preferably selected to be within a high transmission frequency range R that is common to both filter bandwidths 529-1 and 529-2. As further shown in FIG. 5E, range R is defined by edge frequency F4 of bandwidth 529-1 and edge frequency f5 of bandwidth 529-2. Accordingly, the frequency f1 of optical subcarrier SC1 is controlled or selected by controlling the subcarrier gap in a manner similar to that described above so that optical subcarrier SC1 falls within the high transmission frequency range R that is common to or overlaps between filter bandwidths 529-1 and 529-2.

Returning now to FIG. 1, in one example, optical subcarriers that are output from the transmitter 212 may be supplied to the multiplexer 216 and sent via the link 230 to one or more receiver module, such as receiver module 220, which may select data carried by one of such optical subcarriers, as described in greater detail below with reference to FIGS. 6 and 7.

At the receiver module 220, the optical subcarriers may be supplied to one or more of the receivers 226. FIG. 6 illustrates an exemplary one of the optical receivers 226 of the receiver module 220. The optical receiver 226 may include a polarization beam splitter 605 (having a first output 606-1 and a second output 606-2), a local oscillator laser 610, two ninety-degree optical hybrids or mixers 620-1 and 620-2 (referred to generally as hybrid mixers 620 and individually as hybrid mixer 620), two detectors 630-1 and 630-2 (referred to generally as detectors 630 and individually as detector 630, each including either a single photodiode or balanced photodiode), two analog-to-digital converters (ADCs) 640-1 and 640-2 (referred to generally as ADCs 640 and individually as ADC 640), and a receiver digital signal processor (RX DSP) 650.

The polarization beam splitter (PBS) 605 may include a polarization splitter that splits an input optical signal 607, having optical subcarriers, as noted above, into two orthogonal polarizations, such as the first polarization and the second polarization. The hybrid mixers 620 may combine the polarization signals with light from the local oscillator laser 610. For example, the hybrid mixer 620-1 may combine a first polarization signal (e.g., the component of the incoming optical signal having a first or TE polarization output from the first output 606-1) with the optical signal from the local oscillator 610, and the hybrid mixer 620-2 may combine a second polarization signal (e.g., the component of the incoming optical signal having a second or TM polarization output from the second output 606-2) with the optical signal from the local oscillator 610. In one example, a polarization rotator may be provided at the second output 606-2 to rotate the second polarization to be the first polarization.

The detectors 630 may detect mixing products output from the optical hybrid mixers 620, to form corresponding voltage signals. The ADCs 640 may convert the voltage signals to digital samples. For example, two detectors 630-1 (or photodiodes) may detect the first polarization signals to form the corresponding voltage signals, and a corresponding two ADCs 640-1 may convert the voltage signals to digital samples for the first polarization signals after amplification, gain control and AC coupling. Similarly, two detectors 630-2 may detect the second polarization signals to form the corresponding voltage signals, and a corresponding two ADCs 640-2 may convert the voltage signals to digital samples for the second polarization signals after amplification, gain control, and AC coupling.

The RX DSP 650 may process the digital samples for the first and second polarization signals to generate resultant data, which may be outputted as output data 652, such as Client Data Streams 352.

Figure 6:
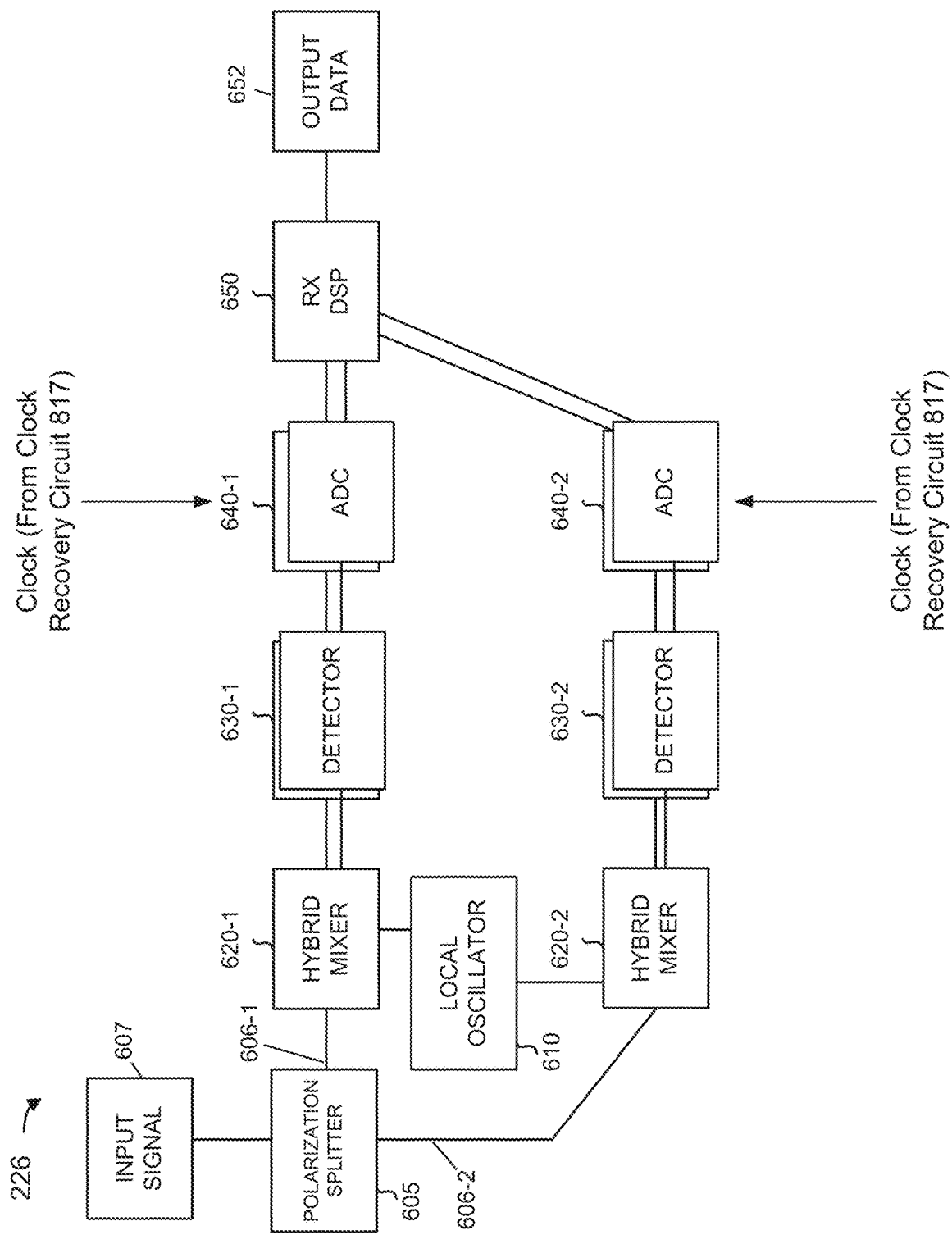
FIG. 6 is a diagram illustrating an example of components of an optical receiver shown in FIG. 1 consistent with an aspect of the present disclosure.

While FIG. 6 shows the optical receiver 226 as including a particular quantity and arrangement of components, in some implementations, the optical receiver 226 may include additional components, fewer components, different components, or differently arranged components. The quantity of detectors 630 and/or ADCs 640 may be selected to implement an optical receiver 226 that is capable of receiving a polarization diverse signal. In some instances, one of the components illustrated in FIG. 6 may perform a function described herein as being performed by another one of the components illustrated in FIG. 6.

Consistent with the present disclosure, in order to select one or more optical subcarriers at a remote node, the local oscillator laser 610 may be tuned to output light having a wavelength relatively close to the selected optical subcarrier(s) wavelength(s) to thereby cause a beating between the local oscillator light and the selected optical subcarrier(s). Such beating will either not occur or will be significantly attenuated for the other non-selected optical subcarriers so that data from the Client Data Stream(s) 352 carried by the selected optical subcarrier is detected and processed by the Rx DSP 650.

In the example shown in FIG. 6, appropriate tuning of the wavelength of the local oscillator laser 610 enables selection of one of the optical subcarriers, e.g., optical subcarrier SC1, carrying signals or data indicative of Client Data Stream 352-1. Accordingly, optical subcarriers may be effectively routed through the optical network 200 to a desired receiver 226 in a particular node of the optical network 200.

Accordingly, at each receiver 226, the local oscillator laser 610 may be tuned to have a wavelength close to that of one of the optical subcarriers carrying signals and data indicative of the desired client data from the Client Data Stream 352 to be output from the Rx DSP 650. Such tuning may be achieved by adjusting a temperature or current flowing through local oscillator laser 610, which may include a semiconductor laser, such as a distributed feedback (DFB) laser or distributed Bragg reflector (DBR) laser (not shown). Thus, different optical components in each receiver are not required to select optical signals carrying a desired data stream. Rather, as noted above, the same or substantially the same circuitry may be provided in the receiver module 220 of each node, in the optical network 200, and signal or data selection may be achieved by tuning the local oscillator laser 610 to the desired beating wavelength.

As further shown in FIG. 6, the Rx DSP 650 may have output data 652, such that based on such output, the temperature of, or the current supplied to, local oscillator laser 610 may be controlled. In the case of temperature control, a thin film heater may be provided adjacent local oscillator laser 610, and an appropriate current may be supplied to such heater, based on output 652, to heat laser 610 to the desired temperature. Control circuitry in the Rx DSP 650 may generate output or control the output signal 652. Additionally or alternatively, such circuitry may be provided outside the Rx DSP 650.

Figure 7:
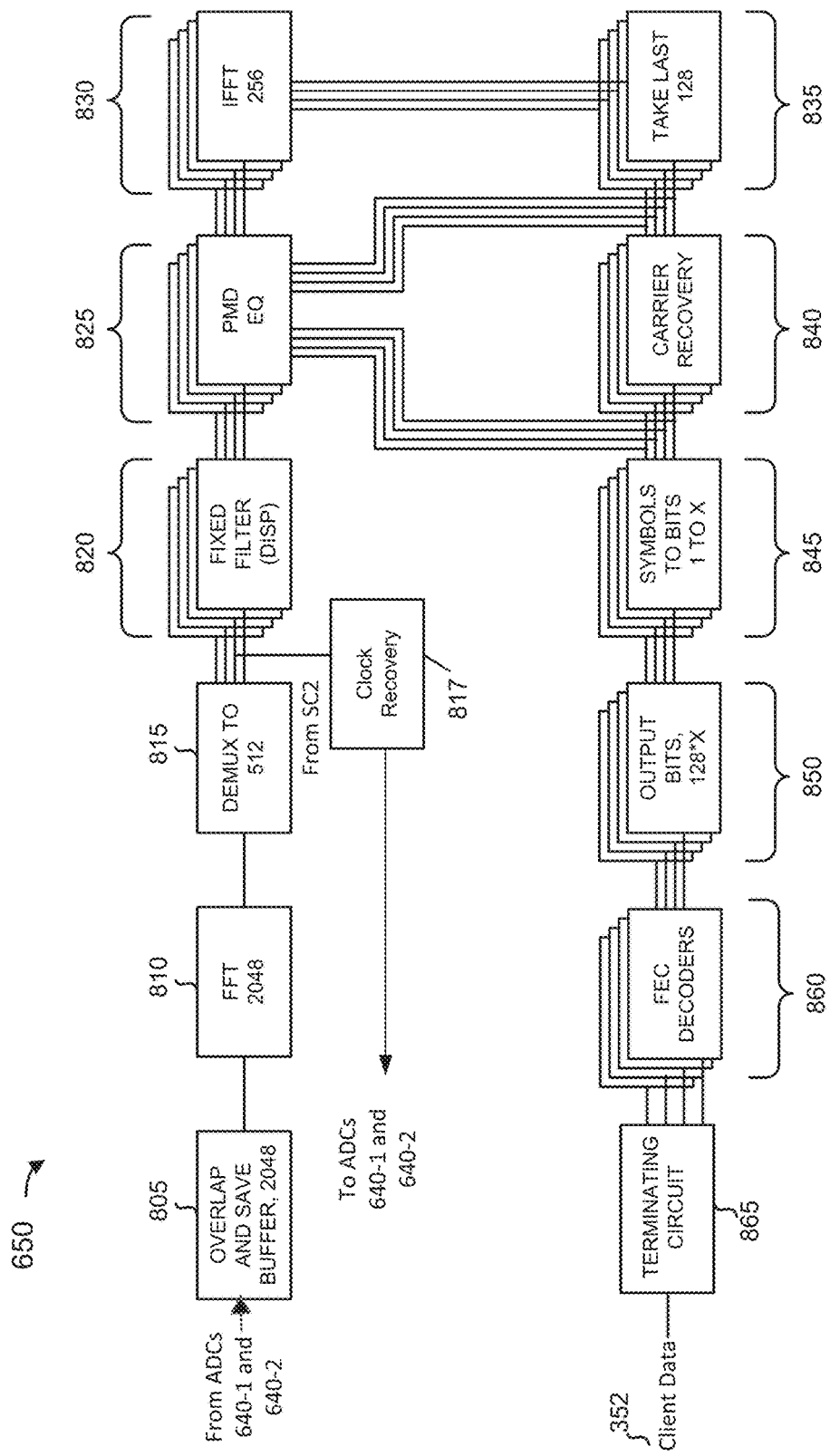
FIG. 7 is a diagram illustrating example components of an exemplary receiver digital signal processor (Rx DSP), such as that shown in FIG. 6, consistent with an aspect of the present disclosure.

FIG. 7 illustrates exemplary components of an example of the receiver digital signal processor (Rx DSP) 650 shown in FIG. 6. The RX DSP 650 may include an overlap and save buffer 805, a FFT component 810, a de-mux component 815, four fixed filters 820-1 to 820-4 (referred to generally as fixed filters 820 and individually as fixed filter 820), four polarization mode dispersion (PMD) components 825-1 to 825-4 (referred to generally as PMD components 825 and individually as PMD component 825), four IFFT components 830-1 to 830-4 (referred to generally as IFFT components 830 and individually as IFFT component 830), four take last 128 components 835-1 to 835-4 (referred to generally as take last 128 components 835 and individually as take last 128 component 835), four carrier recovery components 840-1 to 840-4 (referred to generally as carrier recovery components 840 and individually as carrier recovery component 840), four symbols to bits components 845-1 to 845-4 (referred to generally as symbols to bits components 845 and individually as symbols to bits component 845), four output bits components 850-1 to 850-4 (referred to generally as output bits components 850 and individually as output bits component 850), and four FEC decoders 860-1 to 860-4 (referred to generally as FEC decoders 860 and individually as FEC decoder 860). In one implementation, the receiver digital signal processor 650 may optionally include a clock recovery circuit 817.

In greater detail, the overlap and save buffer 805 may receive samples from the ADCs 640-1 and 640-2. In one implementation, the ADC 640 may operate to output samples at 64 GSample/s. The overlap and save buffer 805 may receive 1024 samples and combine the current 1024 samples with the previous 1024 samples, received from the ADC 640, to form a vector of 2048 elements. The FFT component 810 may receive the 2048 vector elements, for example, from the overlap and save buffer 805 and convert the vector elements to the frequency domain using, for example, a fast Fourier transform (FFT). The FFT component 810 may convert the 2048 vector elements to 2048 frequency bins as a result of performing the FFT.

The de-mux component 815 may receive the 2048 frequency bins or outputs from FFT component 810. The de-mux component 815 may demultiplex the 2048 frequency bins to element vectors for each of the subcarriers, for example, 512 vectors, which may have, in one example an associated baud rate of 8 Gbaud.

In some implementations, clock and/or phase recovery circuitry 817 may be connected or coupled between the de-mux component 815 and the filter 820. In cases where one of the subcarriers (such as SC2 in FIGS. 4H-4I) has a wider bandwidth, due to a corresponding roll-off in the associated transmitter filter 470 discussed above, than the other subcarriers, the wider subcarrier SC2 may be selected from the output of the de-mux component 815 for clock recovery and the recovered or detected clock or phase related signal may be provided to the ADCs 640 in the receiver 226 (see FIG. 6). The clock may be used to set and/or adjust the timing of sampling of the ADCs 640 for the plurality of the subcarriers.

The clock may be recovered using information from all subcarriers, or from fewer than all the subcarriers, or just from one subcarrier. In some implementations, clock recovery with the clock recovery circuit 817 in the RX DSP 650 of the receiver 226 is based on the subcarrier with the widest bandwidth and associated filter 470 having a corresponding roll-off (such as subcarrier SC2 in FIGS. 4D and 4E). The subcarrier with the widest bandwidth may be used to recover the clock signal and such clock signal may be used for the other ADCs 640.

In one example, where the data associated with more than one of subcarriers SC1-SC4, such as subcarriers SC2 and SC3, is to be output from the receiver 226, the clock recovered from the widest subcarrier SC2 may be used as the clock for the other subcarriers SC1, SC3, and SC4. As noted above, by reducing the frequency bandwidth of the other subcarriers SC1, SC3, and SC4, more subcarriers fit in a given spectrum or bandwidth to thereby increase overall capacity (as shown in FIGS. 4H and 4I). In one example, where each node outputs the data of only one subcarrier SC1, clock recovery may be performed based on the corresponding subcarrier SC1 to be detected at that node 202.

Fixed filters 820 may apply a filtering operation for, for example, dispersion compensation or other relatively slow varying impairment of the transmitted optical signals and subcarriers. The fixed filters 820 may also compensate for skew across subcarriers introduced in the link 230, or skew introduced intentionally in optical transmitter 212.

The PMD component 825 may apply polarization mode dispersion (PMD) equalization to compensate for PMD and polarization rotations. The PMD component 825 may also receive and operate based upon feedback signals from the take last 128 component 835 and/or the carrier recovery component 840.

The IFFT component 830 may covert the 512 element vector, in this example, (after processing by the fixed filter component 820 and the PMD component 825) back to the time domain as 512 samples. The IFFT component 830 may convert the 512 element vector to the time domain using, for example, an inverse fast Fourier transform (IFFT). The take last 128 component 835 may select the last 128 samples from the IFFT component 830 and output the 128 samples to the carrier recovery component 840.

The carrier recovery component 840 may apply carrier recovery to compensate for transmitter and receiver laser linewidths. In some implementations, the carrier recovery component 840 may perform carrier recovery to compensate for frequency and/or phase differences between the transmit signal and the signal from the local oscillator 610. After carrier recovery, the data may be represented as symbols in the QPSK constellation or other modulation formats. In some implementations, the output of the take last 128 component 835 and/or the carrier recovery component 840 could be used to update the PMD component 825.

The symbols to bits component 845 may receive the symbols output from the carrier recovery component 840 and map the symbols back to bits. For example, the symbol to bits component 845 may map one symbol, in the QPSK constellation, to X bits, where X is an integer. For dual-polarization QPSK, X is four. In some implementations, the bits could be decoded for error correction using, for example, FEC. The output bits component 850 may output 128*X bits at a time, for example. For dual-polarization QPSK, the output bits component 850 may output 512 bits at a time, for example.

The FEC decoder 860 may process the output of the output bits component 850 to remove errors using forward error correction. As further shown in FIG. 7, a switch, blocking, or terminating circuit 865 may be provided to terminate one or more client data streams 352 that are not intended for output from receiver 226.

While FIG. 7 shows the RX DSP 650 as including a particular quantity and arrangement of functional components, in some implementations, the RX DSP 650 may include additional functional components, fewer functional components, different functional components, or differently arranged functional components.

In some implementations, the subcarriers may have variable and flexible capacity per subcarrier, but fixed subcarrier width such as a fixed baud rate per subcarrier. Such parameters may be selected or set in a manner similar to that described above. An exemplary optical network 200 having subcarriers with flexible capacity and fixed width may include independent clock and carrier recovery for each subcarrier or the clock recovery for one subcarrier may be used for other subcarriers, as described previously. FIGS. 8A-8G illustrates some such examples in use. For explanatory purposes, FIGS. 8A-8G illustrate use case examples with a constant baud rate of 16 GHz per subcarrier. The subcarriers for each example may be transmitted from one transmitter 212 or from a combination of two or more transmitters 212.

Figure 8:
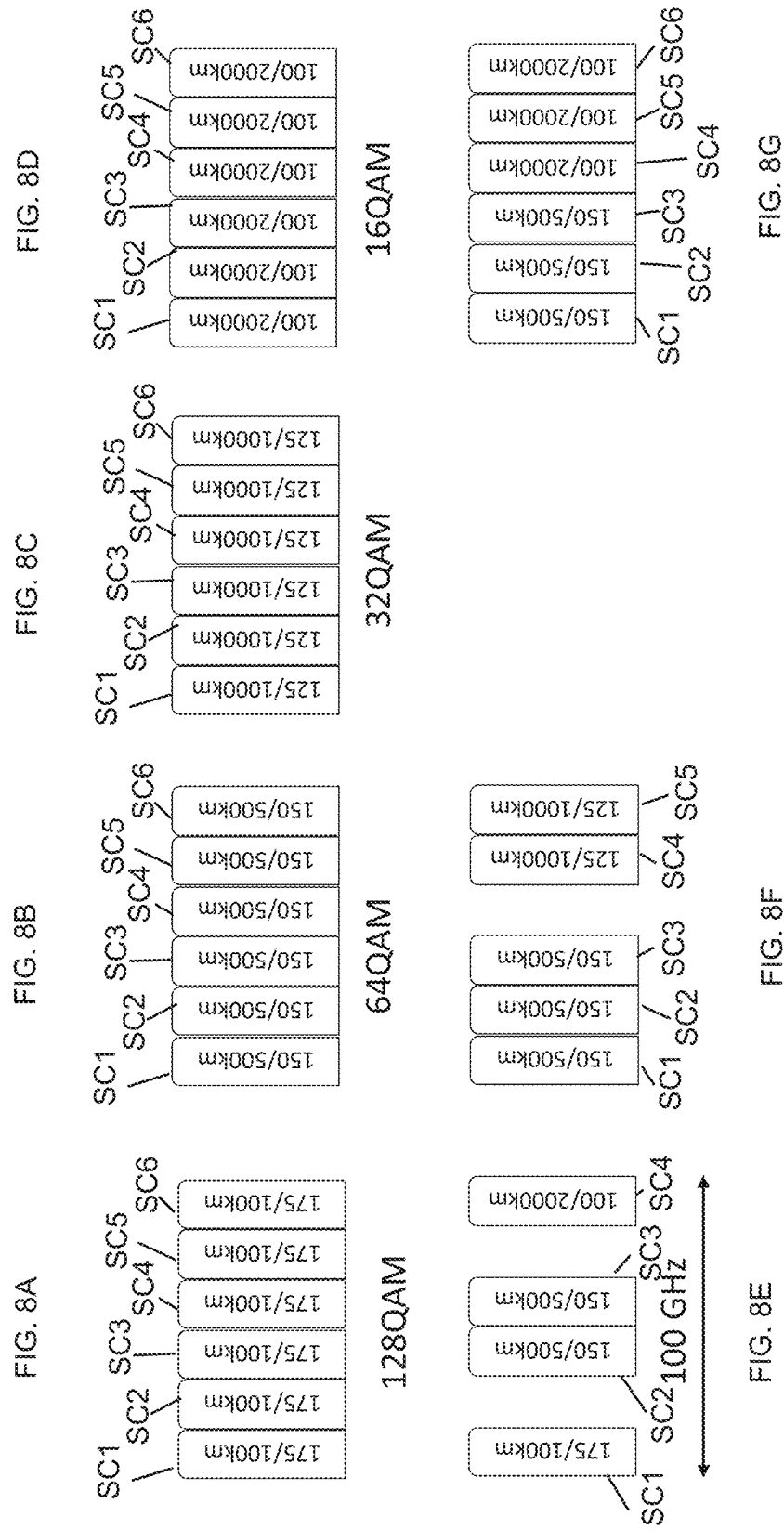
FIG. 8A is an illustration of a use case example of subcarriers having fixed subcarrier width and variable capacity per subcarrier consistent with an aspect of the present disclosure.
FIG. 8B is an illustration of another use case example of subcarriers having fixed subcarrier width and variable capacity per subcarrier consistent with an aspect of the present disclosure.
FIG. 8C is an illustration of another use case example of subcarriers having fixed subcarrier width and variable capacity per subcarrier consistent with an aspect of the present disclosure.
FIG. 8D is an illustration of another use case example of subcarriers having fixed subcarrier width and variable capacity per subcarrier consistent with an aspect of the present disclosure.
FIG. 8E is an illustration of another use case example of subcarriers having fixed subcarrier width and variable capacity per subcarrier consistent with an aspect of the present disclosure.
FIG. 8F is an illustration of another use case example of subcarriers having fixed subcarrier width and variable capacity per subcarrier consistent with an aspect of the present disclosure.
FIG. 8G is an illustration of another use case example of subcarriers having fixed subcarrier width and variable capacity per subcarrier consistent with an aspect of the present disclosure.

In the example of FIG. 8A, the subcarriers SC1-SC6 are modulated at 128QAM to be transferred 100 km, with a constant baud rate of 16 GHz per subcarrier, and 175 G bit rate per subcarrier. In the example of FIG. 8B, the subcarriers SC1-SC6 are modulated at 64QAM to be transferred 500 km, with a constant baud rate of 16 GHz per subcarrier, and 150 G bit rate per subcarrier. In the example of FIG. 8C, the subcarriers SC1-SC6 are modulated at 32QAM to be transferred 1000 km, with a constant baud rate of 16 GHz per subcarrier, and 125 G bit rate per subcarrier. In the example of FIG. 8D, the subcarriers SC1-SC6 are modulated at 16QAM to be transferred 2000 km, with a constant baud rate of 16 GHz per subcarrier, and 100 G bit rate per subcarrier.

In the example of FIG. 8E, the subcarriers SC1-SC4 are modulated at 128QAM to be transferred a variety of distances, with a constant baud rate of 16 GHz per subcarrier, with a variety of bit rates per subcarrier, and illustrating frequency spacing between subcarrier SC1 and subcarrier SC2, as well as between subcarrier SC3 and subcarrier SC4, such as described in relation to FIGS. 5A-5D. In the example of FIG. 8F, the subcarriers SC1-SC5 are modulated at 64QAM to be transferred a variety of distances, with a constant baud rate of 16 GHz per subcarrier, with a variety of bit rates per subcarrier, and illustrating frequency spacing between subcarrier SC3 and subcarrier SC4, such as described in relation to FIGS. 5A-5D. In the example of FIG. 8G, the subcarriers SC1-SC6 are modulated at 16QAM to be transferred a variety of distances, with a constant baud rate of 16 GHz per subcarrier, and with a variety of bit rates per subcarrier.

Though the examples of FIGS. 8A-8G show particular exemplary configurations of subcarriers having variable and flexible capacity per subcarrier, and having fixed subcarrier width such as a fixed baud rate per subcarrier, the subcarriers may have any combination of data rates, modulations, spacing, and/or number of subcarriers, and/or other configuration factors. Additionally, two or more of the subcarriers may be provided from one transmitter 212 or from two or more transmitters 212 and from one transmitter module 210 or from two or more transmitter modules 210. The particular combination and/or configuration of subcarriers used may be based on requirements for transmission distance, data rates, error rates, and/or filter configurations, for example.

In some implementations, the subcarriers may have flexible width, but the capacity of each subcarrier may be fixed. Such parameters may be set in a manner similar to that described above. To maintain a constant bit rate, the width of the subcarriers may vary as discussed above, but the data rate may be controlled to be the same as further noted above. An exemplary optical network 200 having subcarriers with flexible width and fixed capacity may include independent clock and carrier recovery for each subcarrier (though the subcarriers may optionally be tied together). The position of the subcarriers may be arbitrary within the analog bandwidth, as described above. FIGS. 9A-9D illustrates some such examples in use. For explanatory purposes, the capacity of each subcarrier in FIGS. 9A-9D may be fixed at 100 G per subcarrier.

Figure 9:
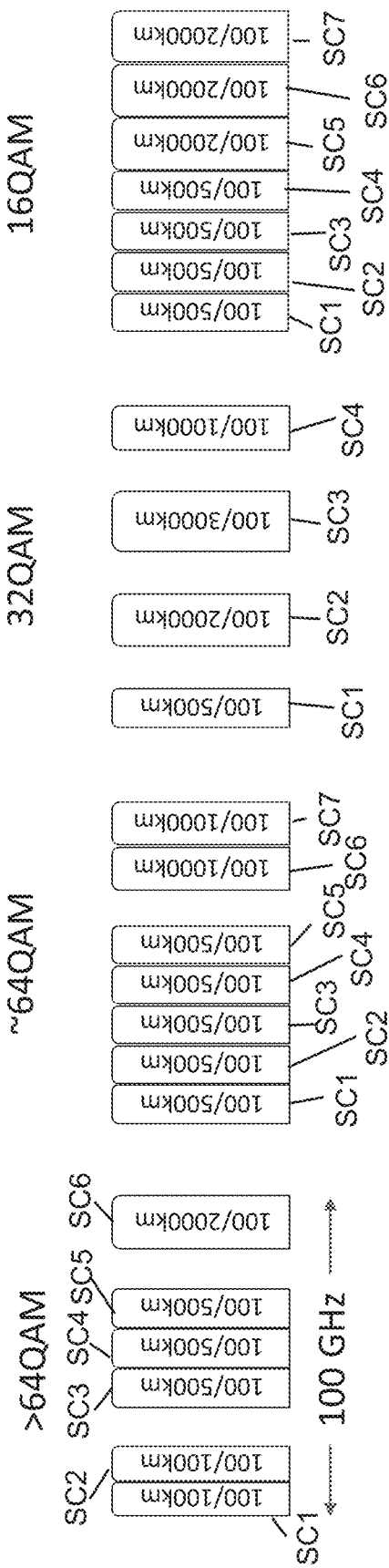
FIG. 9A is an illustration of a use case example of subcarriers having fixed capacity and variable subcarrier width consistent with an aspect of the present disclosure.
FIG. 9B is an illustration of another use case example of subcarriers having fixed capacity and variable subcarrier width consistent with an aspect of the present disclosure.
FIG. 9C is an illustration of another use case example of subcarriers having fixed capacity and variable subcarrier width consistent with an aspect of the present disclosure.
FIG. 9D is an illustration of another use case example of subcarriers having fixed capacity and variable subcarrier width consistent with an aspect of the present disclosure.

In the example of FIG. 9A, the subcarriers SC1-SC6 are modulated at greater than 64QAM to be transferred a variety of distances with a constant bit rate of 100 G and illustrating frequency spacing between subcarrier SC2 and subcarrier SC3, as well as between subcarrier SC5 and subcarrier SC6, such as described in relation to FIGS. 5A-5D. In the example of FIG. 9B, the subcarriers SC1-SC7 are modulated at approximately 64QAM to be transferred a variety of distances with a constant bit rate of 100 G and illustrating frequency spacing between subcarrier SC5 and subcarrier SC6, such as described in relation to FIGS. 5A-5D.

In the example of FIG. 9C, the subcarriers SC1-SC4 are modulated at 32QAM to be transferred a variety of distances with a constant bit rate of 100 G and illustrating frequency spacing between subcarrier SC1 and subcarrier SC2 and subcarrier SC3 and subcarrier SC4, such as described in relation to FIGS. 5A-5D. In the example of FIG. 9D, the subcarriers SC1-SC7 are modulated at 16QAM to be transferred a variety of distances with a constant bit rate of 100 G.

Though the examples of FIGS. 9A-9D show particular exemplary configurations of subcarriers having flexible width, but the capacity of each subcarrier may be fixed, the subcarriers may have any combination of widths, modulations, spacing, and/or number of subcarriers and/or other configuration factors. Additionally, two or more of the subcarriers may be provided from one transmitter 212 or from two or more transmitters 212 and from one transmitter module 210 or from two or more transmitter modules 210. The particular combination and/or configuration of subcarriers used may be based on requirements for transmission distance, data rates, error rates, and/or filter configurations, for example.

Figure 10:
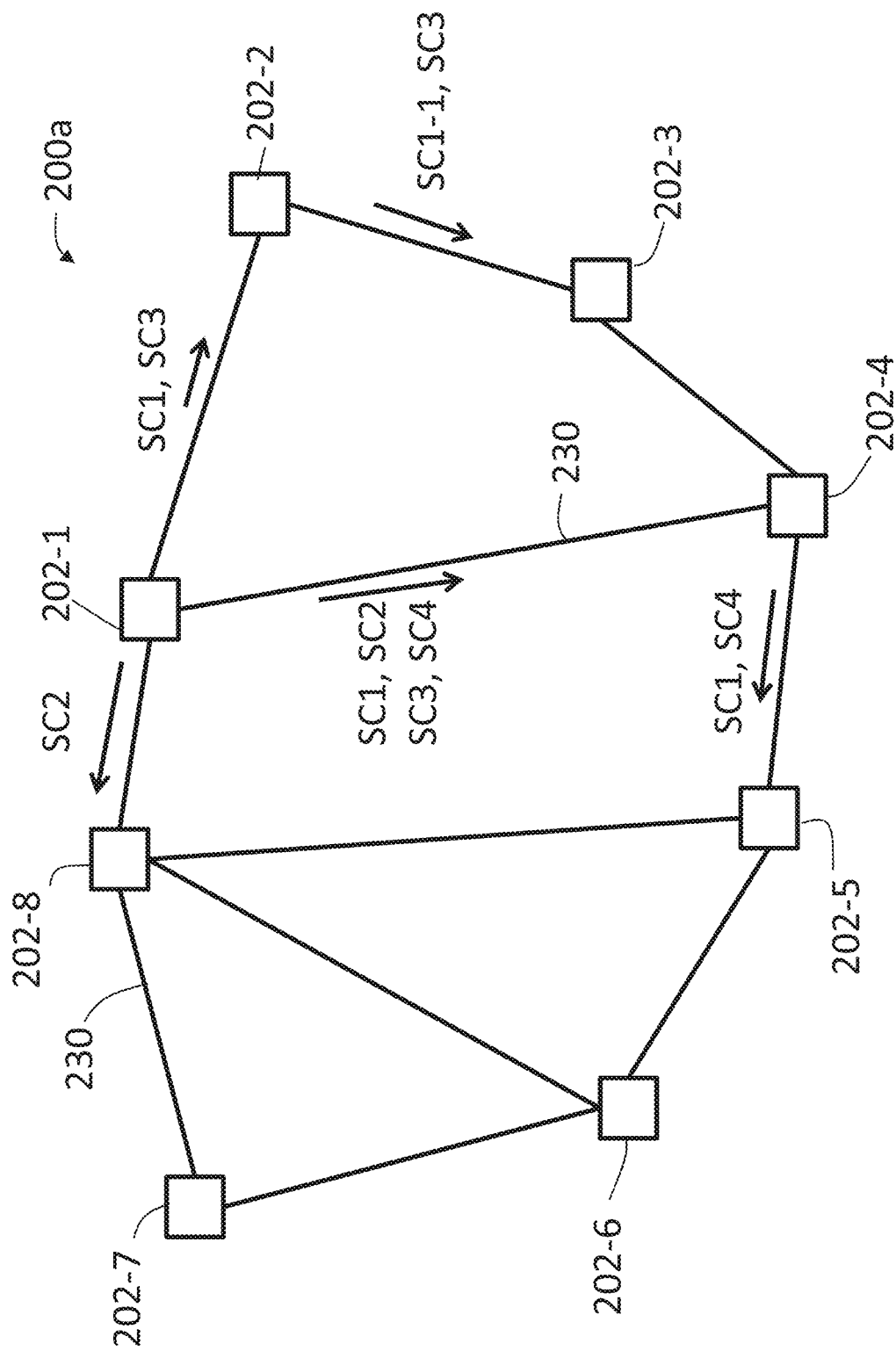
FIG. 10 illustrates an exemplary mesh network configuration consistent with a further aspect of the present disclosure.

FIG. 1, discussed above, shows an example of an optical network 200 having a point-to-point configuration. It is understood, that other network or system configurations or architectures are contemplated herein. Examples of such architectures are discussed in greater detail below. The optical subcarriers may be transmitted and received in a variety of types of optical networks 200. For example, FIG. 10 illustrates an exemplary optical network 200a having a mesh network configuration consistent with a further aspect of the present disclosure. The mesh network configuration may include three or more nodes 202-1 to 202-n (referred to as nodes 202 and individually as node 202), each node 202 having at least one of the transmitter module 210 and the receiver module 220 such as previously described, but not shown in FIG. 10 for purposes of clarity. The nodes 202 may be interconnected by one or more of the links 230, thereby forming a mesh configuration. For purposes of clarity, not all links 230 are numbered in FIG. 10.

In the optical network 200*a*, one or more optical subcarriers, such as optical subcarriers SC1-SC4, may be routed to different nodes 202 in the optical network 200*a*. For example, a first optical subcarrier SC1 may be routed from node 202-1 to node 202-2, while a second optical subcarrier SC2 may be routed from node 202-1 to node 202-8. In the optical network 200*a*, one or more optical subcarriers, such as optical subcarriers SC1-SC4, may be directed to the same node 202. For example, four optical subcarriers SC1-SC4 may be routed from node 202-1 to node 202-4.

In the optical network 200*a*, a particular node 202 may detect multiple optical subcarriers or may be configured to detect only particular optical subcarriers or one optical subcarrier. For example, node 202-4 may receive four optical subcarriers SC1-SC4 and detect two optical subcarriers SC1 and SC4.

In some implementations, a particular node 202 may receive a plurality of optical subcarriers, and transfer on to another node 202 different data in one or more of the optical subcarriers. For example, node 202-2 may receive optical subcarriers SC1 and SC3, but may place new data into optical subcarrier SC1-1 and transmit the optical subcarriers SC1-1 and SC3 to node 202-3.

Figure 11A:
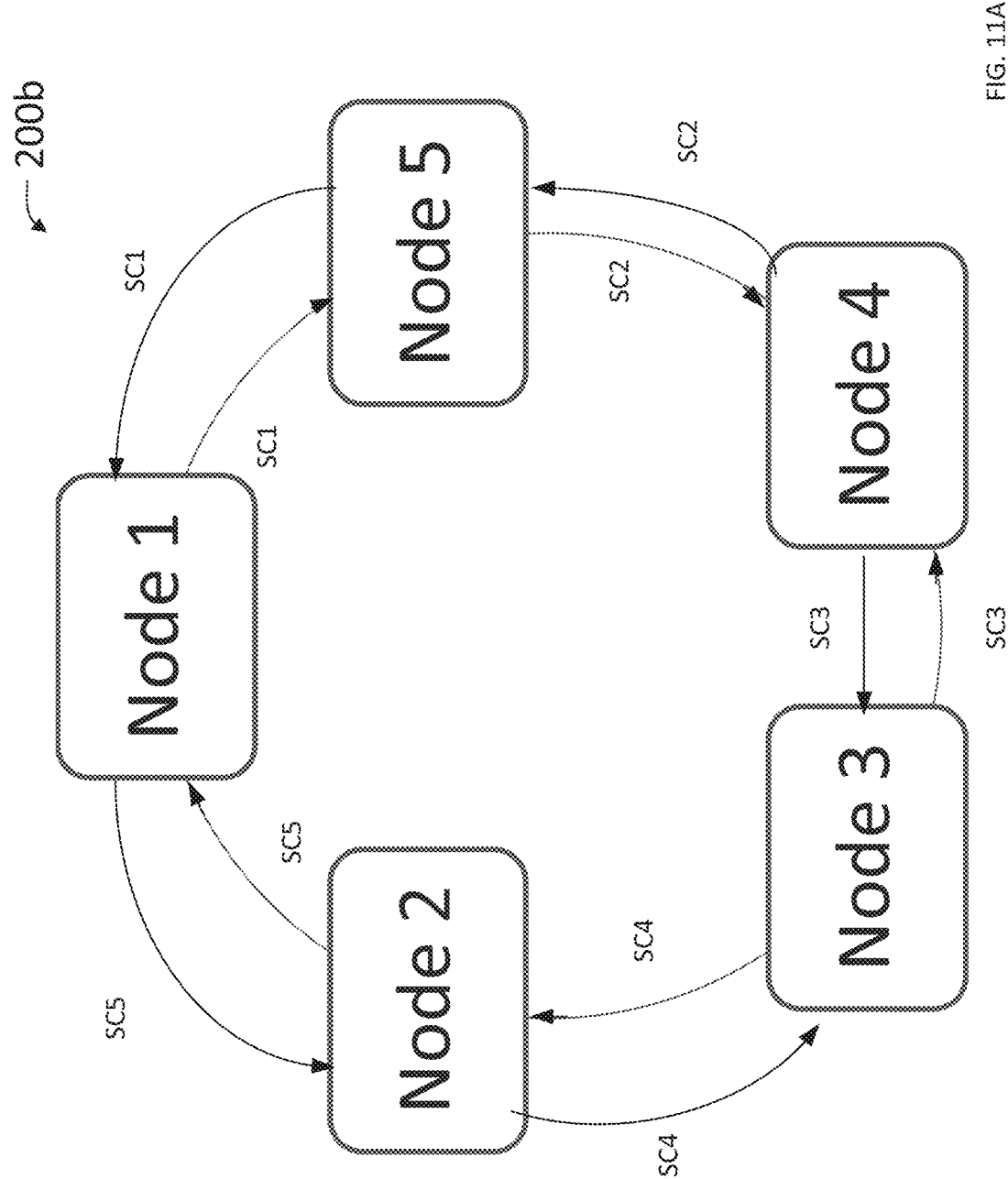
FIG. 11A illustrates an exemplary ring network configuration consistent with a further aspect of the present disclosure.

FIG. 11A illustrates an exemplary optical network 200*b* having a ring network configuration consistent with a further aspect of the present disclosure. The ring network configuration may include three or more of the nodes 202 interconnected by two or more of the links 230 to form a ring. The links 230 may be bi-directional between the nodes 202. In the example illustrated in FIG. 11A, a simple ring configuration is shown having five nodes 202, though it will be understood that a different number of nodes 202 in a ring configuration may be included. Such a configuration reduces the number of optics assemblies (transmitter and receiver) from two sets per node 202 to one set per node 202. However, one of the nodes 202 in the optical network 200*b* (here, illustrated as Node 1) may still utilizing two sets of optics assemblies, such as two sets of transmitters 212 and receivers 226.

One or more optical subcarriers may be transmitted within the optical network 200*b*. In this example of the optical network 200*b* in the ring network configuration, subcarriers SC1-SC5 may be transmitted within the optical network 200*b*. For example, a first optical subcarrier SC1 may be transmitted bi-directionally on bi-directional fibers between Node 1 and Node 5. Similarly, a second optical subcarrier SC2 may be transmitted bi-directionally on bi-directional fibers between Node 5 and Node 4; a third optical subcarrier SC3 may be transmitted bi-directionally on bi-directional fibers between Node 4 and Node 3; a fourth optical subcarrier SC4 may be transmitted bi-directionally on bi-directional fibers between Node 3 and Node 2; and a fifth optical subcarrier SC5 may be transmitted bi-directionally on bi-directional fibers between Node 2 and Node 1.

Figure 11B:
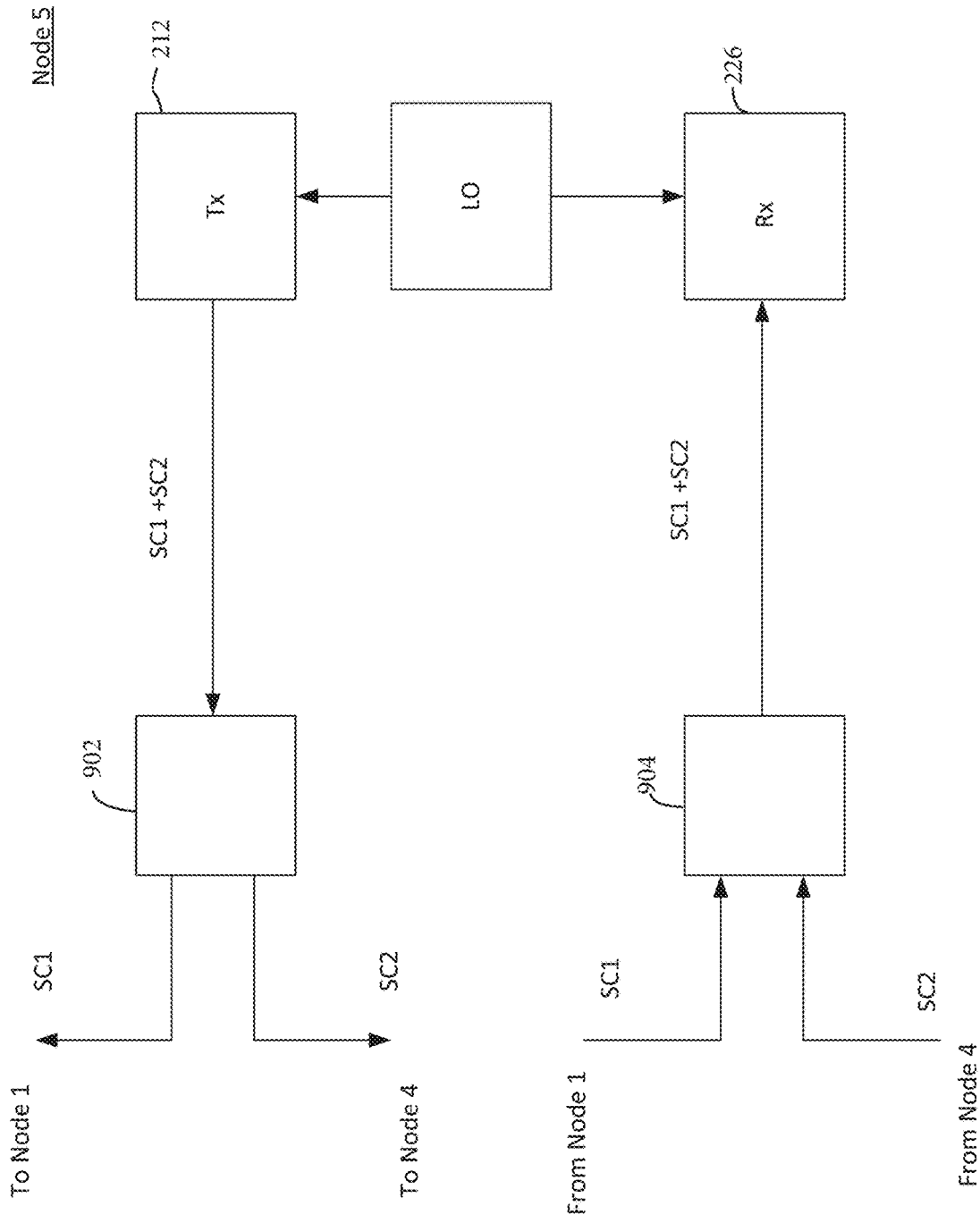
FIG. 11B illustrates exemplary components of a node of the network of FIG. 11A consistent with a further aspect of the present disclosure.

FIG. 11B illustrates exemplary components of Node 5, comprising a transmitter 212, a receiver 226, a laser (LO), a de-mux component 902, and a combiner component 904. The de-mux component 902 may be configured to split the optical subcarriers from the transmitter to direct the optical subcarriers to particular other nodes. In this example, the de-mux component 902 may split the optical subcarriers SC1 and SC2 from the transmitter 212 to direct optical subcarrier SC1 to Node 1 and optical subcarrier SC2 to Node 4. The combiner component 904 may be configured to combine the optical subcarriers entering Node 5 to the receiver 226. In this example, the de-mux component 902 may combine the optical subcarriers SC1 and SC2.

Figure 12A:
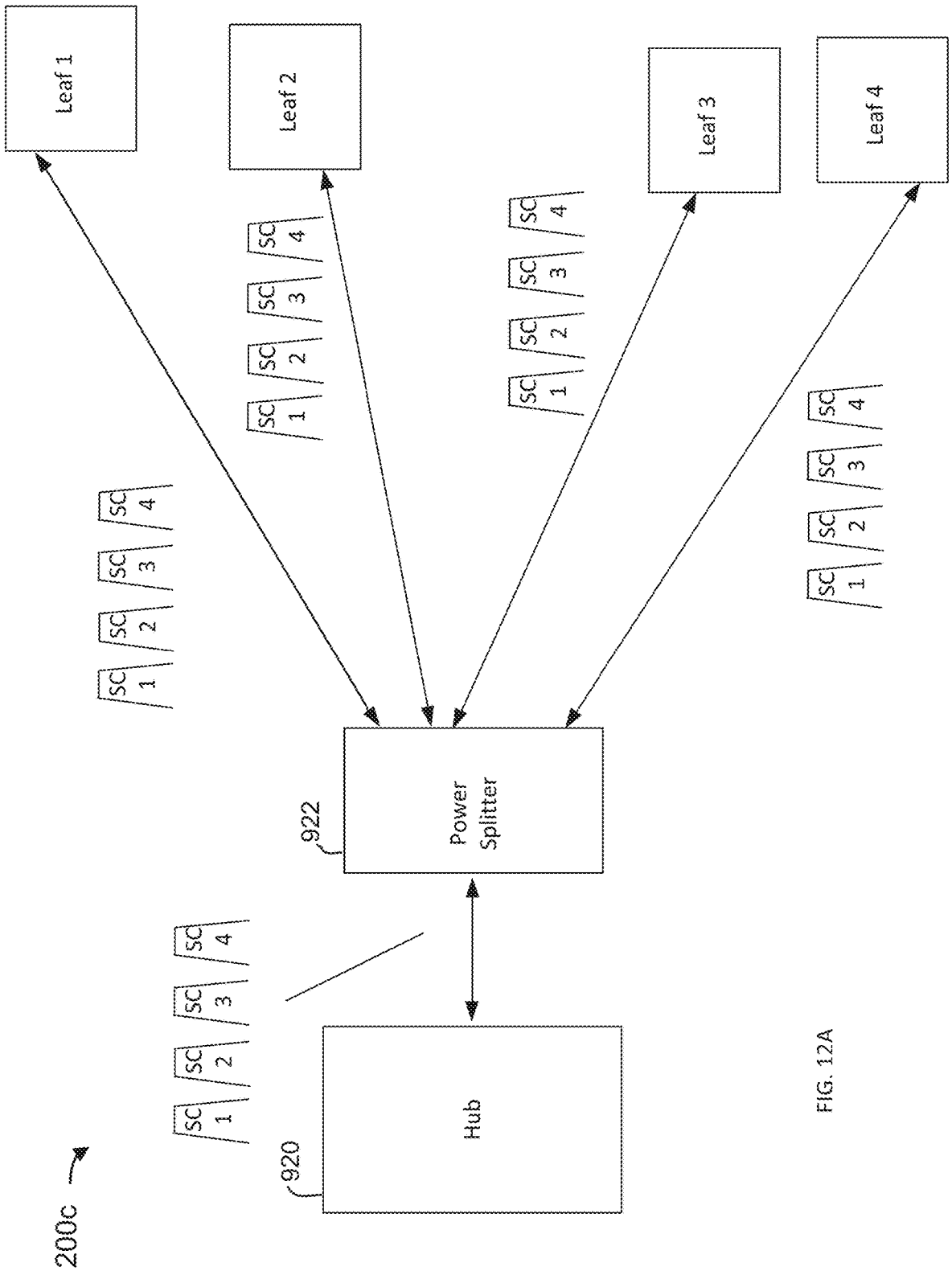
FIG. 12A illustrates an exemplary network configuration consistent with a further aspect of the present disclosure.

FIG. 12A illustrates an exemplary optical network 200*c* having a hub configuration consistent with a further aspect of the present disclosure. The optical network 200*c* may comprise a hub 920, a power splitter 922, and two or more leaf nodes.

The hub 920 may have a transmitter 212 and a receiver 226. The hub 920 may output a plurality of subcarriers, such as, for example, SC1-SC4, to the power splitter 922. The power splitter 922 may supply a power split portion of the plurality of optical subcarriers to one or more leaf node, such as, for example, Leaf 1-4. Each Leaf Node may comprise a receiver 226 that may receive all the optical subcarriers SC1-SC4 and that may output less than all of the data from the client data streams of all of the optical subcarriers. For example, Leaf 1 may detect all of the optical subcarriers SC1-SC4, but may output the data from the data stream from one of the optical subcarriers SC1. As described above regarding FIG. 7, the switch, blocking, or terminating circuit 865 in the receiver 226, may select one of the optical subcarriers (or less than all of the optical subcarriers) and may output data from one of the client data streams 352 (or less than all of the data streams).

Figure 12B:
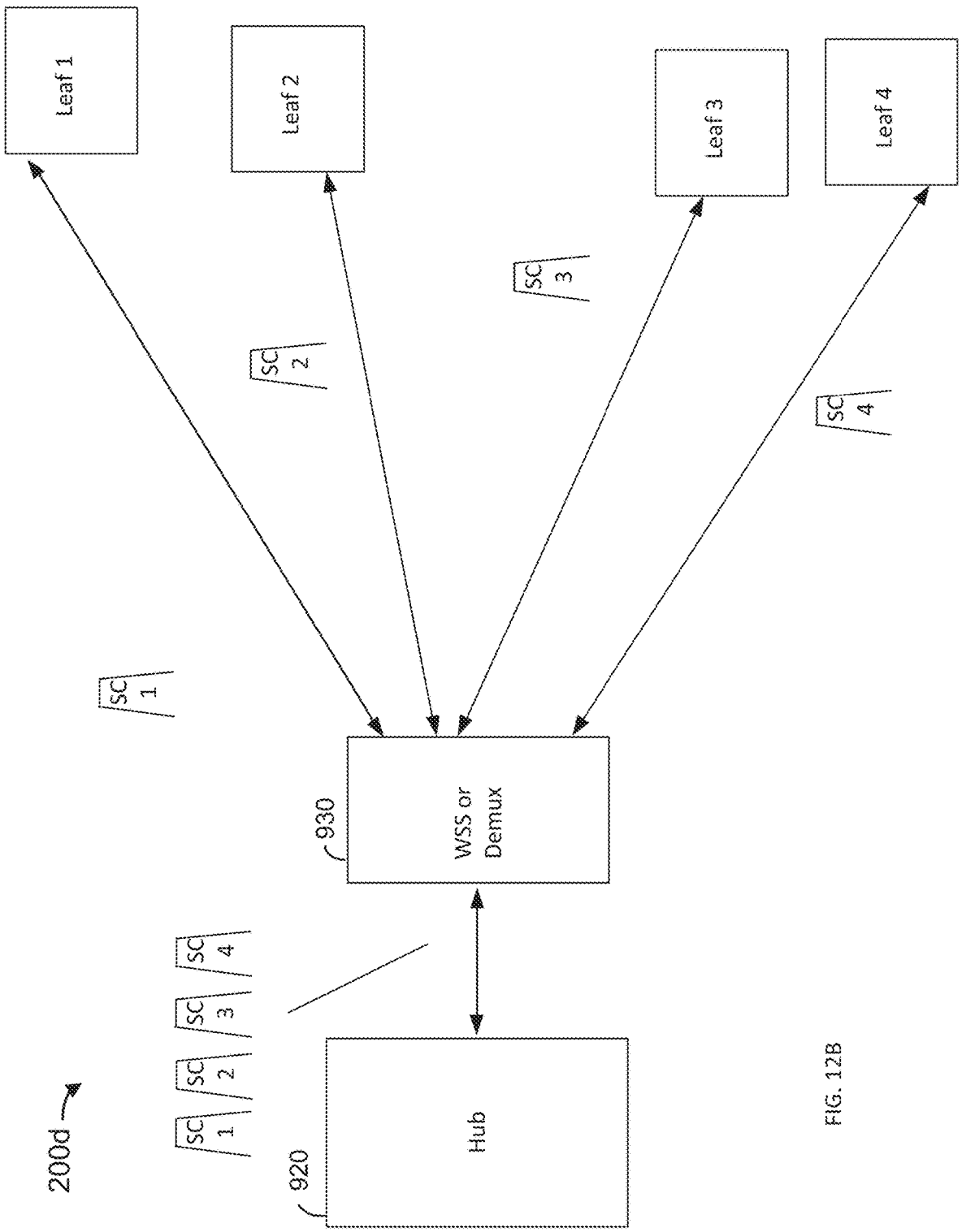
FIG. 12B illustrates another exemplary network configuration consistent with a further aspect of the present disclosure.

FIG. 12B illustrates an exemplary optical network 200*d* having a hub configuration consistent with a further aspect of the present disclosure. The optical network 200*c* may comprise a hub 920, wavelength selective switch (WSS) or de-mux component 930, and two or more leaf nodes (Leaf 1-Leaf 4). The WSS or de-mux component 930 may output less than all of the optical subcarriers received from the hub 920 to a particular one of the leaf nodes. For example, the hub 920 may output a plurality of optical subcarriers, for example, SC1-SC4 to the WSS or de-mux component 930, and the WSS or de-mux component 930 may output less than all of the plurality of optical subcarriers to the leaf nodes, such as, for example, outputting optical subcarrier SC1 to Leaf 1, while not outputting optical subcarriers SC2-SC4 to Leaf 1. Additionally, the leaf nodes may each, on a separate fiber, transmit a corresponding optical subcarrier back to the WSS or de-mux component 930, which may detect all of the optical subcarriers SC-SC4 and output them to the hub 920.

Figure 13:
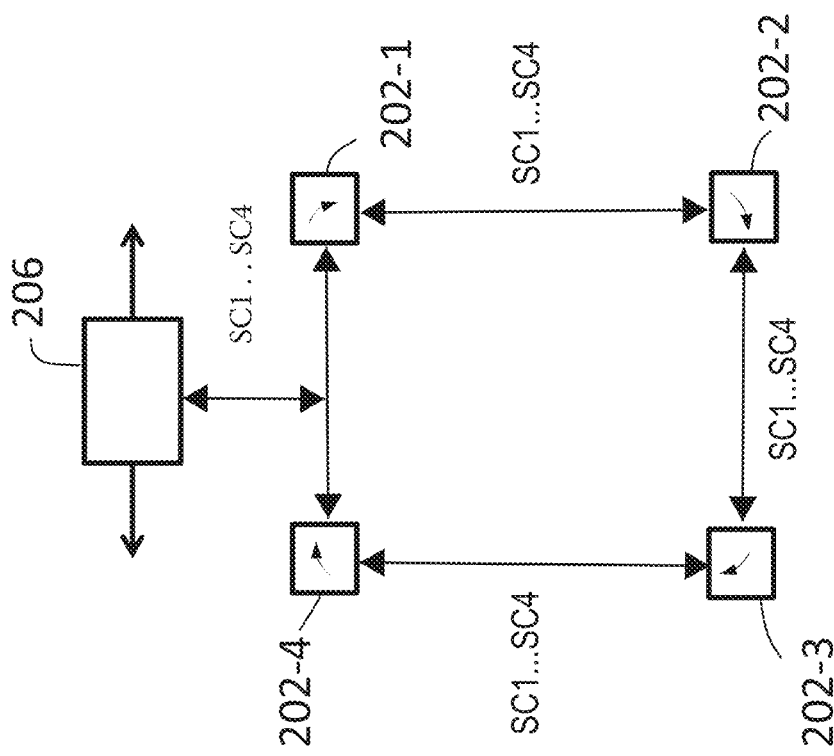
FIG. 13 illustrates an exemplary ring and hub network configuration consistent with a further aspect of the present disclosure.

FIG. 13 illustrates an exemplary optical network 200*e* having a ring and hub network configuration consistent with a further aspect of the present disclosure. The optical network 200*d* may include two or more nodes 202 interconnected with one another, such as exemplary nodes 202-1 to 202-4, and further interconnected with at least one hub 206. The hub 206 may comprise a transmitter 212 and a receiver 226 and may send and receive a plurality of optical subcarriers, such as, for example, SC1-SC4. Each of the nodes 202-1 to 202-4 on the ring may detect and output the data associated with a particular optical subcarrier of the plurality of subcarriers. A particular node may also transmit new data on the particular subcarrier. The optical network 200*e* may have bi-directional fibers between nodes 202 for bi-directional transmission. In some implementations, a plurality of optical subcarriers may all be transmitted to all of the nodes 202, and each particular node 202 may extract and add a particular subcarrier from the plurality of subcarriers. For example, subcarriers SC1-SC4 may be sent to node 202-1, which may extract data from optical subcarrier SC1 and add data to optical subcarrier SC1 and transmit all of the optical subcarriers SC1-SC4 on to node 202-2. Node 202-2 may receive all of the optical subcarriers SC1-SC4, and may extract data from optical subcarrier SC2 and add data to subcarrier SC2 and transmit all of the optical subcarriers SC1-SC4 on to node 202-3, and so on.

The below table illustrates a list of exemplary spectral efficiencies (that is, bits per unit spectrum) consistent with the present disclosure:

| Spectral Efficiency | Format | RSNR | RSNR-PS | # Bins | Fbaud | Interpolation | Max Cap |
|---|---|---|---|---|---|---|---|
| 11.64 | 64QAM:9; 32QAM:2 | 17.8 | 17 | 88 | 11.3 | 11:32 | 800 |
| 10.67 | 64QAM:1; 32QAM:2 | 16.6 | 15.4 | 96 | 12.3 | 3:8 | 800 |
| 9.85 | 32QAM:12; 16QAM:1 | 15.3 | 14.3 | 104 | 13.3 | 13:32 | 700 |
| 9.14 | 32QAM:4; 16QAM:3 | 14.4 | 13.3 | 112 | 14.3 | 7:16 | 600 |
| 8.53 | 32QAM:4; 16QAM:11 | 13.5 | 12.5 | 120 | 15.4 | 15:32 | 600 |
| 8 | 16QAM | 12.5 | 11.8 | 128 | 16.4 | 1:2 | 600 |
| 7.11 | 16QAM:5; 8QAM:4 | 11.4 | 10.6 | 144 | 18.4 | 9:16 | 500 |
| 6.4 | 16QAM:1; 8QAM:4 | 10.2 | 9.7 | 160 | 20.5 | 5:8 | 400 |
| 5.82 | 8QAM:10; QPSK:1 | 9.2 | 8.8 | 176 | 22.5 | 11:16 | 400 |
| 5.33 | 8QAM:2; QPSK:1 | 8.6 | 8.1 | 192 | 24.6 | 3:4 | 400 |
| 4.92 | 8QAM:6; QPSK:7 | 7.9 | 7.5 | 208 | 26.6 | 13:16 | 300 |
| 4.57 | 8QAM:2; QPSK:5 | 7.3 | 7.0 | 224 | 28.7 | 7:8 | 300 |
| 4 | QPSK | 6 | 6 | 256 | 32.8 | 1:1 | 300 |

In accordance with one aspect of the present disclosure, optical power of one or more optical subcarrier may be controlled individually. As such, the optical power of one or more optical subcarrier may differ from the optical power of one or more other optical subcarrier. For example, the digital signal processor 310 of the transmitter 212 may include power adjusting circuitry such as, but not limited to, a plurality of digital multipliers 478 corresponding to the plurality of independent data streams 352-1 to 352-4, the plurality of digital multipliers 478 configured to control power gain of the digital subcarriers, which results in control of the optical power of the optical subcarriers. The power adjusting circuitry, such as the plurality of digital multipliers 478 may be configurable so as to control and/or change power gains for specific ones of the plurality of digital subcarriers. One or more gain control signals 479 may be used to configure the power adjusting circuitry, such as the plurality of digital multipliers 478. In one implementation, the one or more gain control signals 479 may be generated by one or more processors 481.

In one aspect of the present disclosure, the plurality of digital multipliers 478 may be located within the digital signal processor 310 between the FFT component 450 and the IFFT component 490.

Figure 14:
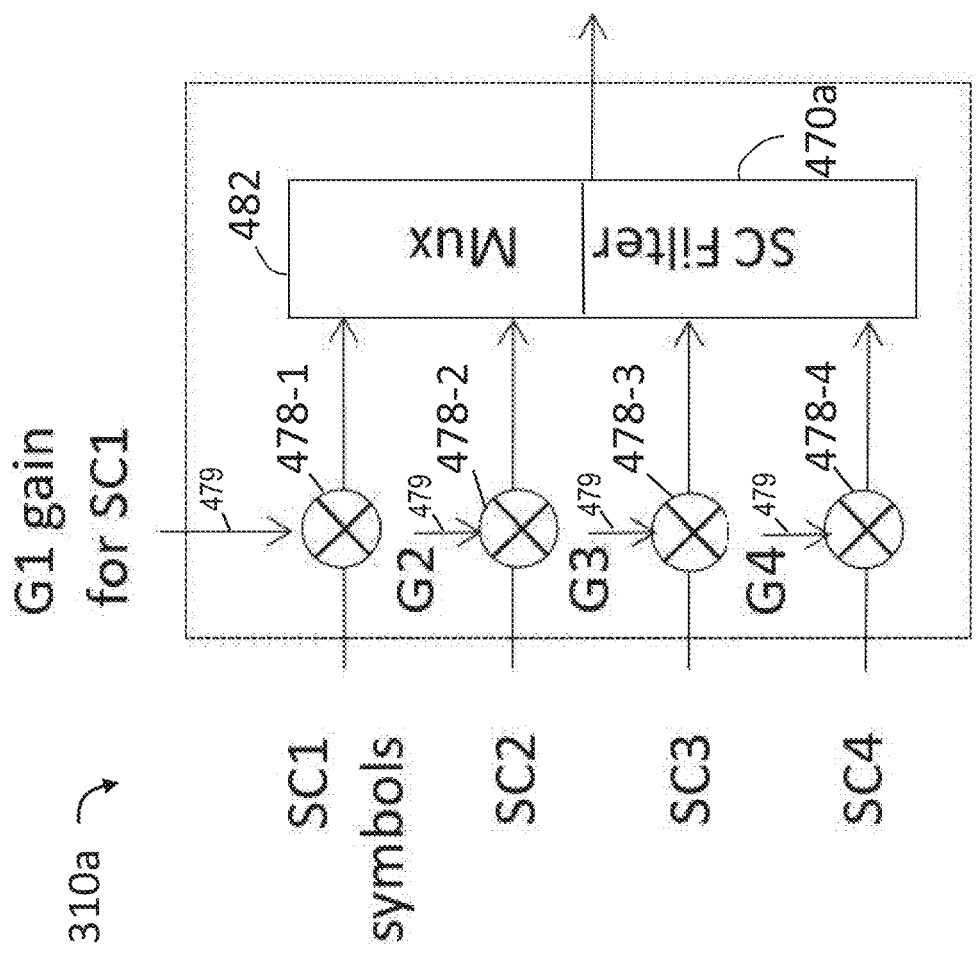
FIG. 14 is a diagram illustrating example components of an exemplary digital signal processor of a transmitter having a digital multiplier consistent with a further aspect of the present disclosure.

FIG. 14 illustrates a diagram of components of an exemplary digital signal processor 310a of an exemplary transmitter 212 which may be used to configure the power gain to digital subcarriers SC1-SC4. In the following figures, four digital subcarriers are shown for explanatory purposes, but it will be understood that any number of digital subcarriers SCN may be used. One or more digital multiplier 478, for example, digital multipliers 478-1 to 478-4 corresponding to the digital subcarriers SC1-SC4, may be used to control the level of power of the digital subcarriers SC1-SC4. The digital subcarriers SC1-SC4 may then be processed through a subcarrier filter 470a, which may be a pulse shape filter, and a multiplexer 482.

Figure 15:
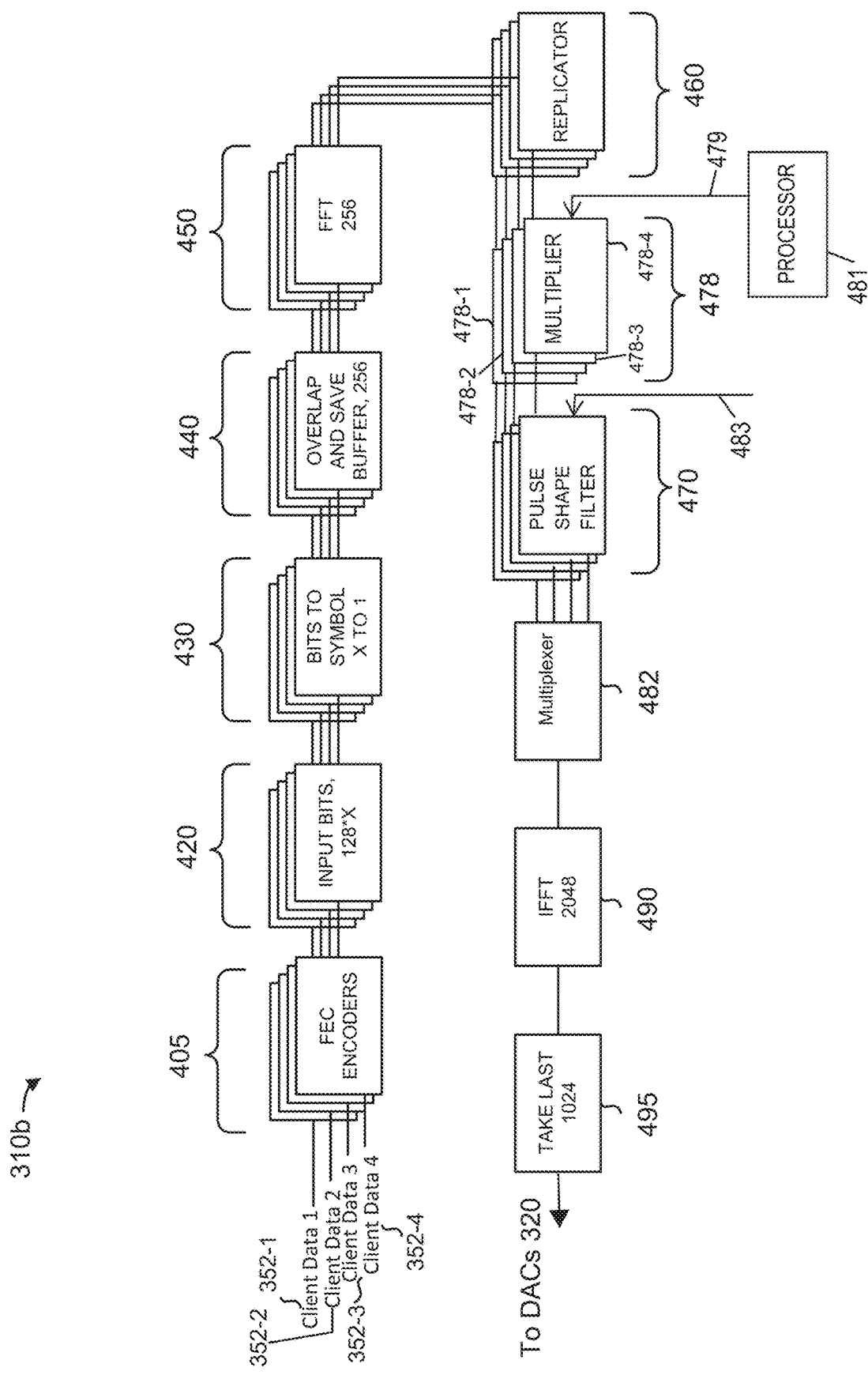
FIG. 15 is a diagram illustrating example components of another exemplary transmitter digital signal processor (Tx DSP) consistent with a further aspect of the present disclosure.

FIG. 15 illustrates a diagram of another exemplary digital signal processor 310b of an exemplary transmitter 212 which may be used to configure the power gain to digital subcarriers SC1-SC4. One or more digital multiplier 478, for example, digital multipliers 478-1 to 478-4 corresponding to the digital subcarriers SC1-SC4, may be used to control the level of power of the digital subcarriers SC1-SC4. The digital subcarriers SC1-SC4 may then be processed through the pulse shape filters 470 and the multiplexer 482, before proceeding to the IFFT component 490 and the take last component 495, as previously described in relation to FIG. 3.

The pulse shape filters 470 may be configured to shape the frequency bandwidths of the digital subcarriers to provide the digital subcarriers with desired spectral shapes. The pulse shape filters 470 may be configurable, adjustable, and/or programmable such that the frequency bandwidths are configurable. One or more filter control signals 483 may be used to adjust, configure, and/or program the pulse shape filters 470.

Figure 16:
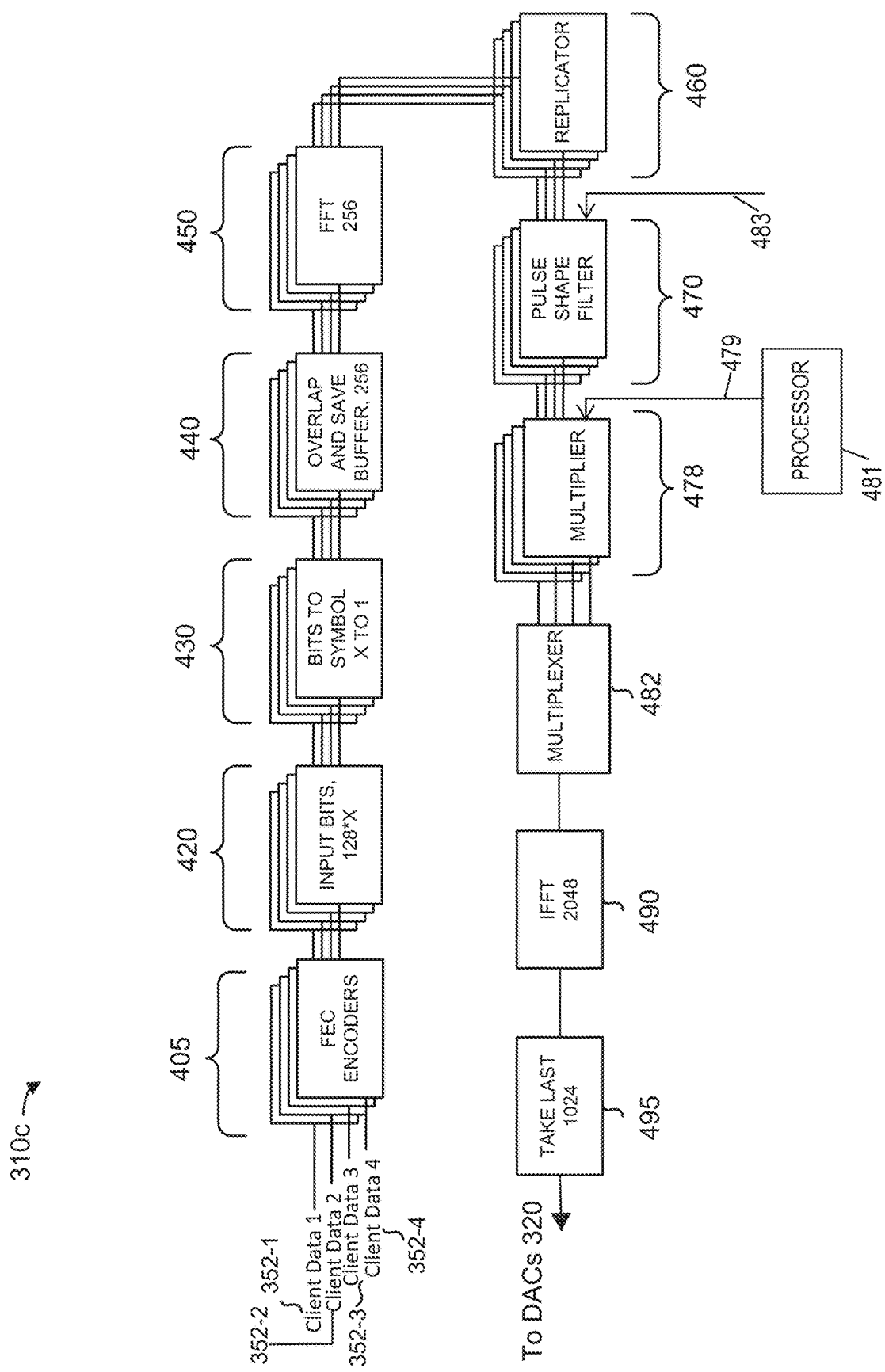
FIG. 16 is a diagram illustrating example components of another exemplary transmitter digital signal processor (Tx DSP) consistent with a further aspect of the present disclosure.

FIG. 16 illustrates a diagram of another exemplary digital signal processor 310c of an exemplary transmitter 212 which may be used to configure the power gain to digital subcarriers SC1-SC4. The digital subcarriers SC1-SC4 may be processed through the pulse shape filters 470. Then, one or more digital multiplier 478, for example, digital multipliers 478-1 to 478-4 corresponding to the digital subcarriers SC1-SC4, may be used to control the level of electrical power of the digital subcarriers SC1-SC4. The digital subcarriers SC1-SC4 may then be processed through the multiplexer 482, before proceeding to the IFFT component 490 and the take last component 495, as previously described in relation to FIG. 3.

Figure 17:
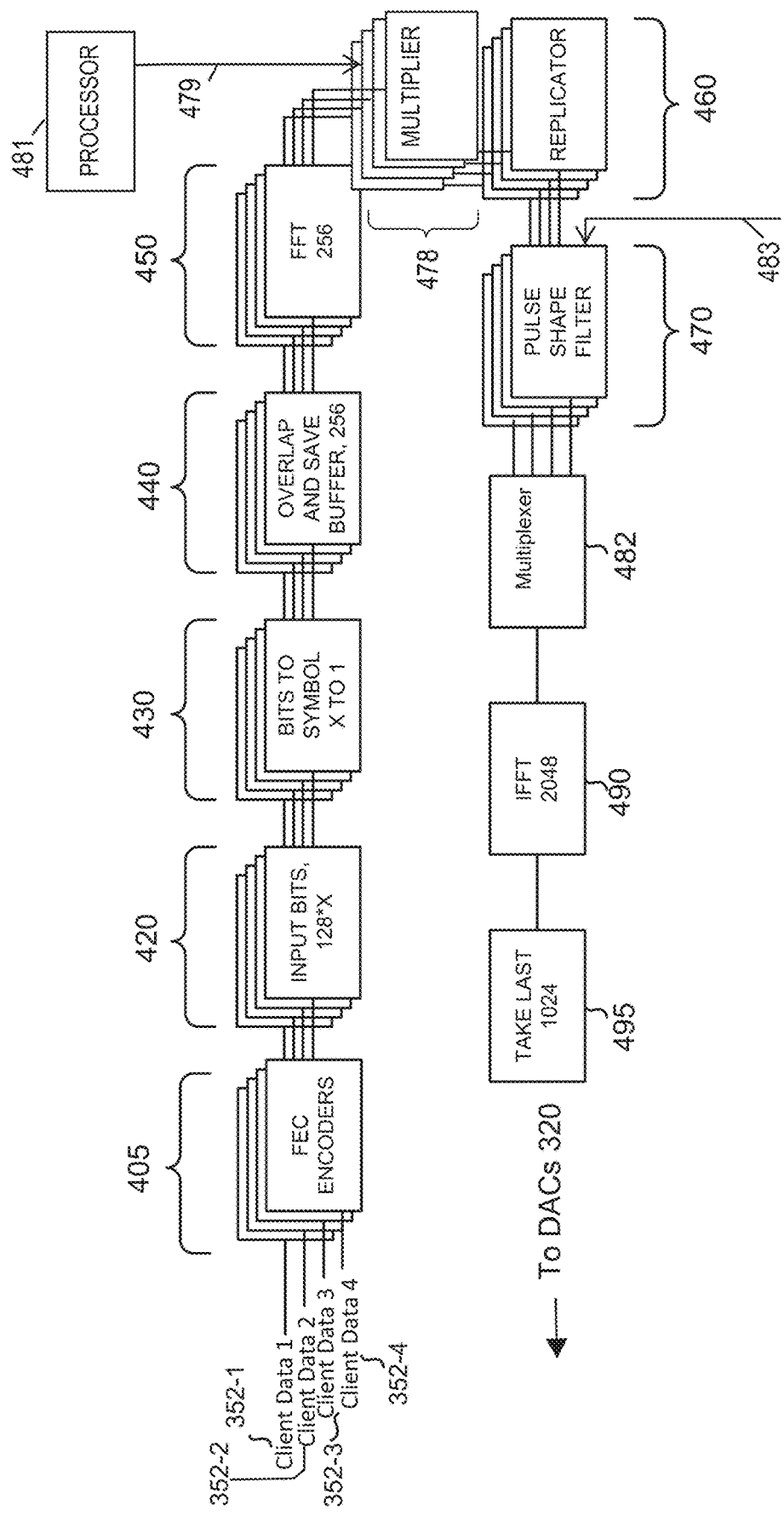
FIG. 17 is a diagram illustrating example components of another exemplary transmitter digital signal processor (Tx DSP) consistent with a further aspect of the present disclosure.

FIG. 17 illustrates a diagram of another exemplary digital signal processor 310d of an exemplary transmitter 212 which may be used to configure the power gain to digital subcarriers SC1-SC4. One or more digital multiplier 478, for example, digital multipliers 478-1 to 478-4 corresponding to the digital subcarriers SC1-SC4, may be used to control the level of power of the digital subcarriers SC1-SC4. The digital subcarriers SC1-SC4 may then be processed through other components of the digital signal processor 310d, such as the replicator 460, the pulse shape filters 470, and the multiplexer 482, before proceeding to the IFFT component 490 and the take last component 495, as previously described in relation to FIG. 3.

As previously described, the digital signal processor 310a, 310b, 310c, 310d may be part of the transmitter 212. The digital signal processor 310a, 310b, 310c, 310d may receive a plurality of independent data streams 352-1 to 352-4 and supply outputs based on the plurality of independent data streams 352-1 to 352-4. The outputs may include two or more digital subcarriers, such as a first digital subcarrier having a first frequency bandwidth and a second digital subcarrier having a second frequency bandwidth different than the first frequency bandwidth. The digital signal processor 310a, 310b, 310c, 310d may configure one or more of the digital subcarriers to control the electrical power levels of one or more of the digital subcarriers. For example, the digital signal processor 310a, 310b, 310c, 310d may configure a first digital subcarrier to have a first level of electrical power and a second digital subcarrier to have a second level of electrical power different than the first level of electrical power.

As previously discussed with regard to FIG. 2, the transmitter 212 may also include one or more digital-to-analog converter 320 configured to convert the outputs of the digital signal processor 310a, 310b, 310c, 310d to voltage signal outputs; the laser 330 configured to output an optical light beam; and the modulator 340. The modulator 340 is configured to modulate the optical light beam, based on the voltage signal outputs, to output a modulated optical signal including a plurality of optical subcarriers based on the outputs of the digital signal processor 310a, 310b, 310c, 310d. The plurality of optical subcarriers may carry data indicative of the plurality of independent data streams, respectively or in combination. The plurality of optical subcarriers each has a respective bandwidth. For example, a first one of the plurality of optical subcarriers has a first optical bandwidth and a second one of the plurality of optical subcarriers has a second optical bandwidth different than the first optical bandwidth.

Further, one or more of the plurality of the optical subcarriers may have an optical power level different than one or more of other ones of the optical subcarriers, as a result of the power levels of one or more of the respective digital subcarriers. For example, the first one of the plurality of optical subcarriers may have a first level of optical power and the second one of the plurality of optical subcarriers may have a second level of optical power different than the first level of optical power, corresponding to the electrical power levels of the respective digital subcarriers.

In use, the digital signal processor 310a, 310b, 310c, 310d may be used to adjust the shape of the digital subcarriers and corresponding optical subcarriers. In one implementation, the digital signal processor 310a, 310b, 310c, 310d may be used to adjust the shape of optical subcarriers for use with systems having legacy Optical Power Monitoring algorithms. For example, in previous systems, optical carriers such as the exemplary carrier $\lambda_1$ depicted in FIG. 18, may have been degraded at the outer edges of the optical bandwidth of the carrier $\lambda_1$ by roll-off from one or more filter. Because of this degradation, some Optical Power Monitoring algorithms are designed to expect optical carriers to have higher power in a center region of the optical bandwidth than at the outer edges of the optical bandwidth of the optical carrier. Such systems may search for peak power near the center region of the optical bandwidth of optical carriers.

In contrast, the optical subcarriers SC1-SC4 depicted in the carrier $\lambda_2$ in FIG. 19 are not degraded. This may result in some Optical Power Monitoring algorithms not recognizing the optical subcarriers SC1-SC4, since there is no roll-off of power from the center region of the optical bandwidth than at the outer edges of the optical bandwidth of the optical subcarriers SC1-SC4.

As illustrated in FIG. 20, through control of the optical power of the individual optical subcarriers SC1-SC4, as described above, in carrier $\lambda_2'$ the optical subcarriers SC1' and SC4' in the outer edges of the optical bandwidth may be reduced in power (or left at a lower power) and the optical subcarriers SC2' and SC3' in the center region of the optical bandwidth may be provided more power gain (or left at a higher power than the optical subcarriers SC1' and SC4') such that the optical subcarriers SC2' and SC3' in the center region have a higher power than the optical subcarriers SC1' and SC4' in the outer edges. This shaping of the optical subcarriers in the optical carrier $\lambda_2'$ mimics the shape of previous system optical carriers $\lambda_1$ sufficiently to permit the legacy Optical Power Monitoring algorithms, without modification, to recognize the coherent carrier $\lambda_2'$ and perform, for example, Power Control balancing functions.

Through the use of the digital signal processor 310a, 310b, 310c, 310d to shape the spectral channel through shaping the digital subcarriers, a variety of additional performance improvements can be made to compensate not only for impairments, but also to compensate for common DWDM deployment scenarios where the required power varies depending on characteristics of the transmission paths of the optical subcarriers through the optical network. For example, different transmission paths may have a varied number of fiber splitters and power combiners, and/or different distances/lengths of the transmission paths.

Figure 21:
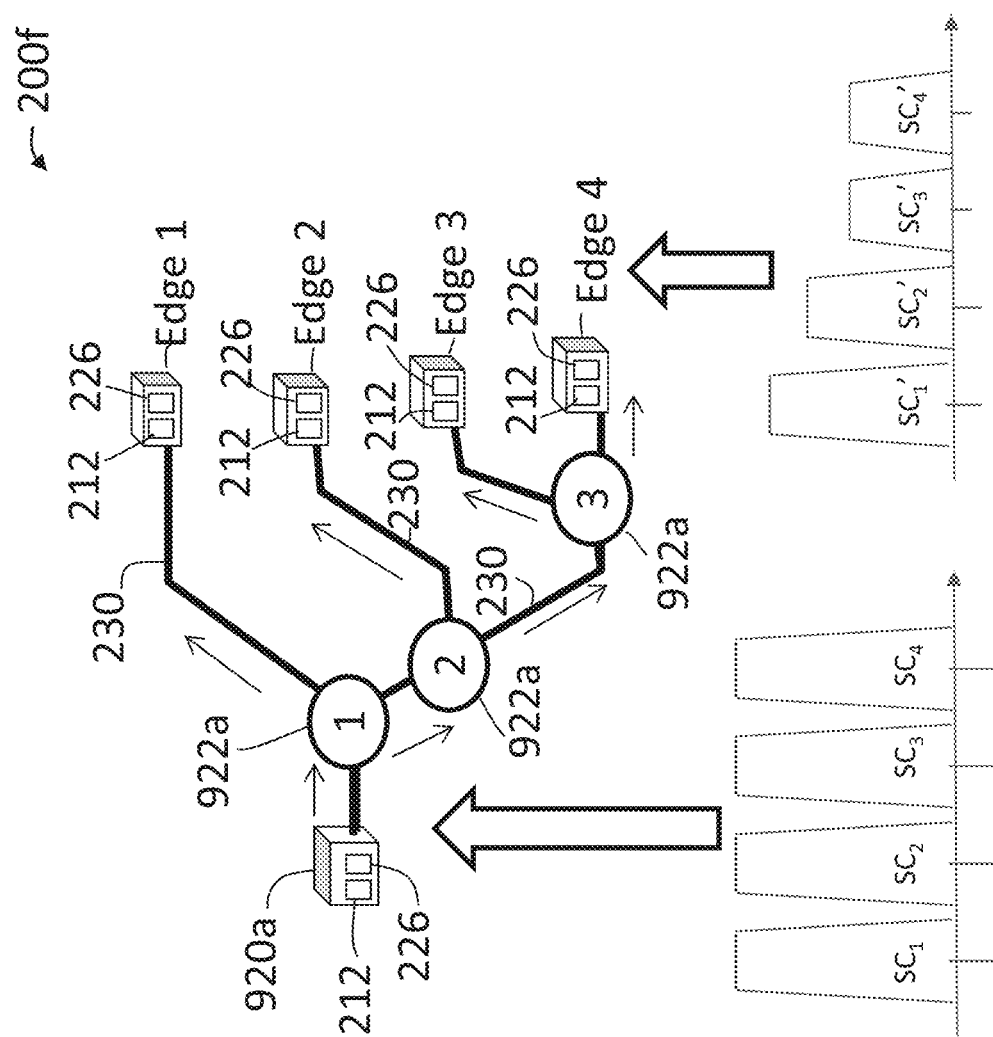
FIG. 21 is a diagram illustrating example components of an exemplary optical network transmitting subcarriers from a hub and receiving subcarriers at edge nodes.
Figure 22:
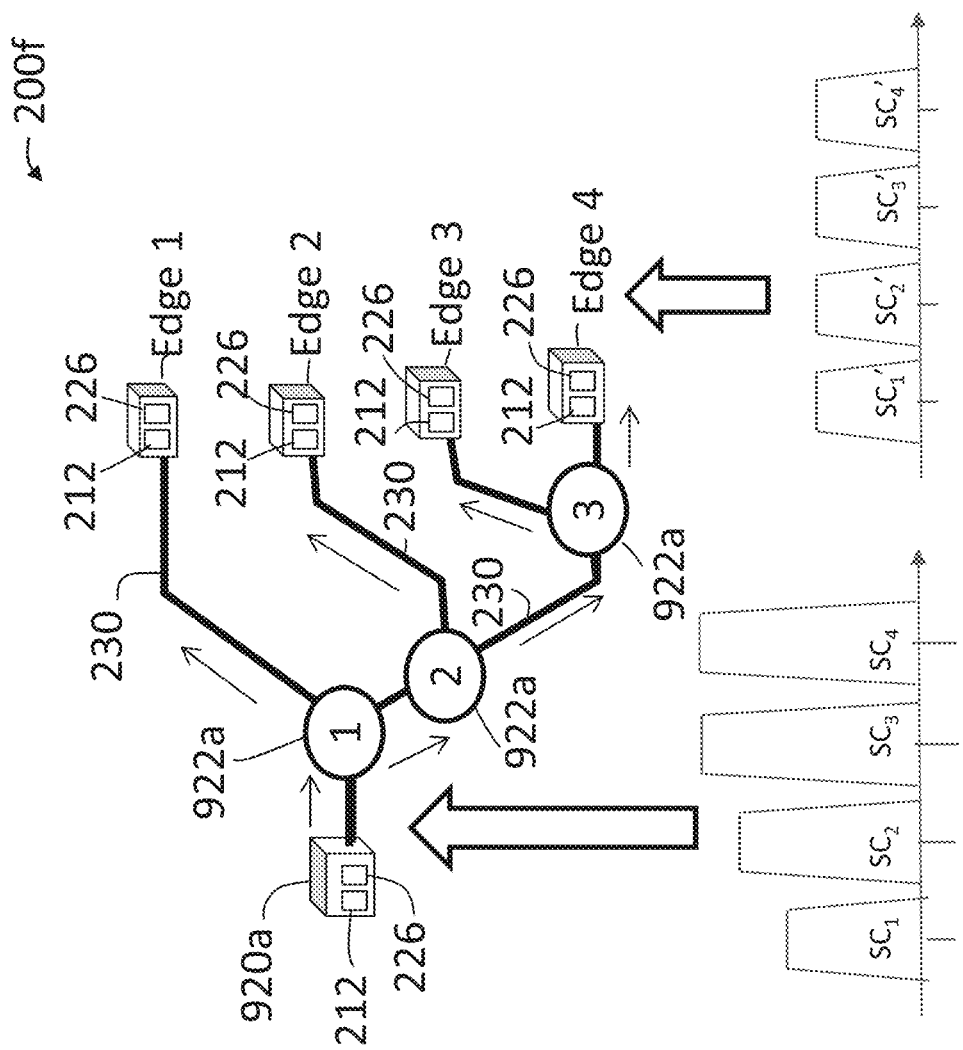
FIG. 22 is a diagram illustrating example components of an exemplary optical network transmitting subcarriers from a hub and receiving subcarriers at edge nodes.

For example, FIGS. 21 and 22 illustrate an exemplary optical network 200f having a hub 920a, a plurality of edge nodes (illustrated for explanatory purposes as Edge 1 through Edge 4), links 230, and one or more power splitters 922a (such as 922a-1, 922a-2, and 922a-3). The hub 920a may have a receiver 226 and may have one or more transmitter 212 having a digital signal processor 310a, 310b, 310c, 310d as described in FIGS. 14-17. The hub 920a may output a plurality of optical subcarriers, such as, for example, SC1-SC4, to the edge nodes Edge 1-Edge 4. The power splitters 922a may supply a power split portion of the plurality of optical subcarriers to one or more edge nodes Edge 1-Edge 4. Each edge node Edge 1-Edge 4 may comprise a receiver 226 that may receive one or more or all the optical subcarriers SC1-SC4 and that may output less than all of the data from the client data streams of all of the optical subcarriers. Each edge node Edge 1-Edge 4 may further comprise a transmitter 212.

As shown in FIG. 21, if the hub 920a transmits the optical subcarriers SC1-SC4 at the same optical power level (that is, the optical power level of the optical subcarrier SC1 is the same as the optical power level of the optical subcarriers SC2, SC3, and SC4), the differing characteristics of the transmission paths between the hub 920a and each edge node Edge 1-Edge 4, results in varied optical power levels of the optical subcarriers SC1'-SC4' when received at the edge nodes Edge 1-Edge 4. Such variable power loss may be due to characteristics of the transmission paths such as, but not limited to, fiber types, fiber distances, type of equipment/ optical components within the paths, and number of equipment/optical components within the path.

In this example, the optical subcarriers pass through three power splitters 922a-1, 922a-2, and 922a-3 in the transmission path from the hub 920a to the edge nodes Edge 3 and Edge 4, while the optical subcarriers pass through two power splitters 922a-1, 922a-2 in the transmission path from the hub 920a to the edge node Edge 2, and the optical subcarriers pass through one power splitter 922a-1 in the transmission path from the hub 920a to the edge node Edge 1.

If the power splitters 922a are 50/50 splitters, then from the power splitter 922a, the optical subcarriers continue along two paths with half of the light continuing through a first of the two paths and the other half of the light continuing through the a second of the two paths. Both paths may contain all the optical subcarriers but each carrier is at half of the power before the split. This represents roughly a 3 dB loss in the optical power of the carrier. As one example applied to the optical network 200f, if the optical power per carrier at the hub 920a is 15 dBm, the receive power per carrier at each edge node Edge 1-Edge 4 is as follows:
Edge 1=12 dBm;
Edge 2=9 dBm;
Edge 3=6 dBm;
Edge 4=6 dBm.

As illustrated in FIG. 22, a relative delta in the power of the subcarriers may be used when the hub 920a is transmitting to several edge nodes Edge 1-Edge 4, when the desired transmission power requirement is different, in order to achieve a desired receiver power at each edge node Edge 1-Edge 4 to achieve optimal or a desired minimum performance level. The digital signal processor 310a, 310b, 310c, 310d of the transmitter 212 of the hub 920a may be used to configure the power level of the digital subcarriers, and thus of the optical subcarriers output from the transmitter 212 such that the optical subcarriers have the desired receive power at the edge nodes Edge 1-Edge 4. In the example optical network 200f, if the desired optical power received per optical subcarrier at each edge node Edge 1-Edge 4 is 6 dBm, then the hub 920a may transmit each subcarrier SC1-SC4 with the following optical power in order to obtain the desired power at the edge nodes Edge 1-Edge 4:
SC1=9 dBm;
SC2=12 dBm;
SC3=15 dBm;
SC4=15 dBm.

Figure 23:
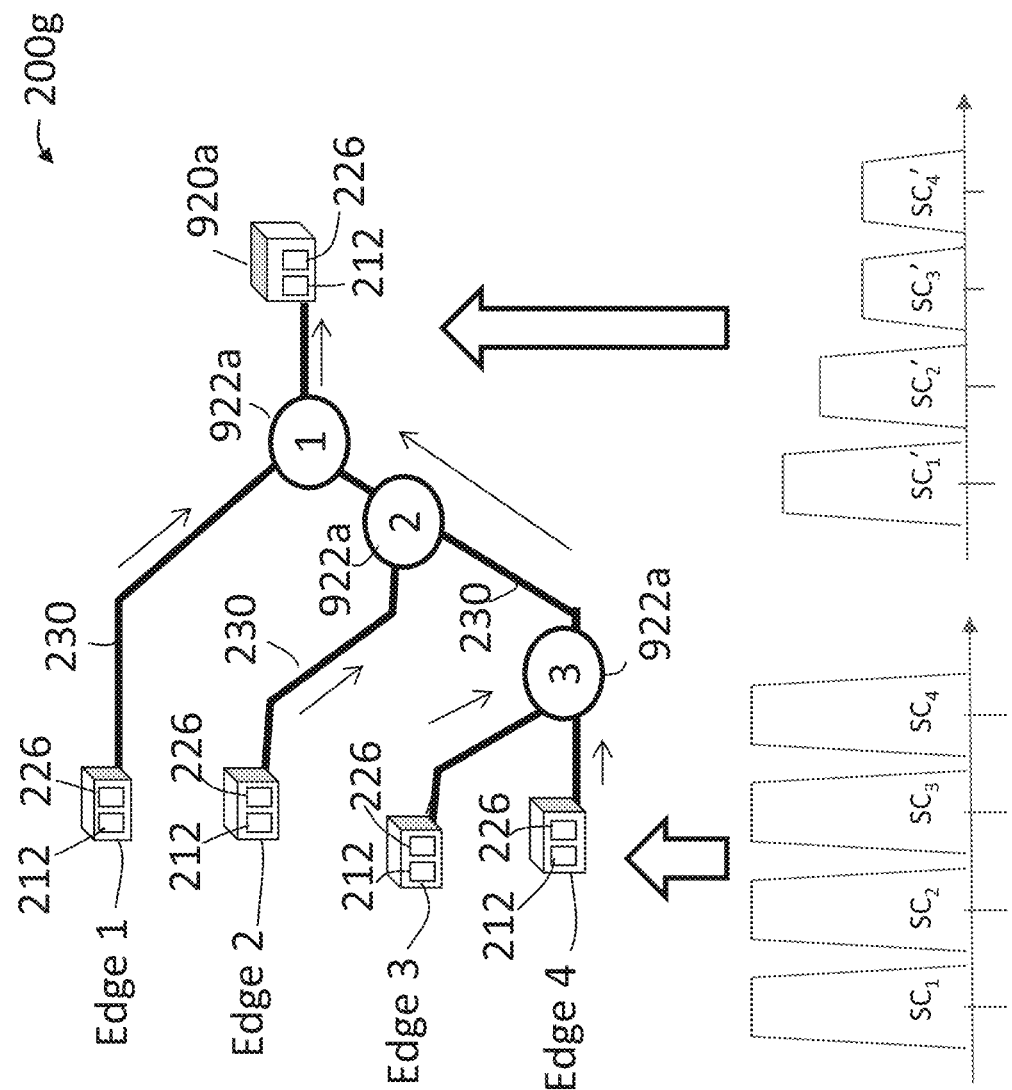
FIG. 23 is a diagram illustrating example components of an exemplary optical network transmitting subcarriers from edge nodes and receiving subcarriers at a hub.

As another example, FIGS. 23 and 24 illustrate an exemplary optical network 200g having a hub 920a, a plurality of edge nodes (illustrated for explanatory purposes as Edge 1 through Edge 4), links 230, and one or more power splitters 922a (such as 922a-1, 922a-2, and 922a-3). The hub 920a may have a receiver 226 and a transmitter 212. Each edge node Edge 1-Edge 4 may comprise a receiver 226 and a transmitter 212 having a digital signal processor 310a, 310b, 310c, 310d as described in FIGS. 14-17. The edge nodes Edge 1-Edge 4 may output one or more optical subcarriers, such as, for example, SC1-SC4, to the hub 920a. The power splitters 922a may supply a power split portion of the plurality of optical subcarriers to the hub 920a.

As shown in FIG. 23, if the edge nodes Edge 1-Edge 4 transmit the optical subcarriers SC1-SC4 at the same optical power level (that is, the optical power level of the optical subcarrier SC1 is the same as the optical power level of the optical subcarriers SC2, SC3, and SC4), the differing characteristics of the transmission paths between each edge node Edge 1-Edge 4 and the hub 920a results in in varied optical power levels of the optical subcarriers SC1'-SC4' at the hub 920a. For example, the optical subcarriers pass through three power splitters 922a-1, 922a-2, and 922a-3 in the transmission path from the edge nodes Edge 3 and Edge 4 to the hub 920a, while the optical subcarrier(s) pass through two power splitters 922a-1, 922a-2 in the transmission path from the edge node Edge 2 to the hub 920a, and the optical subcarrier(s) only pass through one power splitter 922a-1 in the transmission path from the edge node Edge 1 to the hub 920a.

If the power splitters 922a are 50/50 splitters, then from each power splitter 922a, the optical subcarriers continue along two paths with half of the light continuing through a first of the two paths and the other half of the light continuing through the a second of the two paths. Both paths contain all the optical subcarriers but each carrier is at half of the power before the split. This represents roughly a 3 dB loss in the optical power of the carrier. As one example applied to the optical network 200f, if the optical power per carrier is 15 dBm, the receive power per carrier at the hub 920a is as follows:
Receiver Power at Hub 920a from Edge 1=12 dBm;
Receiver Power at Hub 920a from Edge 2=9 dBm;
Receiver Power at Hub 920a from Edge 3=6 dBm;
Receiver Power at Hub 920a from Edge 4=6 dBm.

Figure 24A:
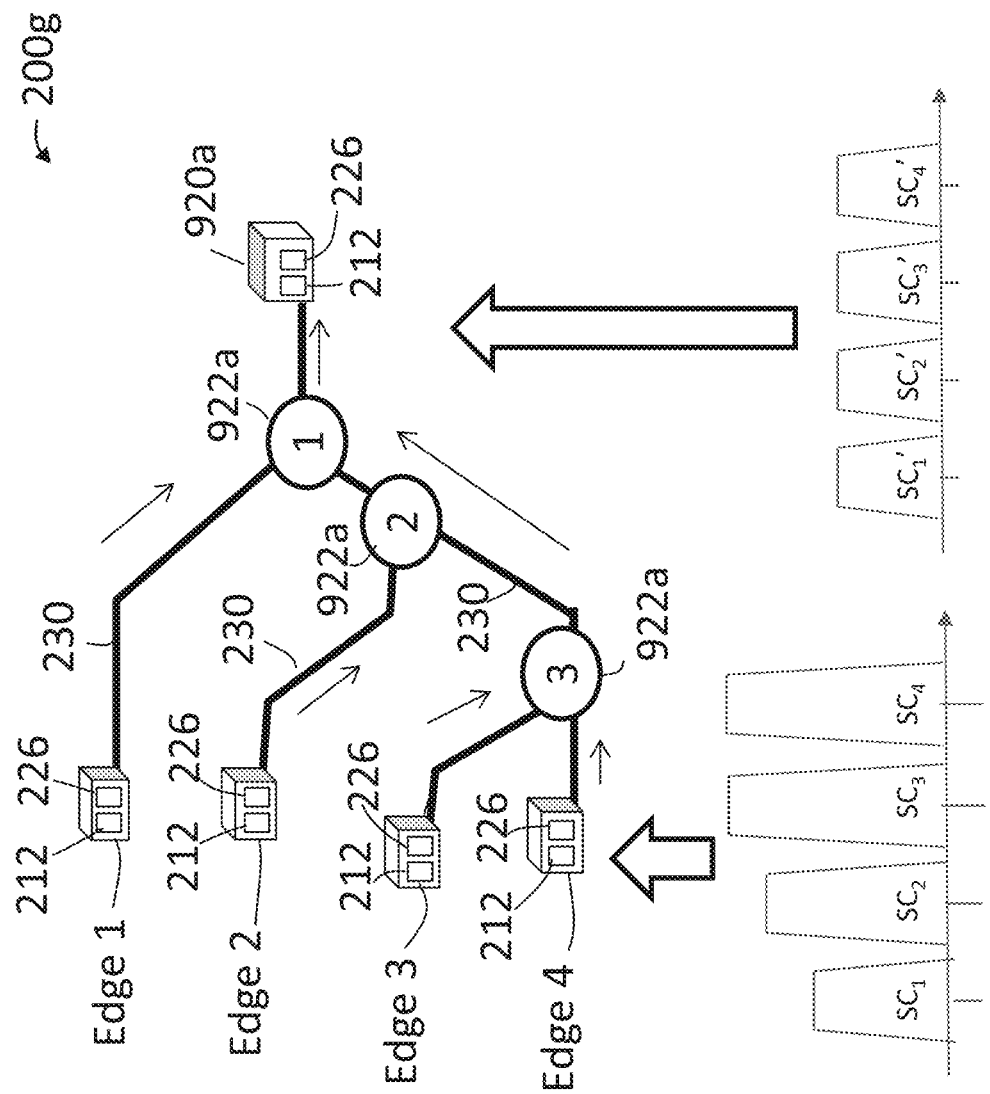
FIG. 24A is a diagram illustrating example components of an exemplary optical network transmitting subcarriers from edge nodes and receiving subcarriers at a hub.

As illustrated in FIG. 24A, a relative delta in the power of the subcarriers may be used when the edge nodes Edge 1-Edge 4 are transmitting to the hub 920a, when the desired transmission power requirement is different, in order to achieve a desired receiver power at the hub 920a to achieve optimal or a desired minimum performance level. The digital signal processor 310a, 310b, 310c, 310d of the transmitters 212 of the edge nodes Edge 1-Edge 4 may be used to configure the electrical power level of the digital subcarriers, and thus the optical power level of the optical subcarriers output from the transmitter 212 such that the optical subcarriers have the desired receive power at the hub 920a. In the example optical network 200g, if the desired optical power received per optical subcarrier at the hub 920a is 6 dBm, then the edge nodes Edge 1-Edge 4 may transmit the respective optical subcarriers SC1-SC4 with the following optical power in order to obtain the desired power at the hub 920a:
SC1=9 dBm;
SC2=12 dBm;
SC3=15 dBm;
SC4=15 dBm.

Figure 24B:
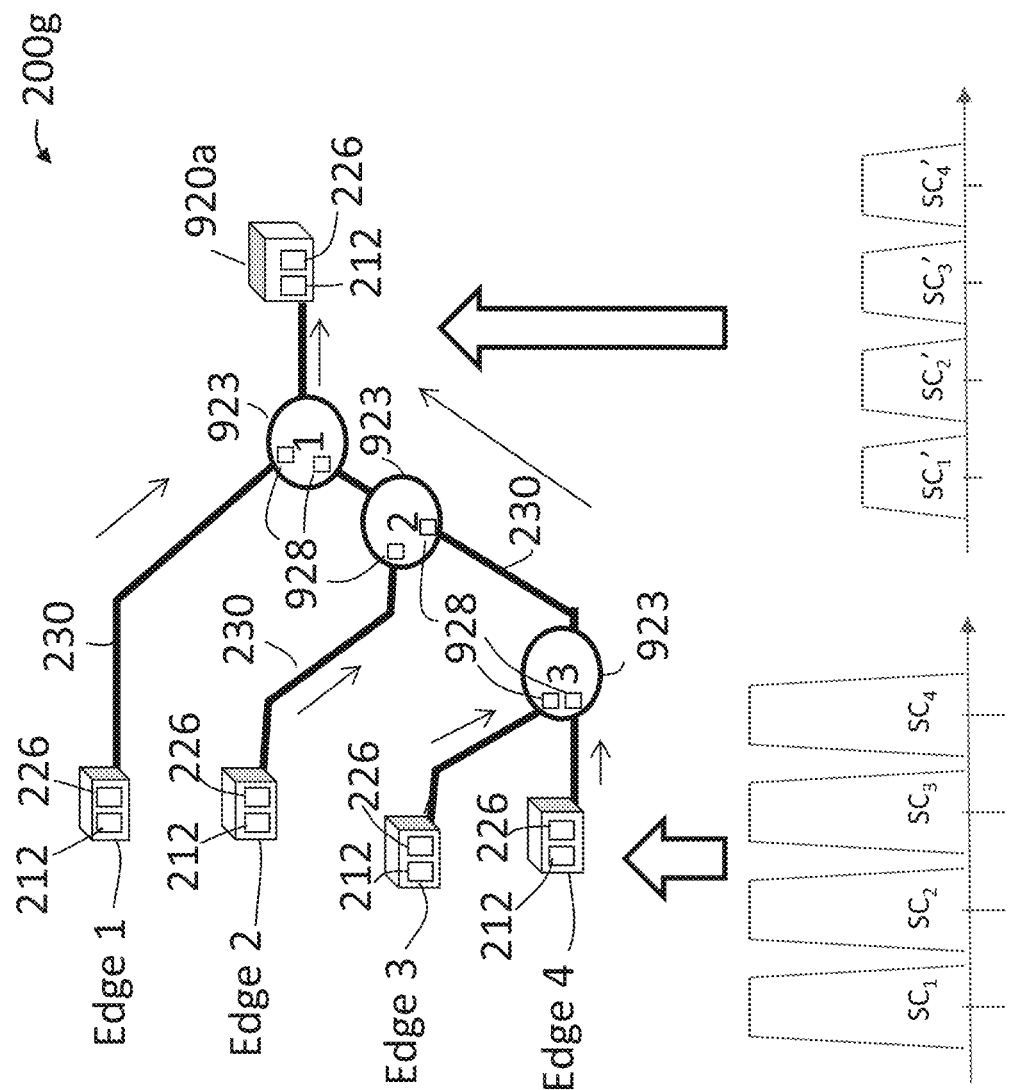
FIG. 24B is a diagram illustrating example components of another exemplary optical network transmitting subcarriers from edge nodes and receiving subcarriers at a hub.

As illustrated in FIG. 24B, in one implementation one or more variable optical attenuators 928 in the transmission path can be configured to control the optical power level of the optical subcarriers, such that the optical subcarriers have the desired receive power at the hub 920a. The variable optical attenuator(s) 928 may be component(s) of one or more optical components in the transmission path. In one implementation, the variable optical attenuator(s) 928 may be included in of one or more integrated VOA/Multiplexer 923-1, 923-2, and 923-3, as shown in FIG. 24B.

Figure 25:
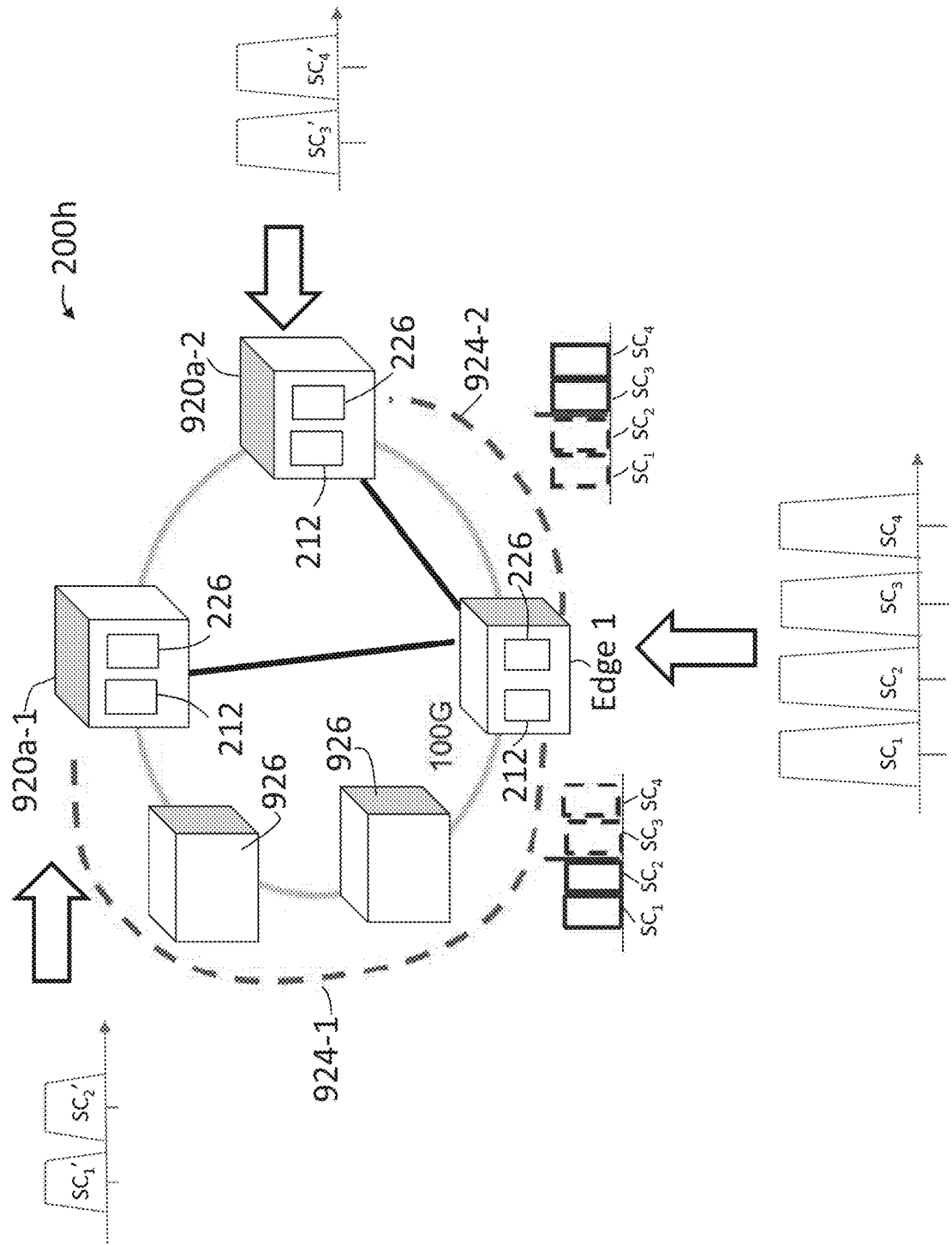
FIG. 25 is a diagram illustrating example components of an exemplary optical network transmitting subcarriers from an edge node and receiving subcarriers at a hub through multiple transmission paths.
Figure 26:
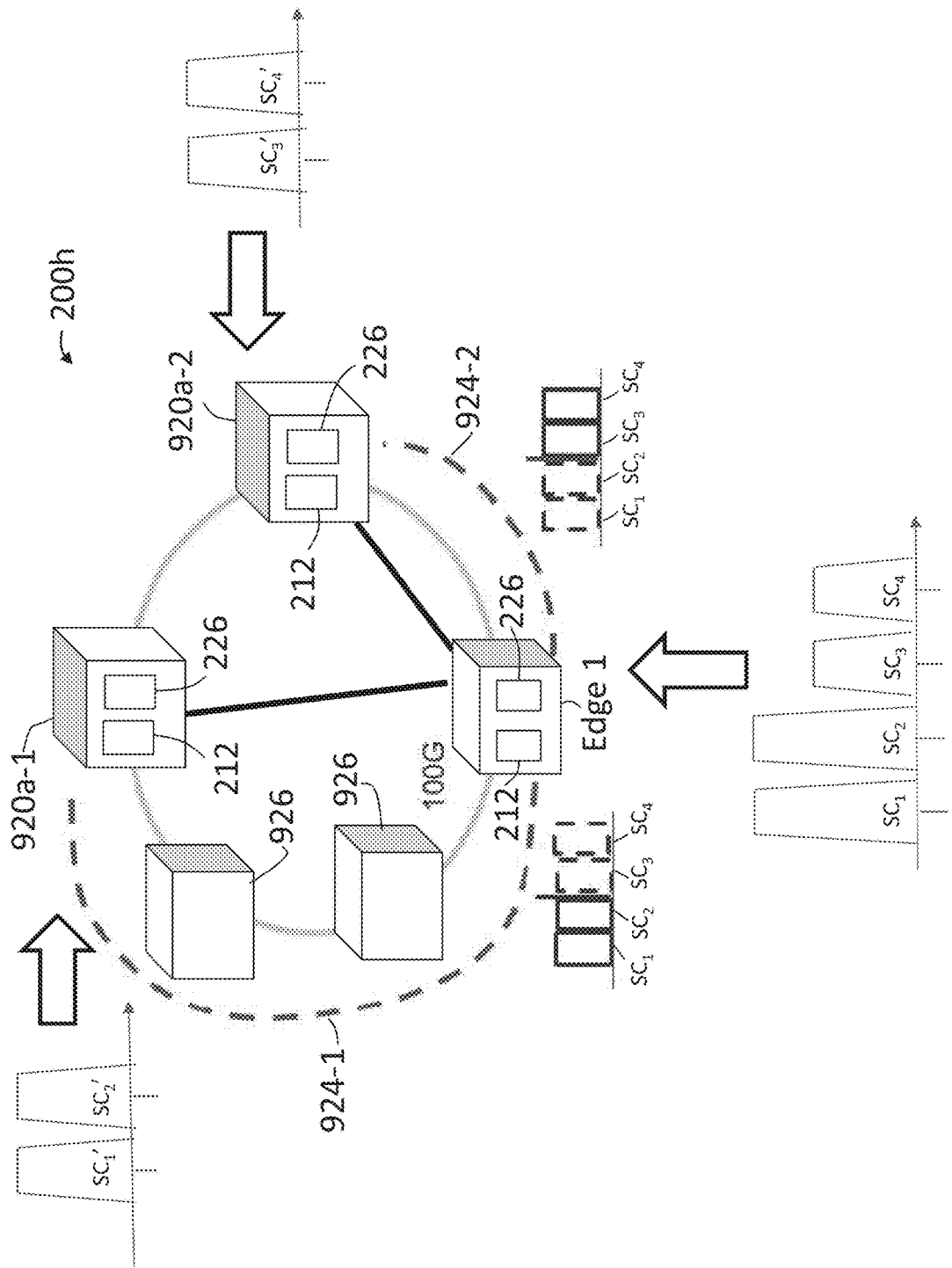
FIG. 26 is a diagram illustrating example components of an exemplary optical network transmitting subcarriers from an edge node and receiving subcarriers at a hub through multiple transmission paths.

In another example, FIGS. 25 and 26 illustrate an exemplary optical network 200h having an edge node Edge 1, a first hub 920a-1, a first transmission path 924-1 between the edge node Edge 1 and the first hub 920a-1, a plurality of optical components 926 in the first transmission path between the edge node Edge 1 and the first hub 920a-1, a second hub 920a-2, and a second transmission path 924-2 between the edge node Edge 1 and the second hub 920a-1. Each hub 920a-1, 920a-2 may comprise a receiver 226 and a transmitter 212. The edge node Edge 1 may comprise a receiver 226 and a transmitter 212 having a digital signal processor 310a, 310b, 310c, 310d as described in FIGS. 14-17.

The edge node Edge 1 may output one or more optical subcarriers, such as, for example, SC1-SC4, to the first and second hubs 920a-1, 920a-2. All of the optical subcarriers SC1-SC4 may be transmitted to each of the first and second hub 920a-1, 920a-2 and one of or more of the optical subcarriers may be ignored by one or both of the first and second hubs 920a-1, 920a-2, and/or one or more of the optical subcarriers may be filtered before reaching the first or second hub 920a-1, 920a-2. Or fewer than all of the subcarriers may be transmitted to the first and second hub 920a-1, 920a-2 from the edge node Edge 1. For example, the first and second optical subcarriers SC1, SC2 may be transmitted to the first hub 920a-1 and the third and fourth optical subcarriers may be transmitted to the second hub 920a-2.

In the exemplary optical network 200h, the first transmission path 924-1 between the edge node Edge 1 and the first hub 920a-1 has different characteristics than the second transmission path 924-2 between the edge node Edge 1 and the second hub 920a-2. In general, the level of optical power of respective optical subcarriers may be based at least in part on one or more characteristics of the first transmission path 924-a and the second transmission path 924-2.

For example, the first transmission path 924-1 may have a first length and the second transmission path 924-2 may have a second length shorter than the first length. Additionally, or alternately, a larger number of optical components 926 may be in the first transmission path 924-1 than in the second transmission path 924-2. It will be understood that other characteristics of the first transmission path 924-1 may also be different than characteristics of the second transmission path 924-2. For example, the types of filters in the optical components 926 and/or their widths and/or the number of filters in the transmission paths 924 through the optical network 200h that the optical subcarrier will take, as well as the number and locations of receivers 226, and the capacity of such receivers 226, may determine required receive power of the optical subcarriers.

As shown in FIG. 25, the different characteristics of the first and second transmission paths 924-1, 924-2 may result in different optical power of the optical subcarriers SC1'-SC2' received at the first hub 920a-1 versus the power of the optical subcarriers SC3'-SC4' received at the second hub 920a-2. For example, the optical power of the optical subcarriers SC1'-SC2' received at the first hub 920a-1 may be less than the optical power of the optical subcarriers SC3'-SC4' received at the second hub 920a-2 because the length of the first transmission path 924-1 is longer than the length of the second transmission path 924-2 and there are more optical components in the first transmission path 924-1 than in the second transmission path 924-2.

As illustrated in FIG. 26, a relative delta in the optical power of the optical subcarriers may be used when the edge node Edge 1 transmits to the first and second hubs 920a-1, 920a-2, when the desired transmission power requirement is different, in order to achieve a desired receiver power at the first hub 920a-1 and the second hub 920a-2 to achieve optimal or a desired minimum performance level. The digital signal processor 310a, 310b, 310c, 310d of the transmitter 212 of the edge node Edge 1 may be used to configure the electrical power level of the digital subcarriers, and thus of the optical power level of the optical subcarriers output from the transmitter 212 such that the optical subcarriers SC1-SC2 have the desired receive power at the first hub 920a-1 and the optical subcarriers SC3-SC4 have the desired receive power at the second hub 920a-2. In one non-exclusive example, average power may be maintained at the first hub 920a-1 and the second hub 920a-2 by increasing the optical power of the optical subcarriers SC1-SC2 and reducing the optical power of the remaining optical subcarriers SC3-SC4 at the transmitter 212 of the edge node Edge 1, such as by utilizing the digital multipliers 478 in the digital signal processor 310a, 310b, 310c, 310d.

In one aspect of the present invention, a control feedback loop from the receiver 226 of the edge node Edge 1-Edge 4 or hub 920, 920a that is receiving the optical subcarriers to the transmitter 212 of the edge node Edge 1-Edge 4 or hub 920, 920a that is transmitting the optical subcarriers, may be used to adjust the optical power of individual optical subcarriers at the transmitter 212, to improve performance based on ongoing measurements of the performance at the receiver 226.

Relative optical power adjustments to the optical subcarriers may be used to improve overall performance at the receiver(s) 226. Using multiple optical subcarriers and having each optical subcarrier demodulated independently allows independent measures of performance "Q". The ability to measure the Q for respective optical subcarriers and the ability to independently control the relative optical power of respective optical subcarriers enables an implementation of a feedback loop to increase or decrease the optical power of respective optical subcarriers to achieve an overall optimal Q. This may include trading off excess Q on one or more optical subcarriers to those optical subcarriers that require additional Q. This may be due to different modulations used per optical subcarrier where each has a different OSNR or Q requirement or could be due to varied impairments due to different routing, for example.

The adjusted optical power of the optical subcarrier(s) may be used to overcome variable distances, a varied number of splitters, and/or other impairments or requirements in the transmission path 924 or route or receiver 226. Each optical subcarrier from each transmitter 212 may be launching at a different and/or relative optical power such that when the optical subcarriers reach the location of the receiver 226, the optical power is at a target optical power level to achieve the desired OSNR for each optical subcarrier servicing the Hub/Edge pair.

The feedback loop may be implemented in several ways to determine the performance of the optical subcarriers and to provide information and/or instructions to the transmitter 212 of the optical subcarriers from the receiver 226 of the optical subcarriers and to adjust parameters of the optical subcarriers. One such parameter is the optical power of the optical subcarriers, which may be adjusted through the digital multipliers 478, for example.

Figure 27:
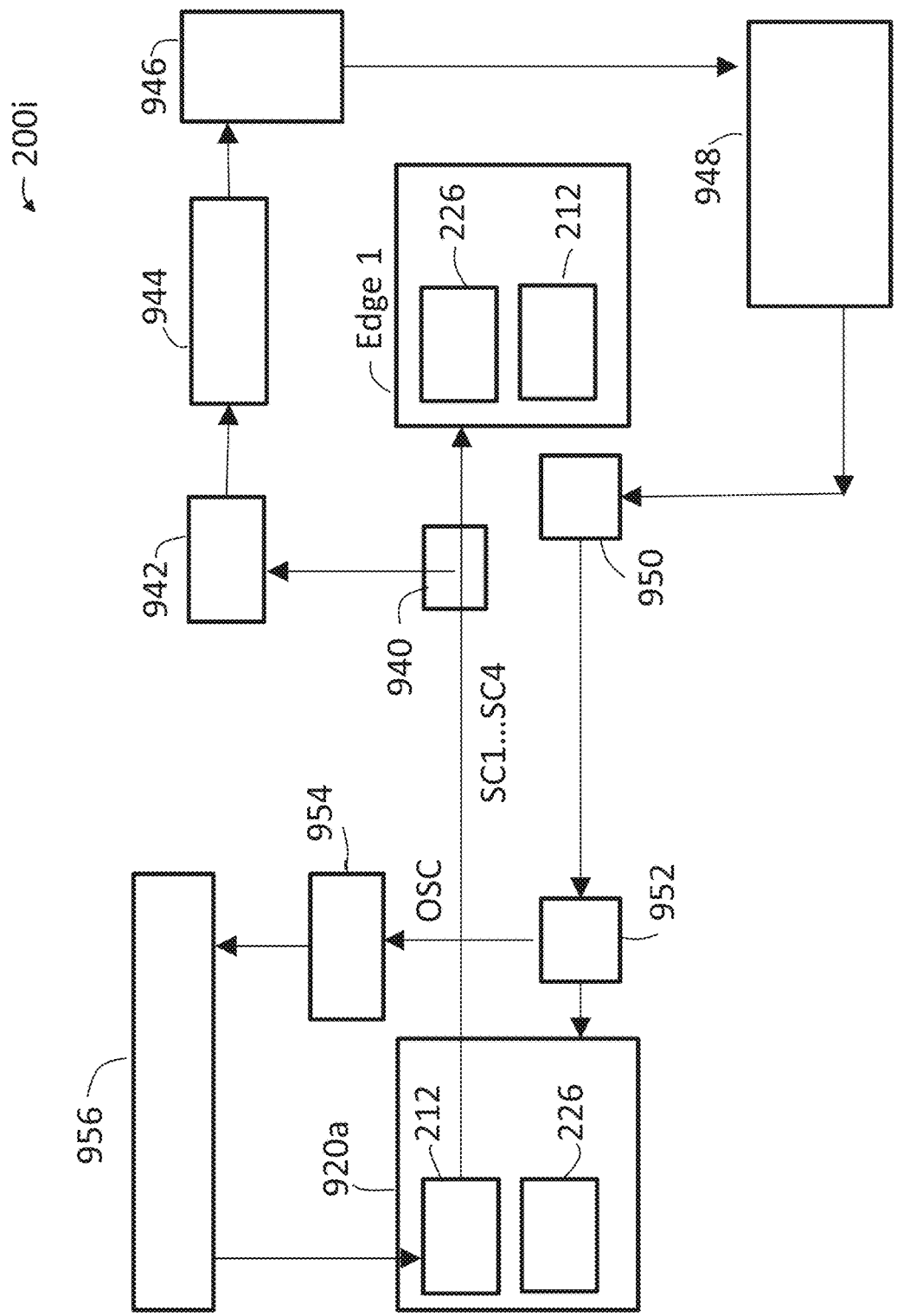
FIG. 27 is a diagram illustrating components of another exemplary optical network consistent with an aspect of the present disclosure.

In one implementation of a feedback loop, as illustrated in FIG. 27, an optical network, such as optical network 200i, transmitting optical subcarriers SC1-SC4 from the transmitter 212 of the hub 920a to the receiver 226 of the edge node Edge 1, may further comprise an optical tap 940, a tunable filter 942, a receiver-side photodiode 944, a receiver-side processor or control circuit 946, an Optical Service Channel (OSC) transmitter 948, a combiner or multiplexer 950, a demultiplexer 952, a transmitter-side photodiode 954, and a transmitter-side processor or control circuit 956.

The optical tap 940 may split a portion of the light of one or more of the optical subcarriers to the tunable filter 942 at, or before the optical subcarriers enter, the receiver 226 of the Edge 1. The tunable filter 942 may scan the light spectrum of the optical subcarriers and transmit the scanned light to the receiver-side photodiode 944, which may convert the light into electrical signals. The electrical signals may be detected by the receiver-side processor or control circuit 946, which may track the amount of current and corresponding optical power of the optical subcarriers (that is, the amount of light detected). The receiver-side processor or control circuit 946 may determine the adjustments needed to be made to the optical subcarriers. The Optical Service Channel (OSC) transmitter 948 may transmit information indicative of the adjustments needed to be made to the optical subcarriers. The OSC transmitter 948 may transmit the information to the transmitter 212 of the hub 920a in a feedback optical signal that is at a different wavelength than the optical subcarriers. For example, the OSC transmitter 948 may transmit the information at 1310 nanometers. Once combined at the combiner or multiplexer 950, the feedback optical signal may be sent to the transmitter 212.

At or before the transmitter 212 of the hub 920a, the feedback optical signal may be filtered at the demultiplexer 952 and sent to the transmitter-side photodiode 954. The transmitter-side photodiode 954 may convert the light of the feedback optical signal into electrical signals and transmit the electrical signals to the transmitter-side processor or control circuit 956. The transmitter-side processor or control circuit 956 may interpret the feedback information and output signals to adjust gains of the digital subcarriers in the digital signal processor 310 of the transmitter 212, such as through controlling the digital multipliers 478, for example, thereby adjusting the optical power of the optical subcarriers.

Figure 28:
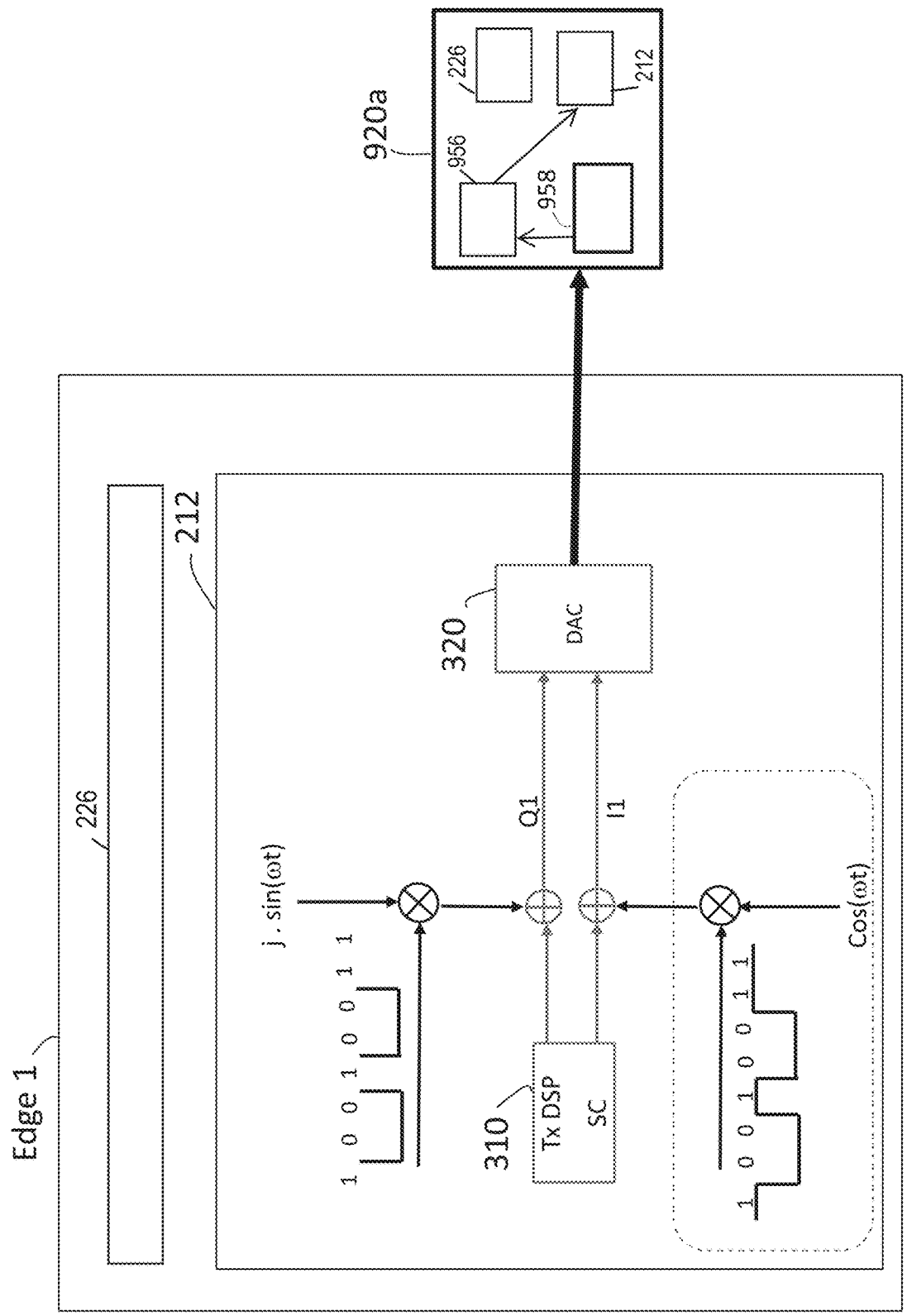
FIG. 28 is a diagram illustrating components of a node consistent with an aspect of the present disclosure.
Figure 29:
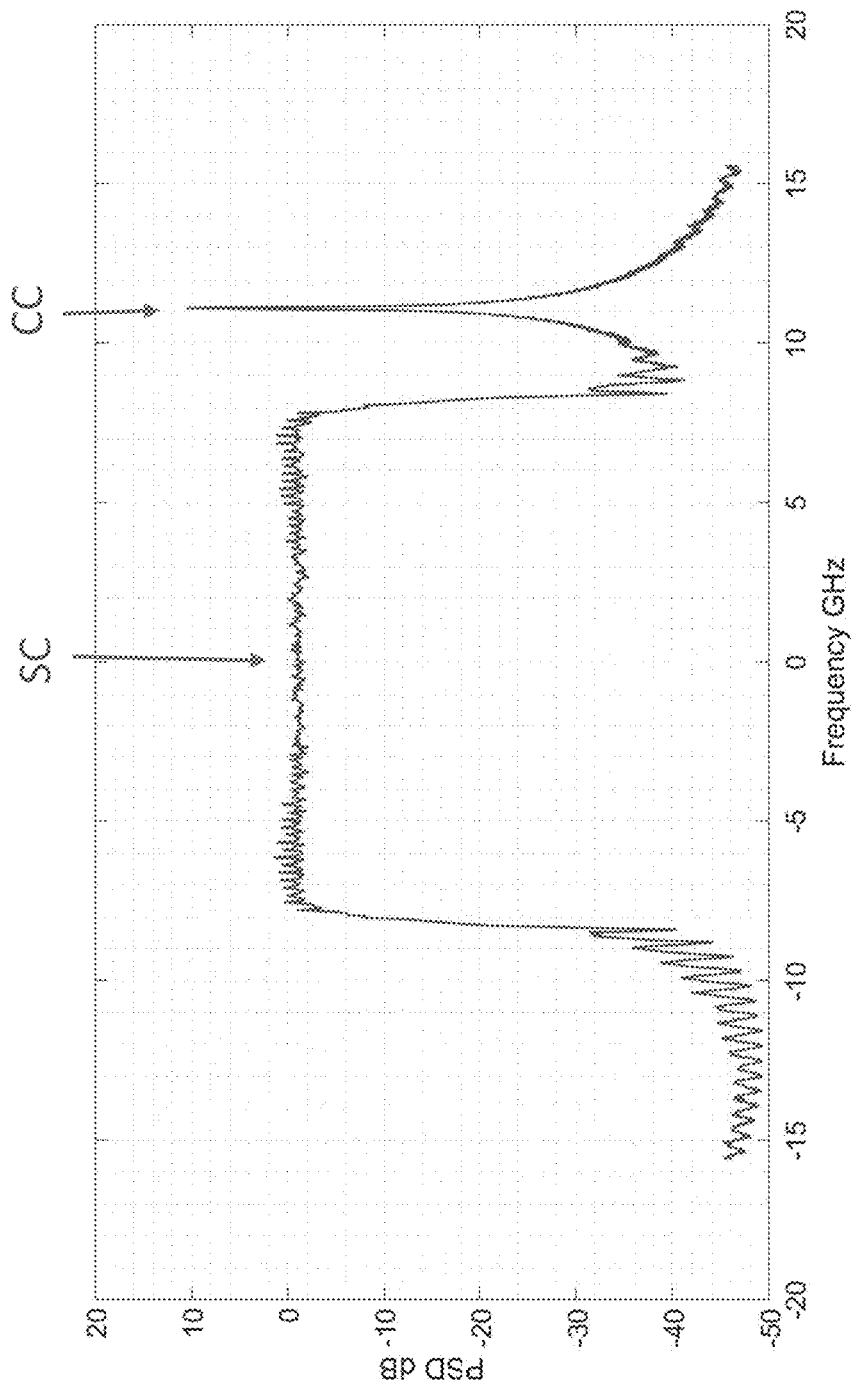
FIG. 29 is an exemplary frequency graph of carriers transmitted from the node of FIG. 28.

In one implementation, as illustrated in FIGS. 28 and 29, an optical network, such as optical network 200/f transmitting optical subcarriers SC1-SC4 from the hub 920a to the edge node Edge 1 (as shown, for example, in FIGS. 21-22), may transmit feedback information as to the performance of, and/or adjustment needed to the optical power of the optical subcarriers, modulation type, spacing increase or decrease from adjacent subcarriers, further spectral shaping of the subcarrier, roll-off, and so on, from the receiving end (here, the edge node Edge 1).

In one implementation, the feedback information may be transmitted using a sideband generator process. In such a system, the transmitter 212 of the edge node Edge 1 may impose on the high frequency optical signal (such as that carrying the subcarriers SC as shown in FIG. 29) a low frequency optical signal "control channel" CC (as shown in FIG. 29) to create a side band signal to carry feedback information regarding the optical subcarriers' power performance that was received at the receiver 226 of the edge node Edge 1. Additionally, the low frequency signal may be used to carry feedback information for both the in-phase and quadrature components, and may be used for both the X polarization and the Y polarization. The out-of-band signals may be added to the outputs of the digital signal processor 310 of the transmitter 212 which is supplied to the DACs 320. The hub 920a may filter the side band signal from the optical transmission to the hub 920a from the edge node Edge 1 (such as with filter 958) and process the side band signal to use to adjust the electrical power levels (that is, adjust the gain) of the digital subcarriers and the corresponding optical power of the optical subcarriers transmitted from the transmitter 212 of the hub 920a, as previously explained. In one implementation, the hub 920a may further comprise a processor or control circuit 956. The processor or control circuit 956 may interpret the feedback information and output signals to adjust gains of the digital subcarriers in the digital signal processor 310 of the transmitter 212, such as through controlling the digital multipliers 478, for example, thereby adjusting the optical power of the optical subcarriers.

In one implementation, the digital signal processor 310 in the transmitter 310 may further comprise an electrical filter or filtering circuit that may filter the feedback information.

Figure 30:
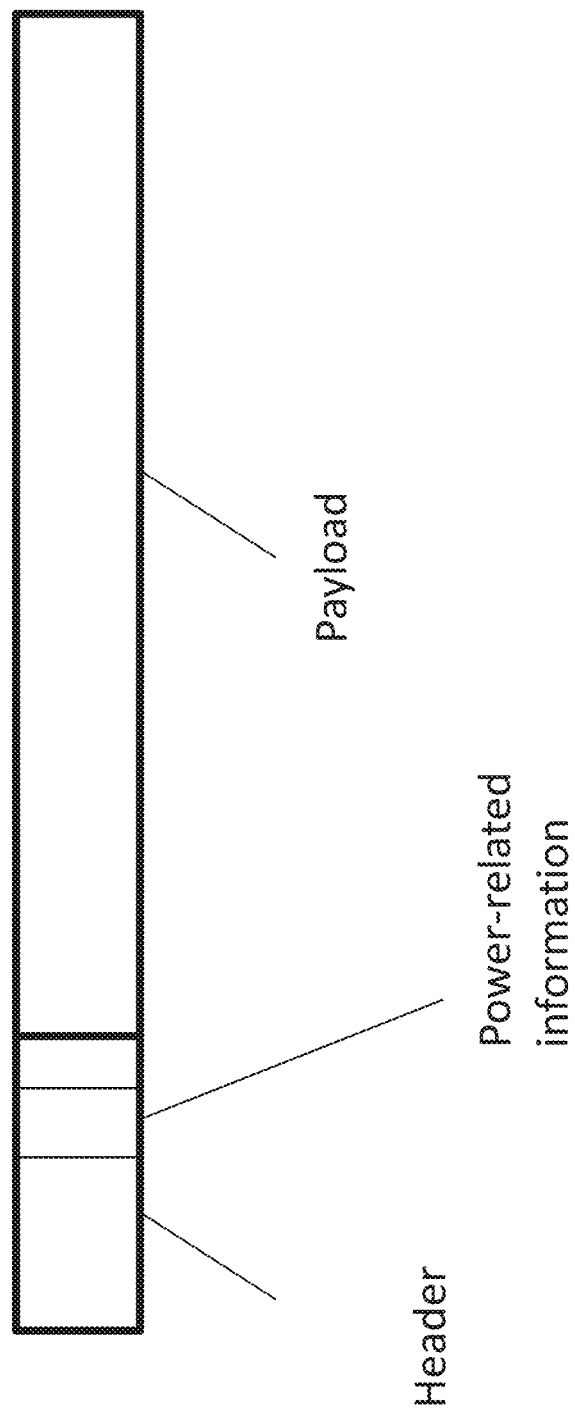
FIG. 30 is an illustration of the data structure of an exemplary optical signal consistent with an aspect of the present disclosure.

In one implementation, as illustrated in FIG. 30, the feedback information may be carried from the receiving end in the header of a frame carried by the optical signals from the transmitter 212 of the edge node Edge 1. This method may use the header to uniquely identify the Edge and Hub messages along with instructions to, for example, increase and/or decrease the optical power, such that the optical power levels of one or more of the plurality of the optical subcarriers may be based on the data of the feedback information in the header.

Although these examples show power related information in the feedback information, additionally or alternatively, the method may be used to exchange different type of messages.

Figure 31A:
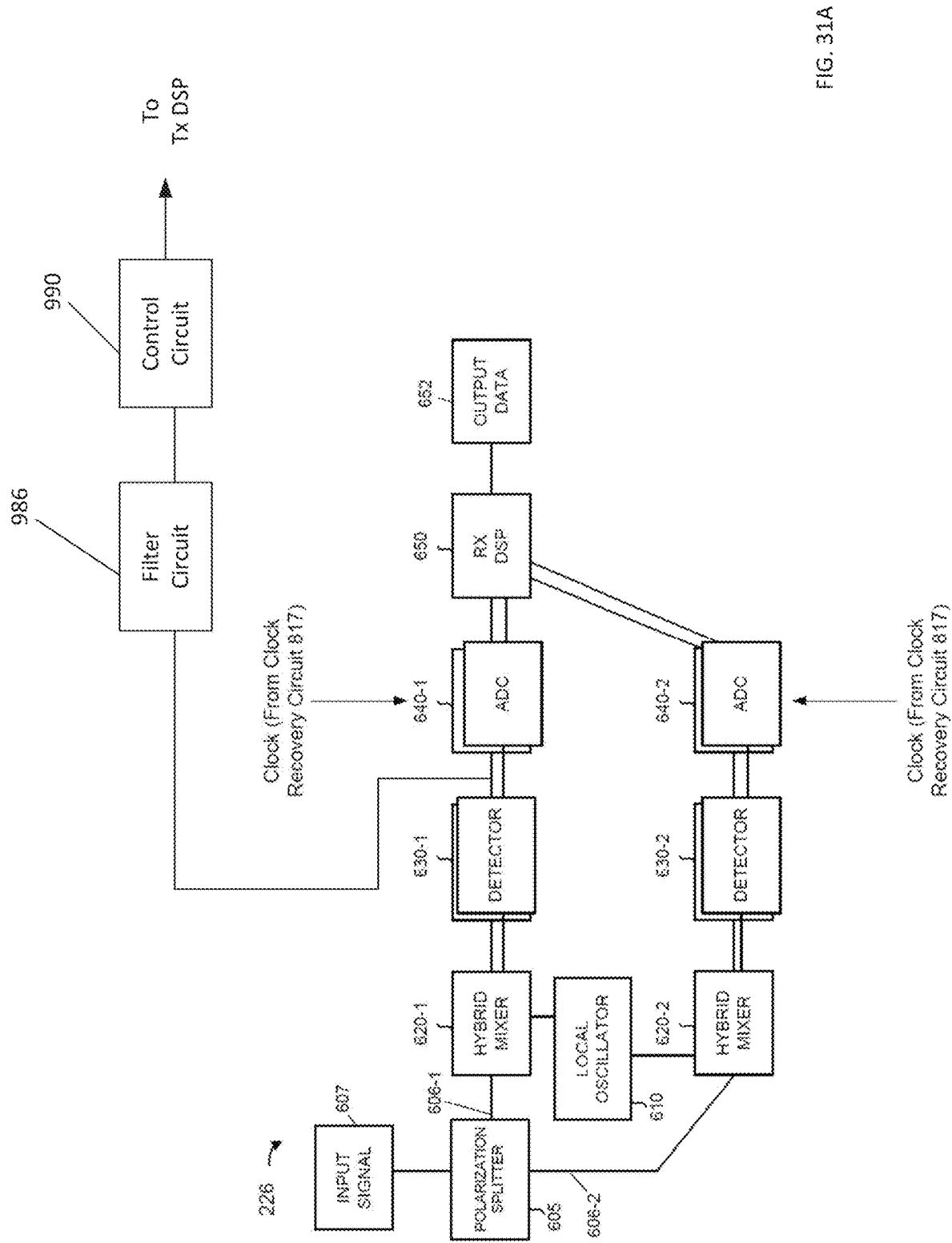
FIG. 31A is a diagram illustrating example components of an exemplary receiver consistent with an aspect of the present disclosure.

FIG. 31A illustrates another example of a receiver consistent with the present disclosure. The receiver shown in FIG. 31A is similar to that shown in FIG. 6. In FIG. 31A, however, a filter circuit 986 is coupled or connected to an output of detectors 630-1. Although one such connection is shown in FIG. 31A, it is understood that connections may also be made to another output of detectors 630-1 and/or to one or both outputs of detectors 630-2. Filter circuit 986 may be, for example, a band-pass filter or a low pass filter to provide an electrical signal corresponding to the low frequency or tone signal carried by the sideband signal discuss above. Filter circuit 986 may provide the tone signal to a control circuit 990, which may include demodulation circuitry, for example, to provide data or extract data from the tone signal.

Control circuit 990 may provide an output to the transmit DSP noted above, and, based on such output, optical power levels, for example, of the subcarriers may be adjusted. For example, the output of control circuit 990 may include information for setting or adjusting the gain values input to the multiplier circuits discussed above.

Figure 31B:
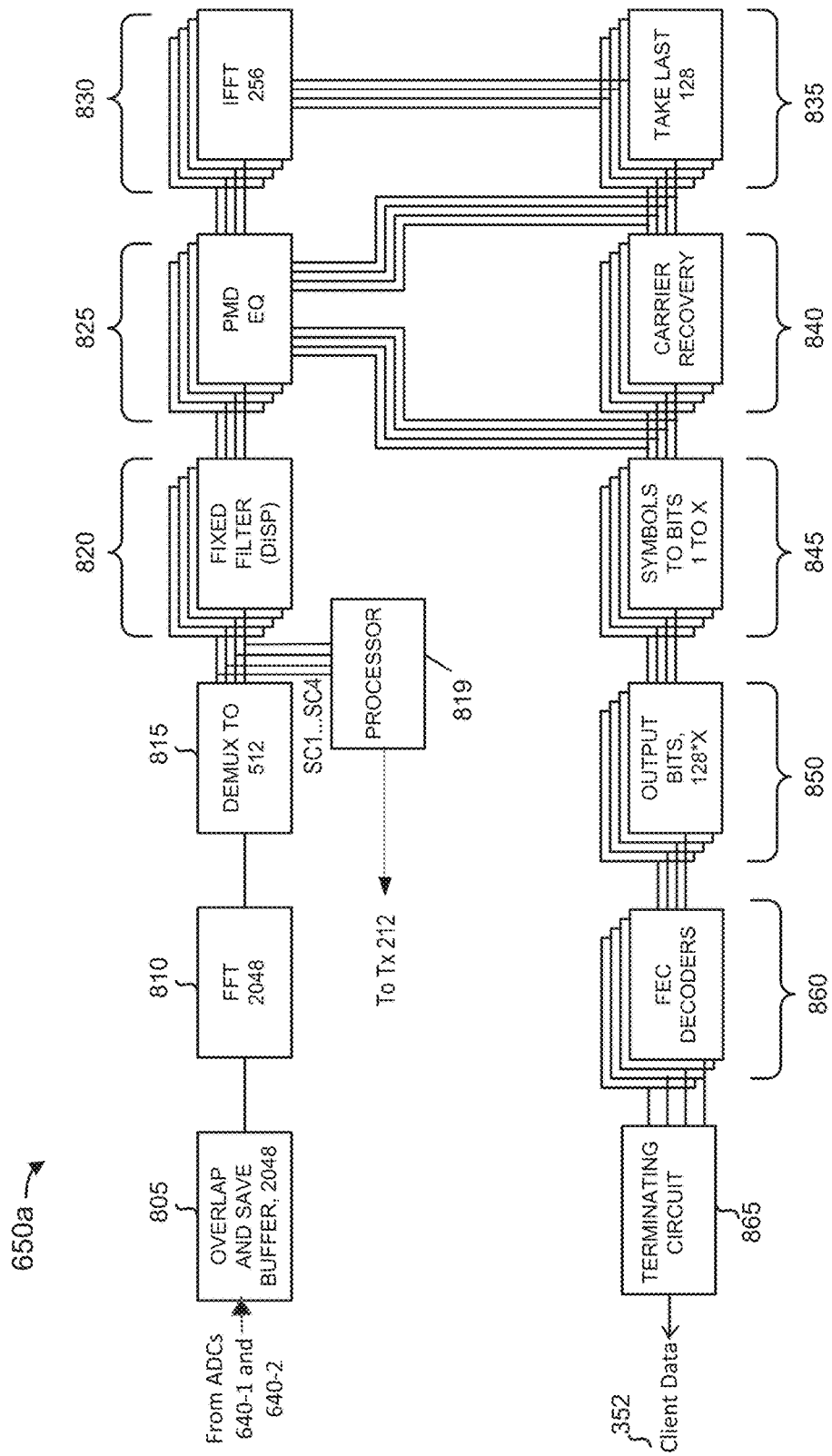
FIG. 31B is a diagram illustrating example components of another exemplary receiver digital signal processor (Rx DSP), such as that shown in FIG. 6, consistent with an aspect of the present disclosure.

In one implementation, as illustrated in FIG. 31B, the power of the optical subcarriers may be monitored through monitoring the digital subcarriers in the digital signal processor 650a of the receiver 226. In this example, after the Fourier transform component 810, each subcarrier may be assigned a group of registers or memories, each of which stores a frequency component of a particular subcarrier at the demultiplexing component 815. For example, subcarrier SC1 may be associated with 512 of the bins (that is, the converted time domain into frequency domain). A processor or circuit 819 may determine the energy level (power) of the subcarrier by calculating the square of the absolute value of each frequency bin at the output of the demultiplexing component 815 associated with a particular subcarrier, and taking the sum of those squares. The sum corresponds to the power of the subcarrier. That power feedback information may be sent to the transmitter 212 of the hub 920a (such as via the methods previously described) to be used to adjust the optical power of the optical subcarriers.

It will be understood that the above described systems for feedback to transmitters 212 transmitting optical carriers may also be used where the edge node(s) are transmitting the optical subcarrier(s) to the hub(s) 920a.

Accordingly, as noted above, a simplified and less expensive transmitter may be realized consistent with the present disclosure in which a laser and modulator may be employed to generate multiple subcarriers, whereby each of which may be detected and the client data associated therewith may be output from receivers provided at different locations in an optical network, for example. Improved network flexibility can therefore be achieved.

Other embodiments will be apparent to those skilled in the art from consideration of the specification. It is intended that the specification and examples be considered as exemplary only, with a true scope and spirit of the invention being indicated by the following claims.

CONCLUSION

Conventionally, a plurality of lasers and modulators were necessary to create optical signals to carry a plurality of data streams. In accordance with the present disclosure, a plurality of subcarriers is generated from a single laser to carry a plurality of data streams, such that a lesser number of lasers and modulators are needed across an optical network.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A digital signal processor, comprising:
   forward error correction circuitry that provides encoded first electrical signals based on input data;
   power adjusting circuitry that receives second electrical signals indicative of the first electrical signals, the power adjusting circuitry supplying third electrical signals, wherein each of the third electrical signals corresponds to an optical power level of a corresponding to one of a plurality of optical subcarriers output from an optical transmitter, wherein each of the third electrical signals has an associated one of a plurality of bandwidths, each of which corresponding to a spectral width of a respective one of the plurality of optical subcarriers;
   a plurality of pulse shape filters corresponding to each of the third electrical signals, the plurality of pulse shape filters configured to shape the associated one of the plurality of bandwidths of the third electrical signals, each of which corresponding to a spectral width of a respective one of the plurality of optical subcarriers;
   wherein each of the plurality of pulse shape filters is adjustable based on one or more control signal such that the shape of the plurality of bandwidths of the third electrical signals is adjustable.

2. The digital signal processor of claim 1, wherein the power adjusting circuitry is configured to adjust an electrical power level of one or more of the third electrical signals based at least in part on one or more characteristics of associated ones of transmission paths of corresponding optical subcarriers through an optical network.

3. The digital signal processor of claim 2, wherein the characteristics of the associated ones of transmission paths include one or more of: a presence of one or more power splitter configured to divide the optical subcarrier; length of the transmission paths; a presence of one or more filter; and a presence of one or more combiner configured to combine the optical subcarrier.

4. The digital signal processor of claim 1, wherein the power adjusting circuitry comprises a plurality of digital multipliers corresponding to a plurality of independent data streams.

5. The digital signal processor of claim 4, wherein the plurality of digital multipliers is adjustable based on one or more control signal such that power adjustment of each of the third electrical signals is configurable.

6. The digital signal processor of claim 5, wherein the power adjusting circuitry is adjustable based on one or more fourth electrical signals provided by a receiver that detects one or more of the plurality of optical subcarriers output from the optical transmitter.

7. The digital signal processor of claim 6, wherein the one or more fourth electrical signals is based on an optical power level of the one or more of the plurality of optical subcarriers previously detected by the receiver.

8. The digital signal processor of claim 6, wherein the one or more fourth electrical signals is based on a target optical power level of the one or more of the plurality of optical subcarriers at the receiver.

9. The digital signal processor of claim 6, wherein the one or more fourth electrical signals are associated with a feedback optical signal sent from the receiver to the optical transmitter.

10. The digital signal processor of claim 1, wherein a first one of the plurality of optical subcarriers carries first data with a first symbol rate and a second one of the plurality of optical subcarriers carries second data with a second symbol rate different than the first symbol rate.

11. The digital signal processor of claim 1, wherein a first one of the plurality of optical subcarriers has a first data capacity, and a second one of the plurality of optical subcarriers has a second data capacity that is the same as the first data capacity.

12. The digital signal processor of claim 1, wherein a first one of the plurality of optical subcarriers carries first data with a first data rate and a second one of the plurality of optical subcarriers carries second data with a second data rate different than the first data rate.

13. The digital signal processor of claim 1, wherein each of the plurality of optical subcarriers has a corresponding frequency, and having a first spacing between adjacent first and second frequencies, and having a second spacing different than the first spacing between adjacent third and fourth frequencies.

14. The digital signal processor of claim 1, wherein a first bandwidth of a first one of the plurality of optical subcarriers is wider than a second bandwidth of a second one of the plurality of optical subcarriers.

15. The digital signal processor of claim 1, wherein each of the plurality of optical subcarriers is modulated in accordance with the same modulation format.

16. The digital signal processor of claim 1, wherein a first one of the plurality of optical subcarriers is modulated in accordance with a first modulation format and a second one of the plurality of optical subcarriers is modulated in accordance with a second modulation format different than the first modulation format.

17. A digital signal processor, comprising:
  forward error correction circuitry that provides encoded first electrical signals based on input data;
  power adjusting circuitry that receives second electrical signals indicative of the first electrical signals, the power adjusting circuitry supplying third electrical signals, wherein each of the third electrical signals corresponds to an optical power level of a corresponding to one of a plurality of optical subcarriers output from an optical transmitter;
  wherein the power adjusting circuitry comprises a plurality of digital multipliers corresponding to a plurality of independent data streams;
  wherein the plurality of digital multipliers is adjustable based on one or more control signal such that power adjustment of each of the third electrical signals is configurable; and
  wherein the power adjusting circuitry is adjustable based on one or more fourth electrical signals provided by a receiver that detects one or more of the plurality of optical subcarriers output from the optical transmitter.

18. The digital signal processor of claim 17, wherein the one or more fourth electrical signals is based on an optical power level of the one or more of the plurality of optical subcarriers previously detected by the receiver.

19. The digital signal processor of claim 17, wherein the one or more fourth electrical signals is based on a target optical power level of the one or more of the plurality of optical subcarriers at the receiver.

20. The digital signal processor of claim 17, wherein the one or more fourth electrical signals are associated with a feedback optical signal sent from the receiver to the optical transmitter.

* * * * *